(12) United States Patent
Ando et al.

(10) Patent No.: US 7,616,863 B2
(45) Date of Patent: Nov. 10, 2009

(54) INFORMATION STORAGE MEDIUM, INFORMATION REPRODUCTION DEVICE, INFORMATION REPRODUCTION METHOD

(75) Inventors: Hideo Ando, Hino (JP); Kazuhiko Taira, Yokohama (JP); Hideki Mimura, Yokohama (JP); Teiichi Ichikawa, Yokohama (JP); Yasufumi Tsumagari, Yokohama (JP); Yoichiro Yamagata, Yokohama (JP); Yumiko Taga, Kamakura (JP); Minoru Ohta, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1076 days.

(21) Appl. No.: 10/844,495

(22) Filed: May 13, 2004

(65) Prior Publication Data

US 2005/0013590 A1 Jan. 20, 2005

(30) Foreign Application Priority Data

May 13, 2003 (JP) .............................. 2003-135058

(51) Int. Cl.
*H04N 5/91* (2006.01)
(52) U.S. Cl. .......................................... 386/69; 386/46
(58) Field of Classification Search .................. 386/46, 386/52, 68–70, 124–126
See application file for complete search history.

(56) References Cited

U.S. PATENT DOCUMENTS

| 5,636,200 | A | 6/1997 | Taira et al. |
|---|---|---|---|
| 5,642,346 | A | 6/1997 | Taira et al. |
| 5,721,720 | A | 2/1998 | Kikuchi et al. |
| 5,721,724 | A | 2/1998 | Taira et al. |
| 5,831,966 | A | 11/1998 | Taira et al. |
| 5,845,021 | A | 12/1998 | Kikuchi et al. |
| 5,848,216 | A | 12/1998 | Kaneshige |
| 5,995,667 | A | 11/1999 | Kikuchi et al. |
| 6,009,202 | A | 12/1999 | Kikuchi et al. |
| 6,011,867 | A | 1/2000 | Kikuchi et al. |
| 6,016,363 | A | 1/2000 | Kikuchi et al. |
| 6,016,364 | A | 1/2000 | Kikuchi et al. |
| 6,018,594 | A | 1/2000 | Kikuchi et al. |
| 6,021,226 | A | 2/2000 | Kikuchi et al. |
| 6,044,175 | A | 3/2000 | Kikuchi et al. |
| 6,047,086 | A | 4/2000 | Kikuchi et al. |
| 6,081,208 | A | 6/2000 | Kikuchi et al. |
| 6,094,414 | A | 7/2000 | Taira et al. |
| 6,112,009 | A | 8/2000 | Kikuchi et al. |
| 6,112,011 | A | 8/2000 | Hisatomi |

(Continued)

FOREIGN PATENT DOCUMENTS

JP 2677775 7/1997

OTHER PUBLICATIONS

U.S. Appl. No. 08/806,682, filed Feb. 26, 1997, Kikuchi et al.

(Continued)

*Primary Examiner*—Thai Tran
*Assistant Examiner*—Mishawn Dunn
(74) *Attorney, Agent, or Firm*—Oblon, Spivak, McClelland, Maier & Neustadt, L.L.P.

(57) ABSTRACT

An information reproduction method comprises setting an imaginary access unit in a video object in which a still picture is recorded; and managing reproduction by use of the imaginary access unit.

3 Claims, 52 Drawing Sheets

U.S. PATENT DOCUMENTS

| | | |
|---|---|---|
| 6,134,383 A | 10/2000 | Kikuchi et al. |
| 6,167,002 A | 12/2000 | Taira et al. |
| 7,050,700 B2 * | 5/2006 | Ishikawa .................... 386/69 |
| 7,362,963 B2 * | 4/2008 | Lin ............................ 386/125 |

OTHER PUBLICATIONS

U.S. Appl. No. 09/005,027, filed Jan. 12, 1998, Kikuchi et al.
U.S. Appl. No. 09/392,788, filed Sep. 9, 1999, Kikuchi et al.
U.S. Appl. No. 09/785,161, filed Feb. 20, 2001, Kikuchi et al.
U.S. Appl. No. 10/224,323, filed Aug. 21, 2002, Kikuchi et al.
U.S. Appl. No. 10/224,354, filed Aug. 21, 2002, Kikuchi et al.
U.S. Appl. No. 10/844,496, filed May 13, 2004, Ando et al.
U.S. Appl. No. 10/844,472, filed May 13, 2004, Tsumagari et al.
U.S. Appl. No. 10/844,330, filed May 13, 2004, Yamagata et al.
U.S. Appl. No. 10/989,053, filed Nov. 16, 2004, Taira et al.

* cited by examiner

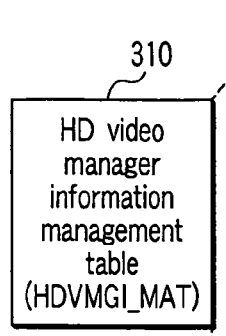

FIG. 4

| HDVMGI_MAT | | |
|---|---|
| HDVMG_ID | HD video manager identifier |
| HDVMG_EA | End address of HD video manager |
| HDVMGI_EA | End address of HD video manager information |
| VERN | Version number of HD-DVD video standards |
| HDVMG_CAT | HD video manager category |
| VLMS_ID | Volume set identifier |
| ADP_ID | Adaptation identifier |
| HDVTS_Ns | Number of HD video title sets |
| PVR_ID | Identifier unique to provider |
| POS_CD | POS code |
| HDVMGI_MAT_EA | End address of HD video manager management information table |
| FP_PGCI_SA | Start address of first play program chain information |
| HDVMGM_VOBS_SA | Start address of HDVMGM_VOBS |
| HDMENU_AOBS_SA | Start address of HDVMGM_AOBS |
| TT_SRPT_SA | Start address of TT_SRPT |
| HDVMGM_PGCI_UT_SA | Start address of HDVMGM_PGCI_UT |
| PTL_MAIT_SA | Start address of PTL_MAIT |
| HDVTS_ATRT_SA | Start address of HDVTS_ATRT |
| TXTDT_MG_SA | Start address of TXTDT_MG |
| HDVMGM_C_ADT_SA | Start address of HDVTSM_C_ADT |
| HDVMGM_VOBU_ADMAP_SA | Start address of HDVTSM_VOBU_ADMAP |
| HDMENU_AOBSIT_SA | Start address of information table HDVMGM_AOBS |
| HDVMGM_V_ATR | Video attribute of HDVMGM |
| HDVMGM_AST_Ns | Number of HDVMGM audio streams |
| HDVMGM_AST_ATR | Attribute of HDVMGM audio stream |
| HDVMGM_SPST_Ns | Number of HDVMGM sub-picture streams |
| HDVMGM_SPST_ATR | Attribute of HDVMGM sub-picture stream |
| HDVMGM_GUST_Ns | Number of HDVMGM graphic unit streams |
| HDVMGM_GUST_ATR | Attribute of HDVMGM graphic unit stream |
| FP_PGCI | First play PGCI |

310: HD video manager information management table (HDVMGI_MAT)

HDVMGM_PGC_CAT

| Bit<br>Byte | b7 | b6 | b5 | b4 | b3 | b2 | b1 | b0 |
|---|---|---|---|---|---|---|---|---|
| 0 | Entry type | Reserved | Audio information selection | | | Menu | | |
| 1 | Block mode | | Block type | | | Audio information number | | |
| 2 | PTL_ID_FLD (upper bit) | | | | | | | |
| 3 | PTL_ID_FLD (lower bit) | | | | | | | |

F I G. 8

Audio information selection
Indicate selection of audio reproduction of HDMENU_AOBS or
HDVMGM_VOBS, and start/end trigger of HDMENU_AOBS
...00b : Audio in VOB designated by PGC is reproduced (stop HDMENU_AOBS)
...10b : HDMENU_AOBS is continuously reproduced (ignore audio in VOB)
...11b : Start reproduction of HDMENU_AOBS (ignore audio in VOB)

Audio information number
Designate AOB number #n to be reproduced in HDMENU_AOBS

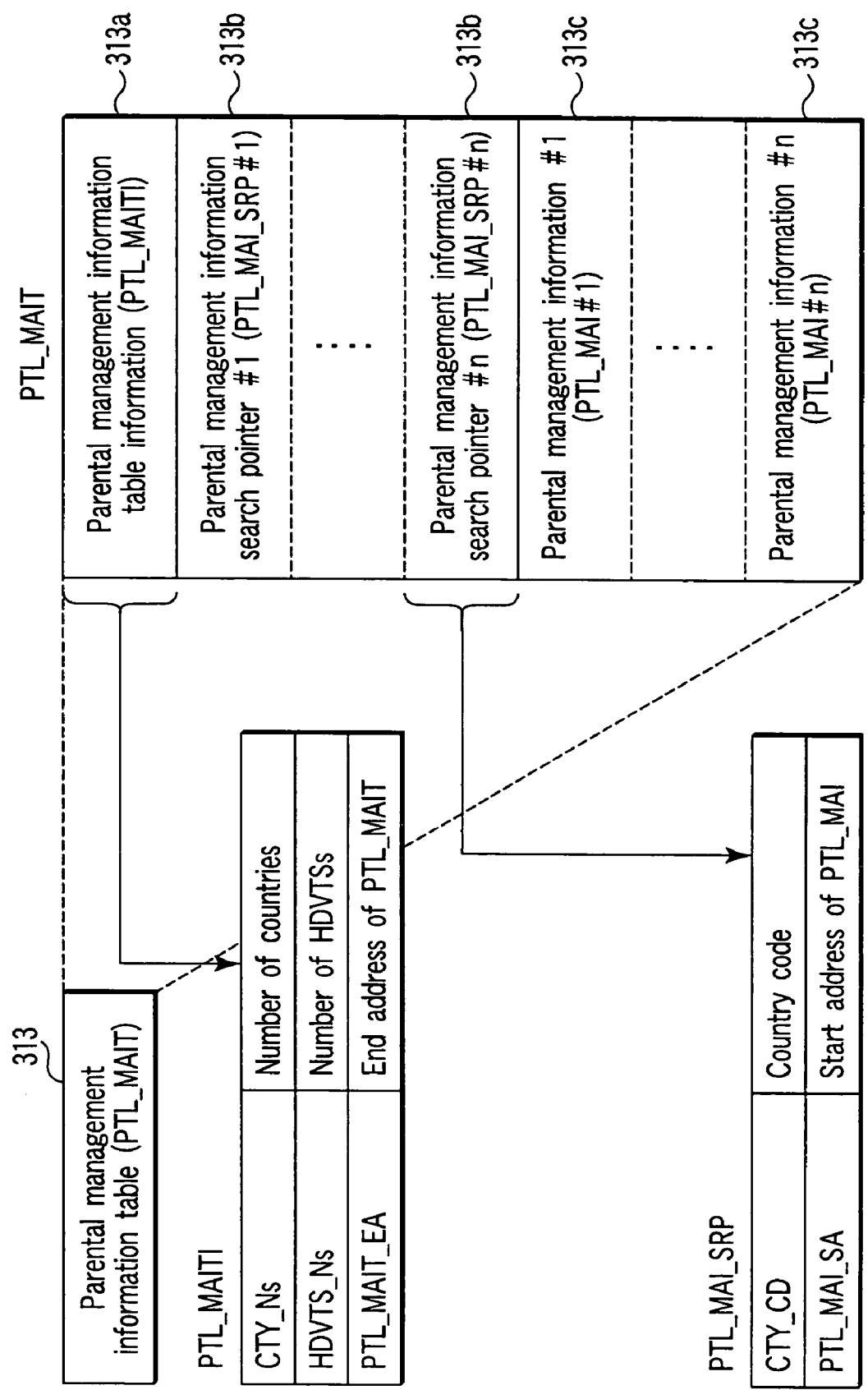
F I G. 9

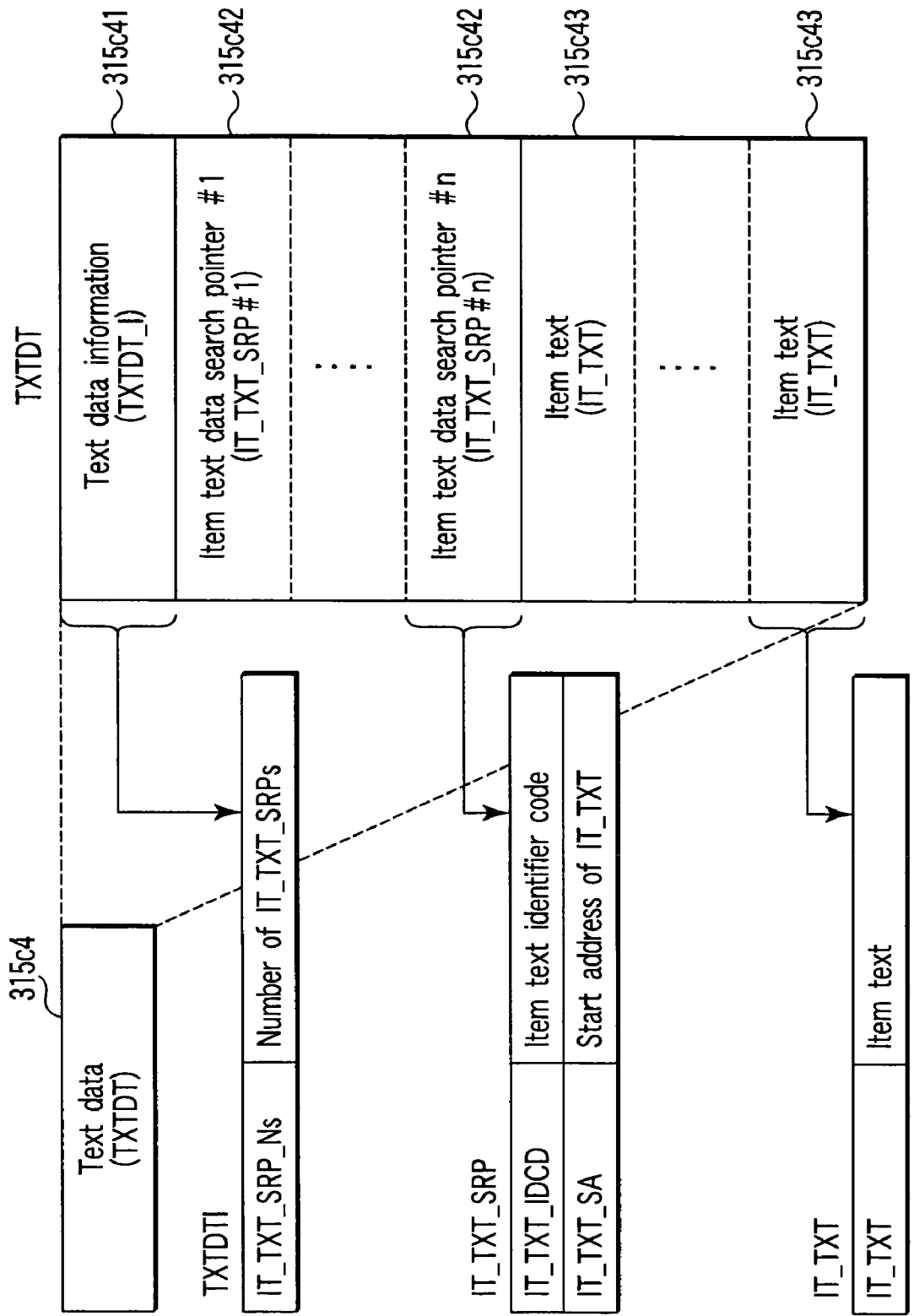
F I G. 14

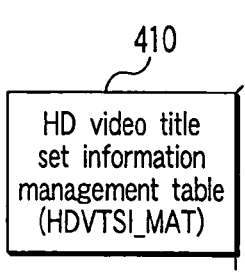

FIG. 21

| HDVTSI_MAT | |
|---|---|
| HDVTS_ID | HD video title set identifier |
| HDVTS_EA | End address of HDVTS |
| HDVTSI_EA | End address of HDVTSI |
| VERN | Version number of HD-DVD video standards |
| HDVTS_CAT | HDVTS category |
| HDVTSI_MAT_EA | End address of HDVTSI_MAT |
| HDVTSM_VOBS_SA | Start address of HDVTSM_VOBS |
| HDVTSTT_VOBS_SA | Start address of HDVTSTT_VOBS |
| HDVTS_PTT_SRPT_SA | Start address of HDVTS_PPT_SRPT |
| HDVTS_PGCIT_SA | Start address of HDVTSM_PGCIT |
| HDVTSM_PGCI_UT_SA | Start address of HDVTSM_PGCI_UT |
| HDVTS_TMAP_SA | Start address of HDVTS_TMAP |
| HDVTSM_C_ADT_SA | Start address of HDVTSM_C_ADT |
| HDVTSM_VOBU_ADMAP_SA | Start address of HDVTSM_VOBU_ADMAP |
| HDVTS_C_ADT_SA | Start address of HDVTS_C_ADT |
| HDVTS_VOBU_ADMAP_SA | Start address of HDVTS_VOBU_ADMAP |
| HDVTSM_V_ATR | Video attribute of HDVTSM |
| HDVTSM_AST_Ns | Number of HDVTSM audio streams |
| HDVTSM_AST_ATR | HDVTSM audio stream attribute |
| HDVTSM_SPST_Ns | Number of HDVTSM sub-picture streams |
| HDVTSM_SPST_ATR | HDVTSM sub-picture stream attribute |
| HDVTS_V_ATR | Video attribute of HDVTS |
| HDVTS_AST_Ns | Number of HDVTS audio streams |
| HDVTS_AST_ATRT | HDVTS audio stream attribute table |
| HDVTS_SPST_Ns | Number of HDVTS sub-picture streams |
| HDVTS_SPST_ATRT | HDVTS sub-picture stream attribute table |
| HDVTS_MU_AST_ATRT | HDVTS multi-channel audio stream attribute table |
| HDVTSM_GUST_Ns | Number of HDVSTM graphic unit streams |
| HDVTSM_GUST_ATR | HDVSTM graphic unit stream attribute |
| HDVTS_GUST_Ns | Number of HDVTS graphic unit streams |
| HDVTS_GUST_ATRT | HDVTS graphic unit stream attribute table |

410 — HD video title set information management table (HDVTSI_MAT)

HDVTS_PGC_CAT

| Bit<br>Byte | b7 | b6 | b5 | b4 | b3 | b2 | b1 | b0 |
|---|---|---|---|---|---|---|---|---|
| 0 | Entry type | Block mode | Block type | VTS_TTN | | | | |
| 1 | | | | | | Reserved | | RSM permission |
| 2 | PTL_ID_FLD (upper bit) | | | | | | | |
| 3 | PTL_ID_FLD (lower bit) | | | | | | | |

RSM permission
Indicate whether or not reproduction resume by RSM command or Resume () function is permitted by this PGC
...0b : Permission (update RSM information)
...1b : Prohibition (RSM information is not updated)

F I G. 24

HDVTSM_PGC_CAT

| Bit / Byte | b7 | b6 | b5 | b4 | b3 | b2 | b1 | b0 |
|---|---|---|---|---|---|---|---|---|
| 0 | Entry type | Reserved | Audio information selection | | | | | |
| 1 | Block mode | | | Block type | | | | |
| 2 | PTL_ID_FLD (upper bit) | | | | Menu ID | | | |
| 3 | PTL_ID_FLD (lower bit) | | | | Audio information number | | | |

Audio information selection
Indicate selection of audio reproduction of HDMENU_AOBS or HDVTSM_VOBS, and start/end trigger of HDMENU_AOBS
...00b : Audio in VOB designated by PGC is reproduced (stop HDMENU_AOBS)
...10b : HDMENU_AOBS is continuously reproduced (ignore audio in VOB)
...11b : Reproduction of HDMENU_AOBS is started (ignore audio in VOB)

Audio information number
Designate AOB number #n to be reproduced in HDMENU_AOBS

F I G. 27

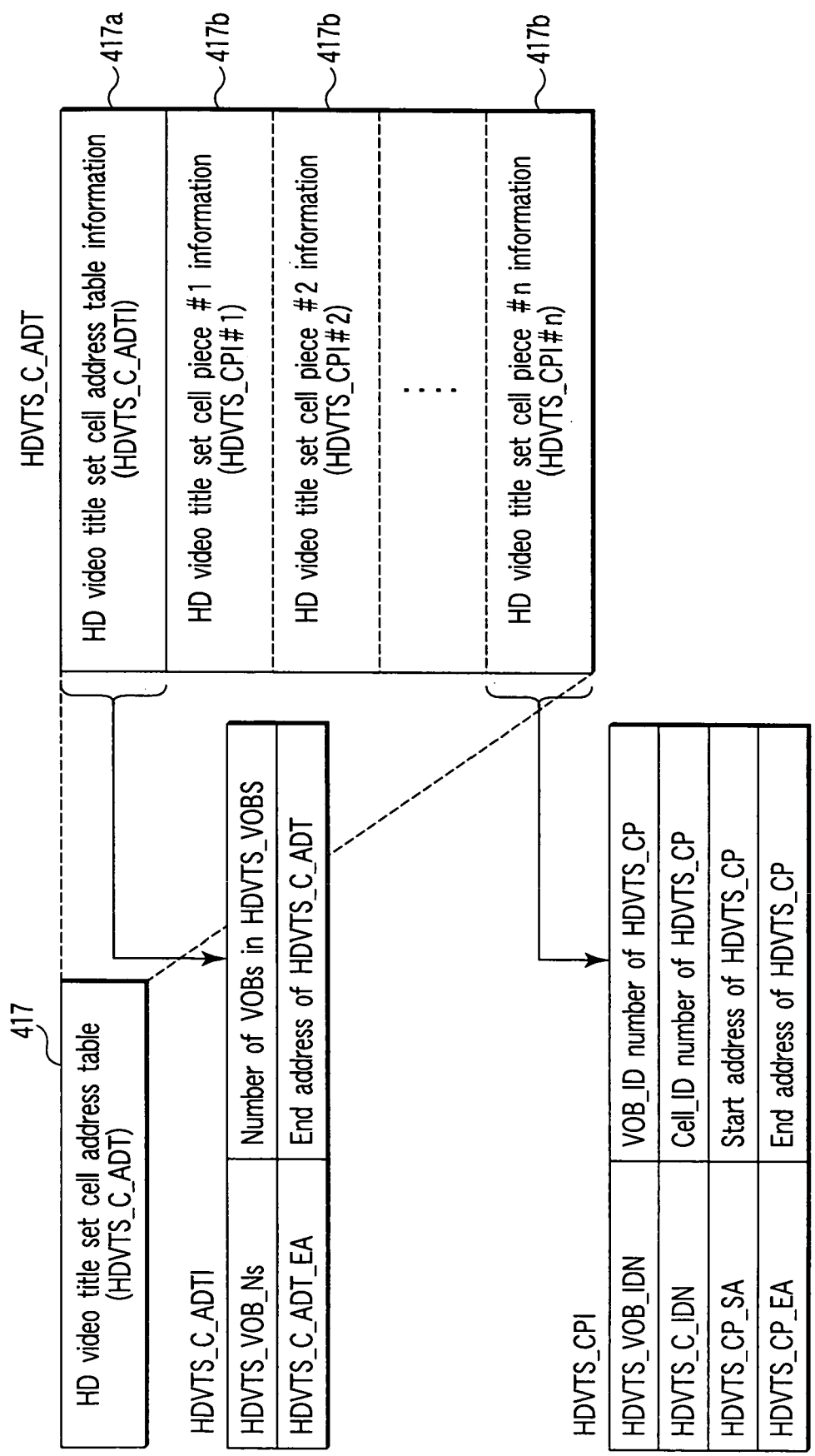
F I G. 31

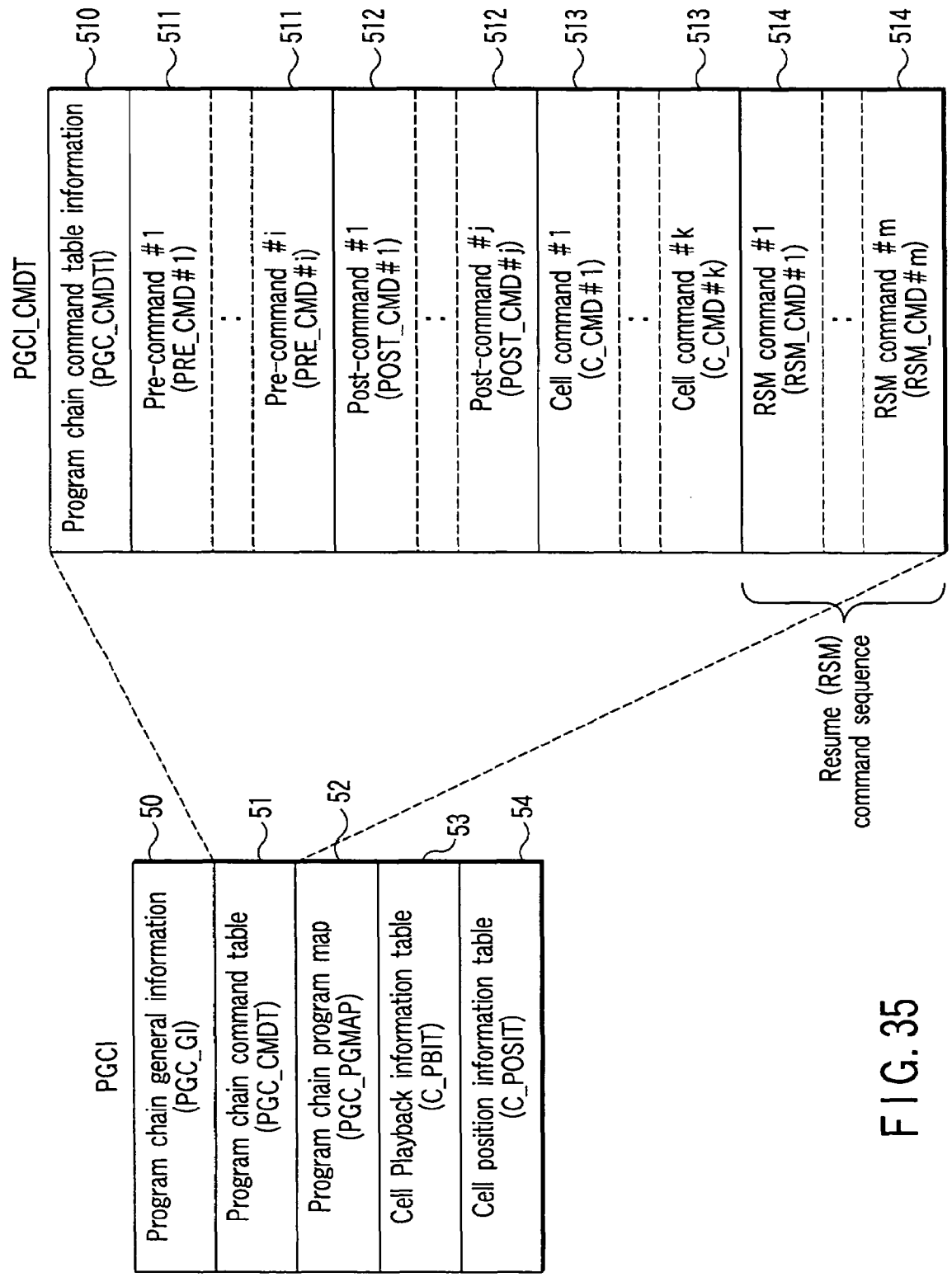
F I G. 35

Data structure of PGC_CMDTI and RSM_CMD

PGC_CMDTI

| | Contents |
|---|---|
| PRE_CMD_Ns | Number of pre-commands |
| POST_CMD_Ns | Number of post-commands |
| C_CMD_Ns | Number of cell commands |
| RSM_CMD_Ns | Number of resume commands |
| RSM_CMD_SA | Start address of resume command |
| PGC_CMDT_EA | End address of PGC_CMDT |

RSM_CMD

| | Contents |
|---|---|
| RSM_CMD | Resume command (8 bytes) |

PGCI_CMDT

- Program chain command table information (PGC_CMDTI) — 510
- Pre-command #1 (PRE_CMD#1) — 511
- Pre-command #i (PRE_CMD#i) — 511
- Post-command #1 (POST_CMD#1) — 512
- Post-command #j (POST_CMD#j) — 512
- Cell command #1 (C_CMD#1) — 513
- Cell command #k (C_CMD#k) — 513
- RSM command #1 (RSM_CMD#1) — 514
- RSM command #m (RSM_CMD#m) — 514

FIG. 36

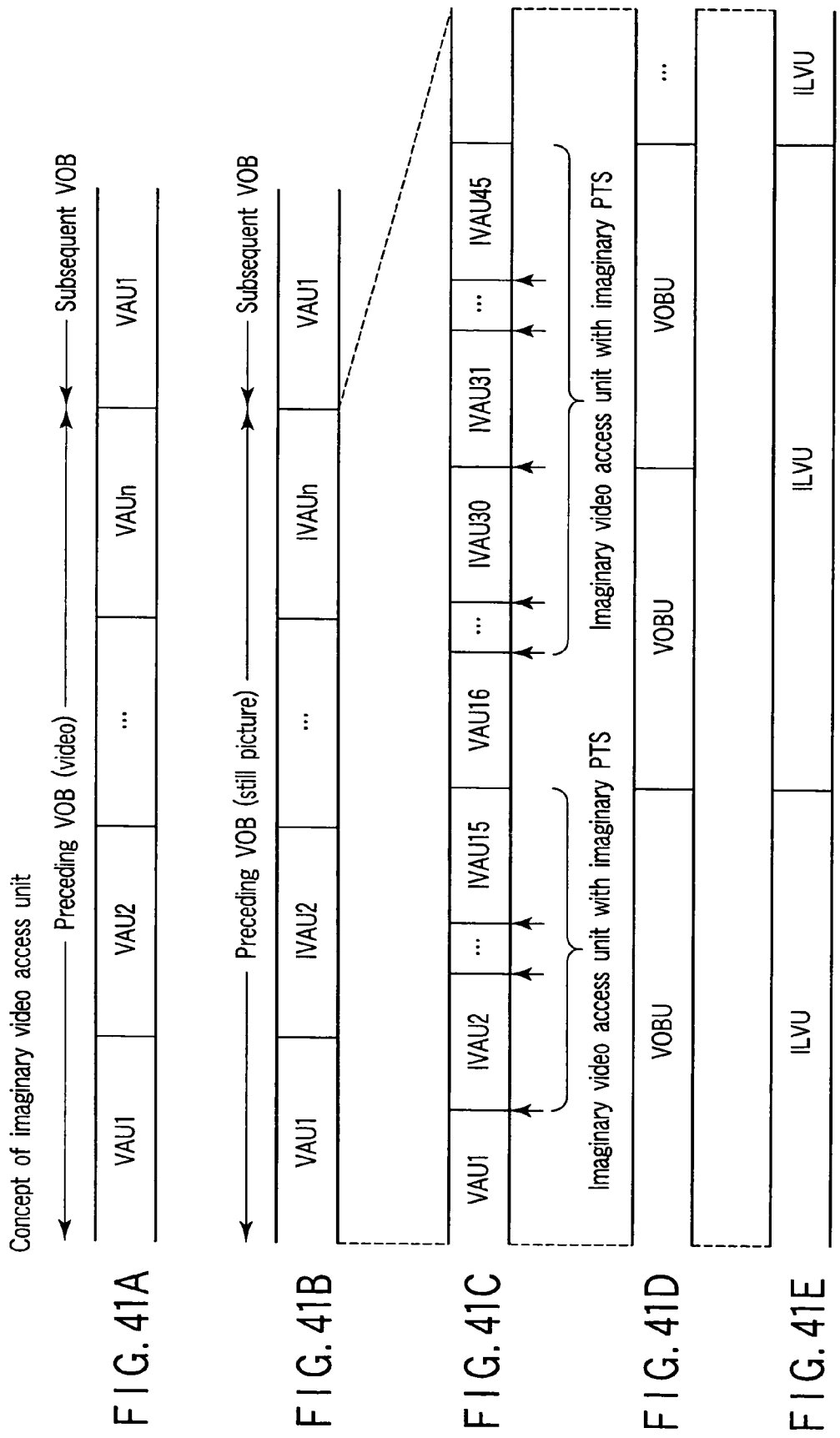

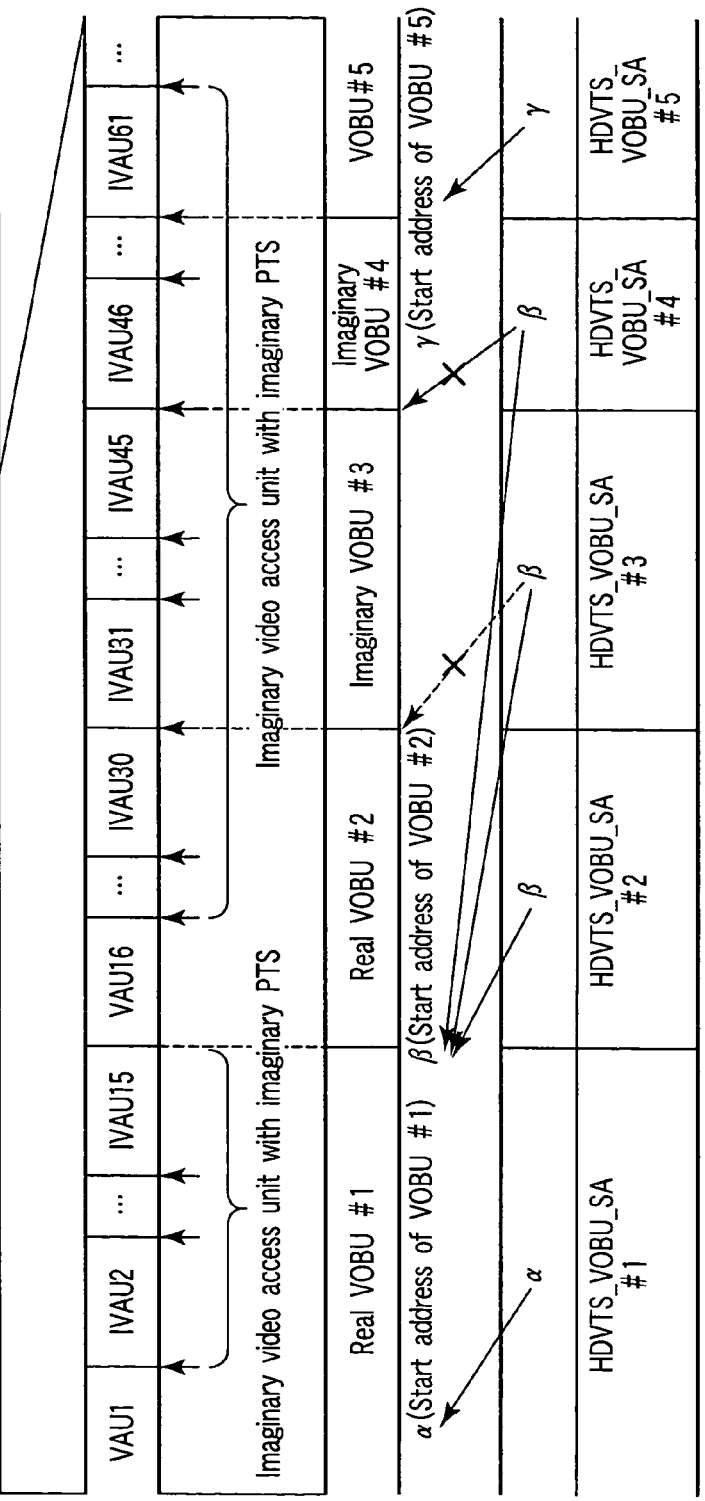

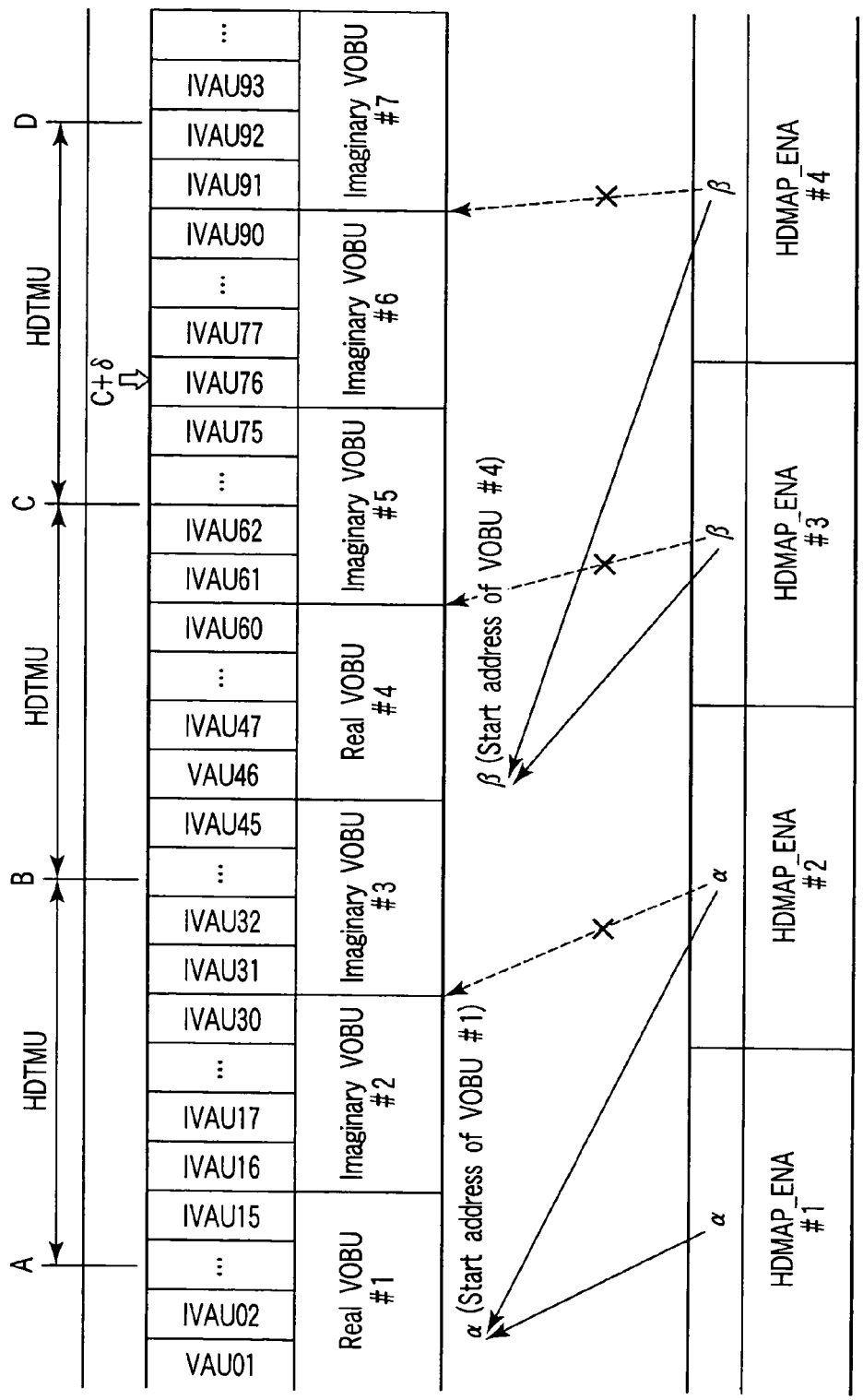
F I G. 43A  F I G. 43B  F I G. 43C

| SPRM | Recording information |
|---|---|
| 0 | Current menu language code (CM_LCD) being reproduced<br>Changeable/settable both by user and command |
| ... | ...... |
| 4 | Title number (TTN) in title domain |
| 5 | VTS title number (VTS_TTN) in title domain |
| 6 | Title PGC number (TT_RGCN) in title domain |
| 7 | Part-of-title number (PTTN) in one sequential PGC title |
| 8 | Highlight button number (HL_BTNN) for selection state |
| ... | ...... |
| 21 | Initial menu language (IM_LCD)<br>Player setting language changeable/settable only by user |
| 22 and after | Reserved |

System parameter contents

FIG. 44

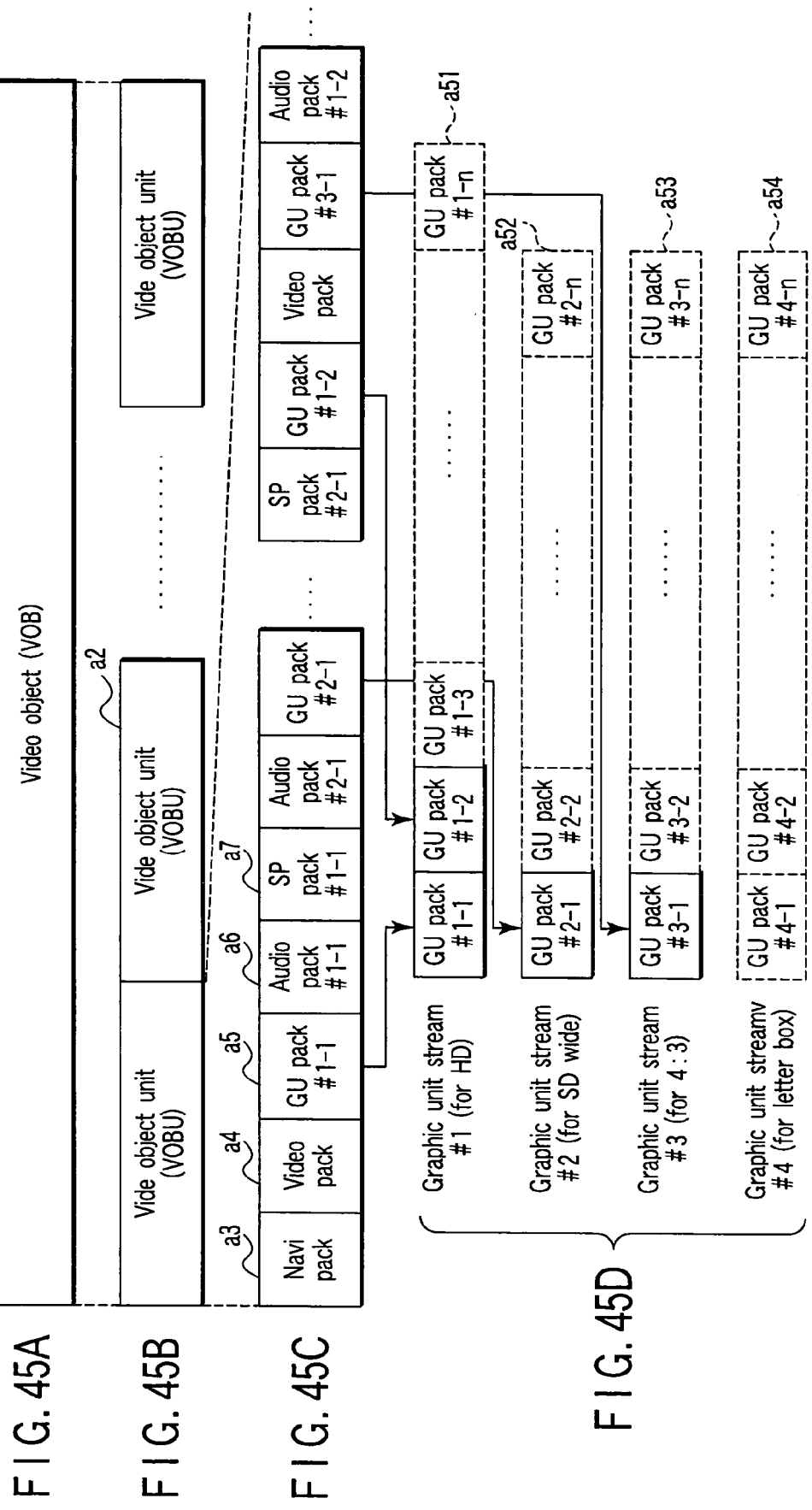

Header information contents and general information contents in graphic unit

Description of multi-angle playback in which still picture is combined with motion picture

F I G. 51A

| Motion picture ILVU A7 | ... | Actual VOBU [a] | Virtual VOBU [b] | Still picture ILVU B6 | Actual VOBU [c] | Motion picture ILVU A7 | ... | Still picture ILVU B7 | Actual VOBU [c] | Motion picture ILVU A8 | Virtual VOBU [d] | Still picture ILVU B8 | Actual VOBU [e] | Motion picture ILVU A9 | ... |

F I G. 51B

| Motion picture ILVU A6 | ... | Motion picture VOBU [f] | Still picture ILVU B6 | ... | Motion picture ILVU A7 | ... | Actual VOBU [a] | Virtual VOBU [b] | Still picture ILVU B7 | ... | Actual VOBU [c] | Virtual VOBU [d] | Still picture ILVU B7 | Motion picture ILVU A8 | ... |

F I G. 51C

| Motion picture ILVU A7 | ... | Actual VOBU [a] | Virtual VOBU [b] | Still picture ILVU B7 | Actual VOBU [c] | Motion picture ILVU A8 | ... | Still picture ILVU B8 | Virtual VOBU [d] | Motion picture VOBU [g] | Motion picture ILVU V9 |

INFORMATION STORAGE MEDIUM, INFORMATION REPRODUCTION DEVICE, INFORMATION REPRODUCTION METHOD

CROSS-REFERENCE TO RELATED APPLICATIONS

This application is based upon and claims the benefit of priority from the prior Japanese Patent Application No. 2003-135058, filed May 13, 2003, the entire contents of which are incorporated herein by reference.

BACKGROUND OF THE INVENTION

1. Field of the Invention

The present invention relates to an information storage medium (or an information recording medium), an information reproduction device, and an information reproduction method.

2. Description of the Related Art

As such an information storage medium, there has been an optical disk called a digital versatile disk (DVD) capable of reproducing digital information using a focused light. Standards of the current DVD include read-only DVD-ROM standards, write-once DVD-R standards, rewritable-type (about 10000 times) DVD-RW, and rewritable-type (10000 times or more) DVD-RAM standards. Any standards have format standards which define a data structure recorded on an optical disk (information storage medium) of video information (video data, sub-picture data, and audio data, generically referred to as video objects) itself, and a data structure of management data for managing video information.

The read-only current DVD video standards simultaneously deal with a large number of languages, and multi-scene representation is possible such as multi-angle and multi-story. Additionally, there are varieties of menu screens, it is easy for users to directly access desired scenes, and the standards have formats capable of providing video content which is easily used by the users (see U.S. Pat. No. 5,636,200, and Japanese Patent No. 2,677,775, for example).

As described above, the read-only current DVD video standards have the formats capable of the video content easily usable by the users, but there has been a demand for improvements of the standards in order that the users may further easily use the content and content representing power may be further enriched for the users.

Moreover, there is a problem that authoring (preparation and edition of programs to be recorded in the DVD video disk) is complicated in order to provide the content easy to use by the users.

Parts of the current DVD video standards lacking in content representing power for the users, and parts difficult for the users to use or parts which are complicated in the authoring for providing the content easy to use by the users will be specifically listed.

[1] Difficult for the user to use. Alternatively, the authoring has been complicated in order to prepare the content easy to use by the users.

(A) Disadvantages with respect to a reproduction start position at a time when reproduction of a title is interrupted halfway to perform another processing, and the reproduction of the title is restarted.

(A1) The reproduction of video is interrupted, display is switched to menu or another video, and the reproduction cannot be restarted from the interrupted position.

The reproduction of a specific video title is interrupted halfway during the reproduction to switch to the menu screen,. bonus content is then reproduced halfway or to the end, and afterwards the video title interrupted halfway is to be reproduced. However, the content prepared by conventional DVD video standards cannot be reproduced only from a start position of the video title in many cases. This is because resume information (reproduction interrupted position information) of the previous specific video title is rewritten into position information of the bonus content in a stage in which the reproduction of the bonus content is started. A complicated authoring process is required in order to obtain the content such that the reproduction can be started from the interrupted position of the previous video title after the bonus content is reproduced halfway or to the end.

(A2) The reproduction cannot be started from a good place to start, when a game is to be resumed after the interruption of the reproduction in the game or the like.

In case of the "game" (e.g., role playing game) instead of the above-described video as the specific title, there is a request from a content provider that the game is to be started from an end of a chapter of the game, not from an interrupted position in a case where the game is resumed after returning to the menu screen. However, this request cannot be satisfied with the current DVD video standards.

(B) There is a portion difficult to use concerning language setting for display.

(B1) A menu description language code cannot be changed with a command which can be designated in the content, and the authoring is complicated.

In the current DVD video standards, the menu description language code M_LCD is set into SPRM(0) (0-th system parameter: 16 bits) of navigation data, and the value is stored in the memory of the information reproduction device. In the current DVD video standards, a command for changing the value of SPRM(0) does not exist in a command list which can be set in the content, and it is possible to change the value of SPRM(0) only by user designation under a special condition. Specifically, the value of SPRM(0) can be changed using a user operation function called Menu_Language_Select ( ) in user functions arranged in the information reproduction device, but there is a restriction that the user operation called Menu_Language_Select ( ) can be set only during the stopping of the operation of the information reproduction device. A screen for exclusive use is displayed to set the user operation using a remote controller.

The value of SPRM(0) cannot be changed with the command which can be set in the content in this manner. Therefore, a screen for selecting the menu description language code needs to be prepared with respect to a plurality of menu description language codes in the content (especially VOB data on menu information) so that any setting of the value of SPRM(0) can be handled. The authoring operation at the time of preparation of the content has been very difficult.

(B2) There is a danger that menu description language code information set by the user is deleted.

For example, supposing that a command capable of changing the value of SPRM(0) is newly added in order to solve problem (B1). Then, even when the user carefully sets a specific menu description language code (e.g., set Japanese to SPRM(0)), there is a danger that the value of SPRM(0) is automatically changed by the reproduction of the content. When the menu description language code is automatically changed by the command, the user feels dissatisfied. Additionally, a necessity to set the menu description language code again by the user is generated, and this causes a problem that burdens on the user increase.

[2] There is a place where a content representing power for the user is lacking.

(C) Disadvantage concerning seamless reproduction with respect to a still picture (C1) A seamless reproduction between a moving picture and still picture is not possible with the current DVD video content.

The current DVD video assures the seamless reproduction of the moving picture (Movie Content), and connection/reproduction is seamlessly possible between different VOBs (or different titles) (without interrupting the screen of the moving picture halfway). On the other hand, for example, when the still picture displayed in a slide show (one display method with respect to the still picture, in which the displayed still picture is automatically switched) is switched to the moving picture, the seamless reproduction is not assured, and video or audio stands still halfway depending on the information reproduction device in some case. Reasons why the seamless connection is not assured at a time of the switching to the moving picture from the still picture with the current DVD video content are as follows.

i) In an extended system target decoder (E-STD) in which the seamless reproduction is assured, an access unit is defined in a moving picture object, and the values of a system time clock (STC: a clock value forming a standard) set to a separation unit, video decoder unit, sub-picture decoder unit, and audio decoder unit are switched in a boundary position of the access unit. On the other hand, the access unit cannot be defined with respect to the still picture in the current DVD.

That is, a picture continues to be output constantly continuously by a field unit of the moving picture, whereas the picture is only intermittently output in the still picture displayed, for example, in the slide show. In a data structure in a still picture object, a sequence end code (sequence_end_code) is arranged immediately after an I picture (intra picture) constituting a still picture in accordance with standards of moving picture experts group 2 (MPEG2). In the video decoder unit, when this sequence end code is detected, the decoding is stopped until the next I picture is input. Therefore, in the conventional DVD video, the access unit such as the moving picture cannot be set in a timing period in which the still picture is intermittently output.

ii) Switching between common parities has been permitted as a switching timing between the still pictures in the conventional DVD video. That is, after the previous still picture ends in a top field (or a bottom field), the next still picture is permitted to be started from the top field (or the bottom field). Therefore, when the still picture is switched to the moving picture halfway in a frame, the seamless connection is not performed, and there is a danger that the screen is disturbed at a switching end.

(C2) Multi-angle reproduction in which the still pictures are combined or multi-angle reproduction between the moving picture and still picture cannot be performed.

In the current DVD video, it is difficult to perform the multi-angle reproduction in which slide shows of still pictures (still picture content) are combined or the multi-angle reproduction in which the slide show of the still pictures is combined with the moving picture. When multi-angle reproduction handling content is forcibly prepared, the seamless reproduction is not assured with respect to the still picture. Therefore, multi-angled still pictures cannot be continuously reproduced (the still picture is stopped halfway without being continuously switched), or the screen stops halfway without being smoothly switched at the switching end between a screen of multi-scene and that of one sequential scene. In the moving picture, an interleaved unit (ILVU) is defined in which scattered arrangement is performed for each angle in an interleaved block, whereas the definition of the ILVU with respect to the still picture is not clarified in the current DVD video. A period until the switching of the screen is long in the still picture (the same still picture continues to be reproduced for a long time), and therefore there has not been a mechanism capable of displaying the corresponding still picture immediately after angle switching at present. Furthermore, as described in (C1), on detecting the sequence end code arranged immediately after the I picture corresponding to the still picture, a decode process of the video decoder unit is temporarily stopped until the next I picture comes. Therefore, the arrangement of the sequence end code is prohibited in video data in a cell constituting the interleaved block in the current DVD video standards.

(D) The seamless reproduction is not assured in VOB where the command by a cell unit is included.

In the DVD video of the current standard definition (SD), it is possible to designate the command by the cell unit in a program chain (PGC). This command information is recorded in a cell command region in program chain information (PGCI) which is a region where management information of the PGC is recorded. The cell command is executed at the time of the ending of the reproduction of the cell in which this cell command is set. Therefore, the reproduction of the next cell can be temporarily interrupted. Therefore, the seamless reproduction between the cells is not assured at the playback time of VOB including the cell command in the current SD DVD video.

(E) Disadvantage on highlight information (E1) There is a deviation of a display period (set period) between highlight information and sub-picture.

A menu of the highlight information is displayed at the playback time of a video title image, and content can be prepared in such a manner that the user is can perform an interactive operation. In this case, it is necessary to switch the highlight information or to change the content of the highlight information in accordance with the content of the video title image being reproduced, and therefore precision of a display period or executable period of the highlight information is important. In the DVD video content of the conventional SD, a button displayed in the screen comprises a combination of two types of different streams of a sub-picture stream presenting the image of the button and a video stream including the highlight information required for executing the command designated by the button.

The effective executable period of the highlight information is determined by time information of start and end (PTM: presentation time), and completely coincides with a display period of the sub-picture for use mainly in subtitles. There is a problem that menu selection ends, when the sub-picture ends. Therefore, when a content maker is to prepare the content of the subtitles simultaneously combined with the menu, there are restrictions as to the preparation of the content. For example, the user has to select the menu within an effective (display) period of the sub-picture. The content maker cannot prepare the content as imaged, a degree of freedom is limited, and the content supplied to the user are forced to be limited.

(E2) A selection item image of the menu is not multicolored.

Since only a combination of 16 colors can be represented in the current SD DVD video content, a degree of appeal to the user is low, and multicolored representation cannot be performed.

(E3) A designated region of the highlight information cannot be set to a shape other than a rectangular shape.

The shape other than the rectangular shape cannot be set as the designated region of the highlight information in the DVD video content of the current SD, and it has not been possible to prepare the content having varieties of highlight information such as a triangular shape and a star shape.

(E4) The same button cannot be set with respect to a plurality of regions distant from one another on the screen.

The same button can be set only in an integrated region in the DVD video content of the current SD.

On the other hand, it is easy to link the same URL to a plurality of regions in the screen of PC or a homepage screen of internet, and the current SD DVD video content has been inferior to the PC screen or the homepage screen of internet.

(F) There is a problem that a background music discontinues at the switching time of the menu screen.

In the current SD DVD video content, audio information (background music) at a menu screen display time is attached to each menu. Therefore, every time the menu screen changes, the audio information accordingly changes.

The DVD video content of the current SD cannot satisfy a content provider's request that the background music is to be reproduced continuously without being interrupted, even when the menu is switched.

In this manner, the conventional DVD video standards have been required to be improved so that the user can further easily use the content, and the content representing power to the user is further enriched.

Moreover, to provide the content easy to use by the user, there is a problem that the authoring (preparation and edition of the program to be recorded in the DVD video disk) is complicated.

BRIEF SUMMARY OF THE INVENTION

According to an embodiment of the present invention, a representing power of read-only DVD video content to a user is enhanced, and it is possible to prepare content easy to use by the user by comparatively easy authoring. As a result, there can be provided a data structure based on format standards capable of enhancing an appeal of a DVD video to the user, an information storage medium in which the data structure is recorded, and an information reproduction device capable of reproducing the information storage medium.

According to an embodiment of the invention, an information reproduction method comprises setting an imaginary access unit in a video object in which a still picture is recorded; and managing reproduction by use of the imaginary access unit.

According to another embodiment of the invention, an information storage medium records a data structure in which an imaginary access unit is set in a video object in which a still picture is recorded, video object units constitute one interleaved unit, and a first video object unit in the interleaved unit is an actual access unit capable of recording a still picture.

According to still another embodiment of the invention, an information reproduction device comprises means for setting an imaginary access unit in a video object in which a still picture is recorded; and means for managing reproduction by use of the imaginary access unit set by the setting means.

BRIEF DESCRIPTION OF THE SEVERAL VIEWS OF THE DRAWING

FIG. 4 is a diagram showing a data structure in an HD video manager information management table (HDVMGI_MAT) 310 of FIG. 3;

FIG. 8 is a diagram showing a data structure in an HD video manager menu program chain category (HDVMGM_PGC_CAT) recorded in the HD video manager menu/language unit #n (HDVMGM_LU #n) 312*c* (FIG. 6) shown in FIG. 7;

FIG. 9 is a diagram showing a data structure in a parental management information table (PTL_MAIT) 313 shown in FIG. 3;

FIG. 14 is a diagram showing a data structure in text data (TXTDT) 315*c*4 in the text data language unit (TXTDT_LU) 315*c* shown in FIG. 13;

FIG. 21 is a diagram showing a data structure in an HD video title set information management table (HDVTSI_MAT) 410;

FIG. 24 is a diagram showing a data structure in the HD video title set program chain category (HDVTS_PGC_CAT) recorded in HDVTS_PGCI search pointer (HDVTS_PGCI_SPR) shown in FIG. 23;

FIG. 27 is a diagram showing a data structure in the HDVTSM_PGC category information (HDVTSM_PGC_CAT) shown in FIG. 26;

FIG. 31 is a diagram showing a data structure in an HD video title set cell address table (HDVTS_C_ADT) 417 shown in FIG. 20;

FIG. 35 is a diagram showing a data structure in a program chain/command table PGCI_CMDT in program chain information PGCI shown in FIG. 34;

FIG. 36 is a diagram showing a data structure in program chain/command table information PGC_CMDTI and resume command RSM_CMD in the program chain/command. table PGCI_CMDT shown in FIG. 35;

FIGS. 41A, 41B, 41C, 41D, and 41E show a concept of an imaginary video access unit IVAU;

FIGS. 42A, 42B, 42C, 42D, and 42E shows contents of management information described in an HD video title set/video object unit/address HDVTS_VOBU_SA to manage the data of VOB recording the still picture in which the imaginary video access unit IVAU is set;

FIGS. 43A, 43B, and 43C show a relation between the imaginary video access unit IVAU and an HD map entry HDMAP_EN;

FIG. 44 is an explanatory view of contents of a system parameter SPRM;

FIGS. 45A, 45B, 45C, and 45D are arrangement diagrams of a graphic unit GU in a video object;

FIGS. 51A, 51B, and 51C are explanatory views of multi-angle playback in which a still picture is combined with a moving picture;

DETAILED DESCRIPTION OF THE INVENTION

An embodiment of the present invention will be described hereinafter with reference to the drawings. First, whole subject matters of the present invention will be surveyed, and a relation between the subject matters will be described. Next, points concerning "resume information control" which is a main subject matter noted in the present specification will be described, and then specific embodiments will be described.

In the present specification, video data, sub-picture data, audio data, and graphic data are generically referred to as a video object, and the video object and video object management information are generically referred to as contents. To clarify differences, conventional DVD video content will be referred to as standard definition (SD) content, and content which is an object of an embodiment of the present invention having the following subject matter (A) to (F) will be referred to as high definition (HD) content.

<Description of Whole Subject Matters>

[1] A problem that the content is difficult to use by a user or that authoring is complicated in preparing the content easy to use by the user is solved.

(A) Interrupted Position Information Control Method at Title Interruption Time

[Point 1]

Figure 39:
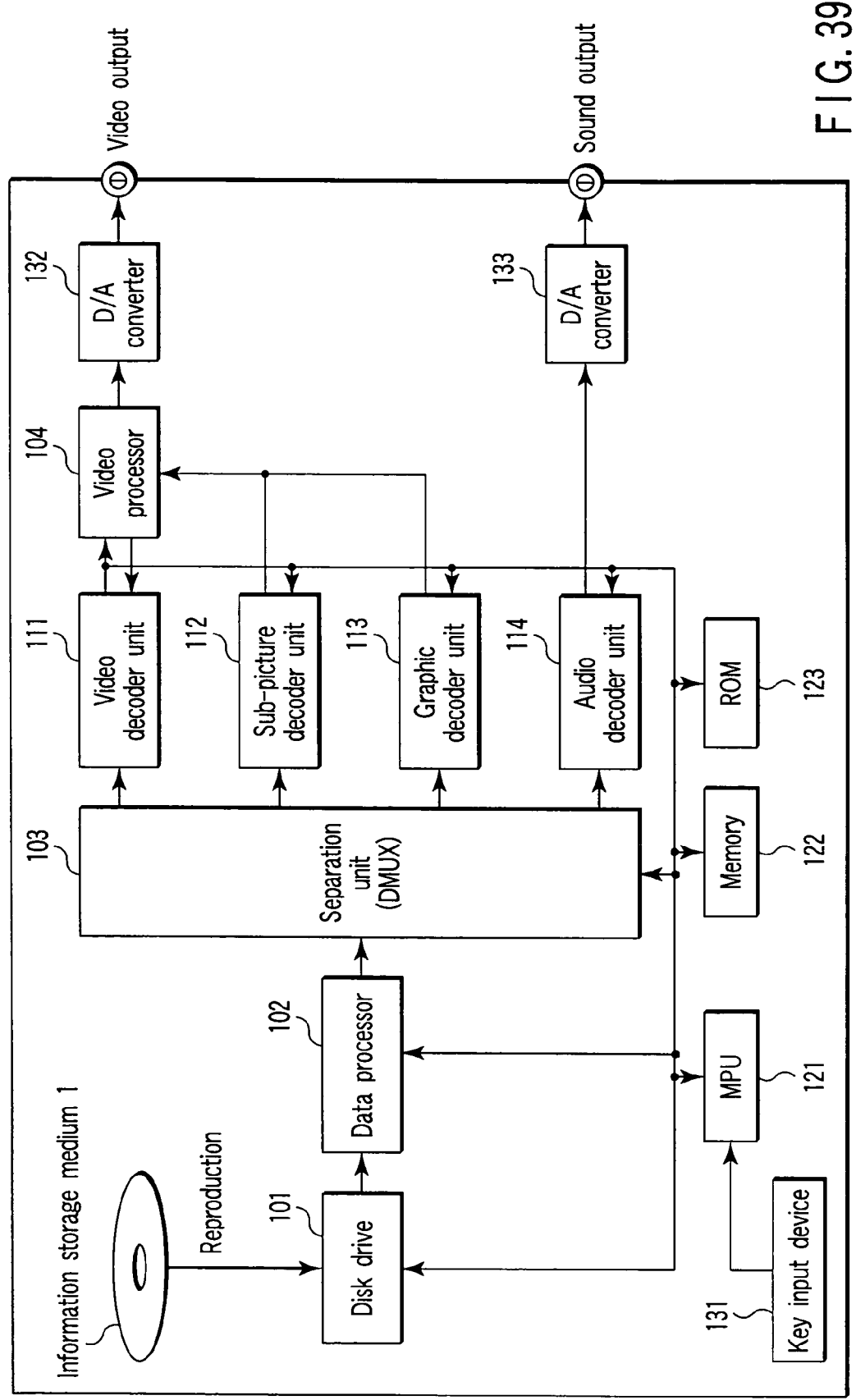
FIG. 39 is a block diagram showing a constitution of an information reproduction device (player) of an embodiment of the present invention.

Storage/discharge rules in resume information are changed with respect to the current DVD video standards, and rewrite/change prohibition/discard process of contents of resume information recorded in a memory 122 of an information reproduction device shown in FIG. 39 are finely controllable.

[Point 2]

When the resume information to be recorded in the memory 122 of the information reproduction device is rewritten, the information is held until a control instruction comes with respect to the next resume information. For example, in conventional DVD video standards, there has been a rule of deletion of contents of the resume information in a case where a JumpTT, JumpVTS_TT, or JumpVTS_PTT command is executed. This is changed in the present invention. Even after the above-described command is executed, the contents of the resume information are held, and a part of the problem described in (A1) is solved.

[Point 3]

As measures against the problem shown in (A1), as shown in FIG. 24, with respect to each PGC, a resume (RSM: reproduction resume) command (command by selection on a screen), or a resume permission flag (=RSM permission flag) indicating whether or not the reproduction resume by a resume ( ) function (command performed by the reproduction device) executed, for example, in accordance with user designation is permitted is newly set. As a specific content, at the time of execution of a CallSS command described later, the content of the resume information is updated, when the RSM permission flag is set to "0b". When the flag is set to "1b", the update is prohibited.

For example, when the resume information is prohibited from being updated with respect to the PGC including bonus content in an example described in (A1), the resume information with respect to a specific video title interrupted before is held as the resume information recorded in the memory 122 of the information reproduction device (details will be described later in detail).

[Point 4]

As the measures against the problem described in (A2), as shown in FIG. 35, a program chain command table (PGC_CMDT) 51 is newly set in program chain information PGCI, and resume sequence information is recorded. The resume sequence information described in the program chain command table (PGC_CMDT) 51 means a command string (continuous link order of commands) executed immediately before returning to the PGC of the corresponding title from the menu screen. When returning to the PGC corresponding to the interrupted title from the menu screen, the presence/absence of the resume sequence information is surely confirmed before starting the reproduction based on the resume information.

When there is not any resume sequence information, the reproduction from the interrupted position is started based on the resume information.

If there is the resume sequence information, the reproduction is started from a place designated by the resume sequence information.

For example, as the measures against the problem described in (A2), a command to rewrite "position information of stop of game" into the resume information is set in the resume sequence information recorded in the program chain command table (PGC_CMDT) 51. Accordingly, immediately after returning from the menu screen, the reproduction can be started from the stop of the game (detailed contents will be described later).

A cell number which is information indicating a position where the reproduction has been interrupted; address information of a navigation pack arranged in a start position of a cell; PGC reproduction control situation; video title set (VTS) number; a title number TTN in a title domain (the value of the title number is stored as that of SPRM(4) as shown in FIG. 44); a title number VTS_TTN in VTS in the title domain (this value is stored as the value of SPRM(5)); a PGC number TT_PGCN (SPRM(6)) of the title in the title domain; a part of title number PTTN (SPRM(7)) with respect to the title of a sequential PGC; and a highlight button number HL_BTNN (SPRM(8)) of highlight in a selected state are recorded as the resume information. Not only in a case where the menu screen is returned to PGC corresponding to the interrupted title as described above, but also in cases where situations change, for example, where at least a part of the resume information changes, or highlight position information changes in association of information of SPRM(8), the process is set to be surely executed to the end of the resume sequence information.

[Management Information Recording Place]

In an arrangement place of information for managing the resume information, in the first embodiment, as shown in FIG. 24, the RSM permission flag (update permission flag of resume information) is arranged in an HDVTS_PGC category (HDVTS_PGC_CAT) in an HDVTS_PGCI search pointer 412b in an HD video title set program chain information table (HDVTS_PGCIT) 412.

Figure 33:
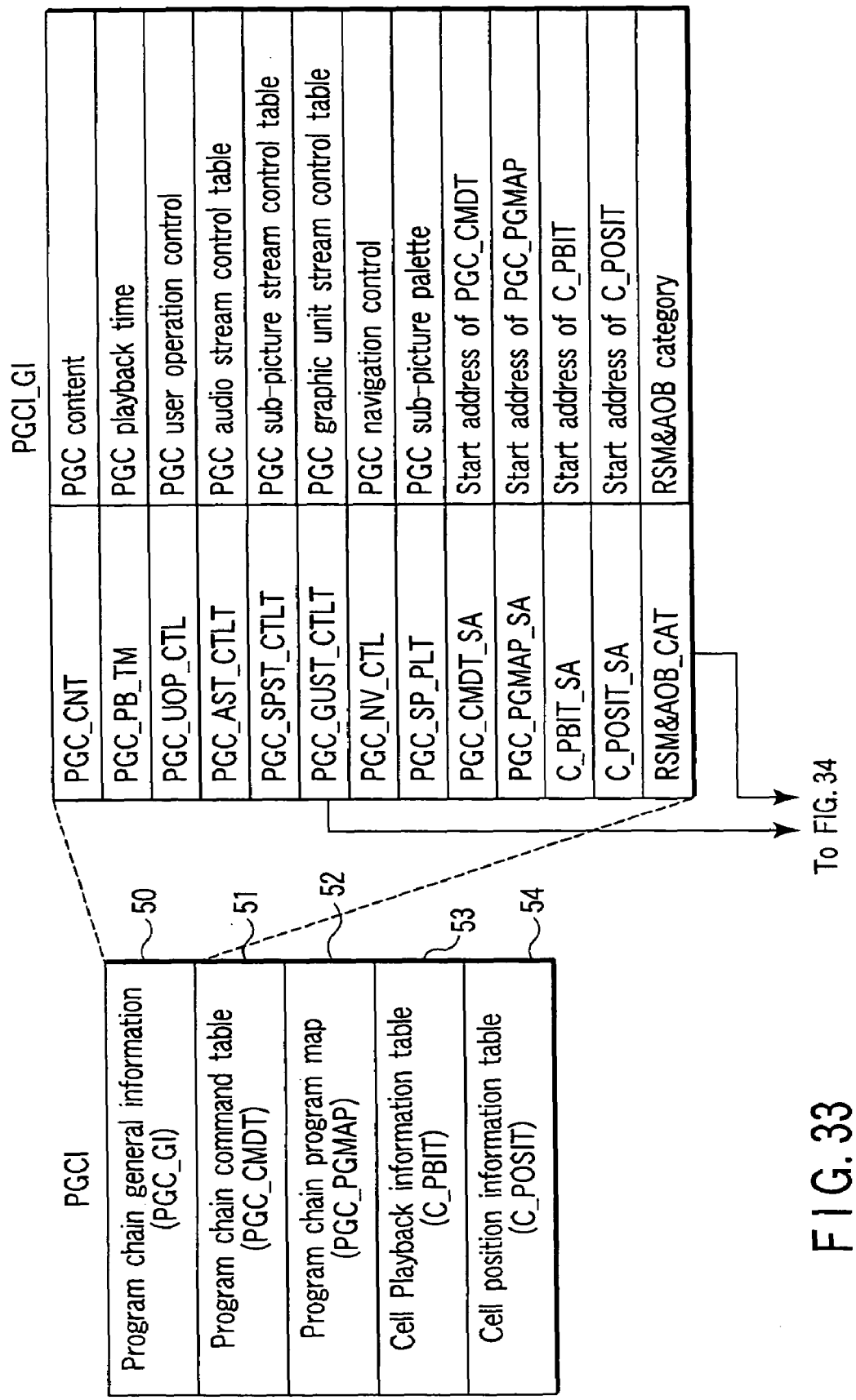
FIG. 33 is a diagram showing a data structure in program chain information PGCI.
Figure 34:
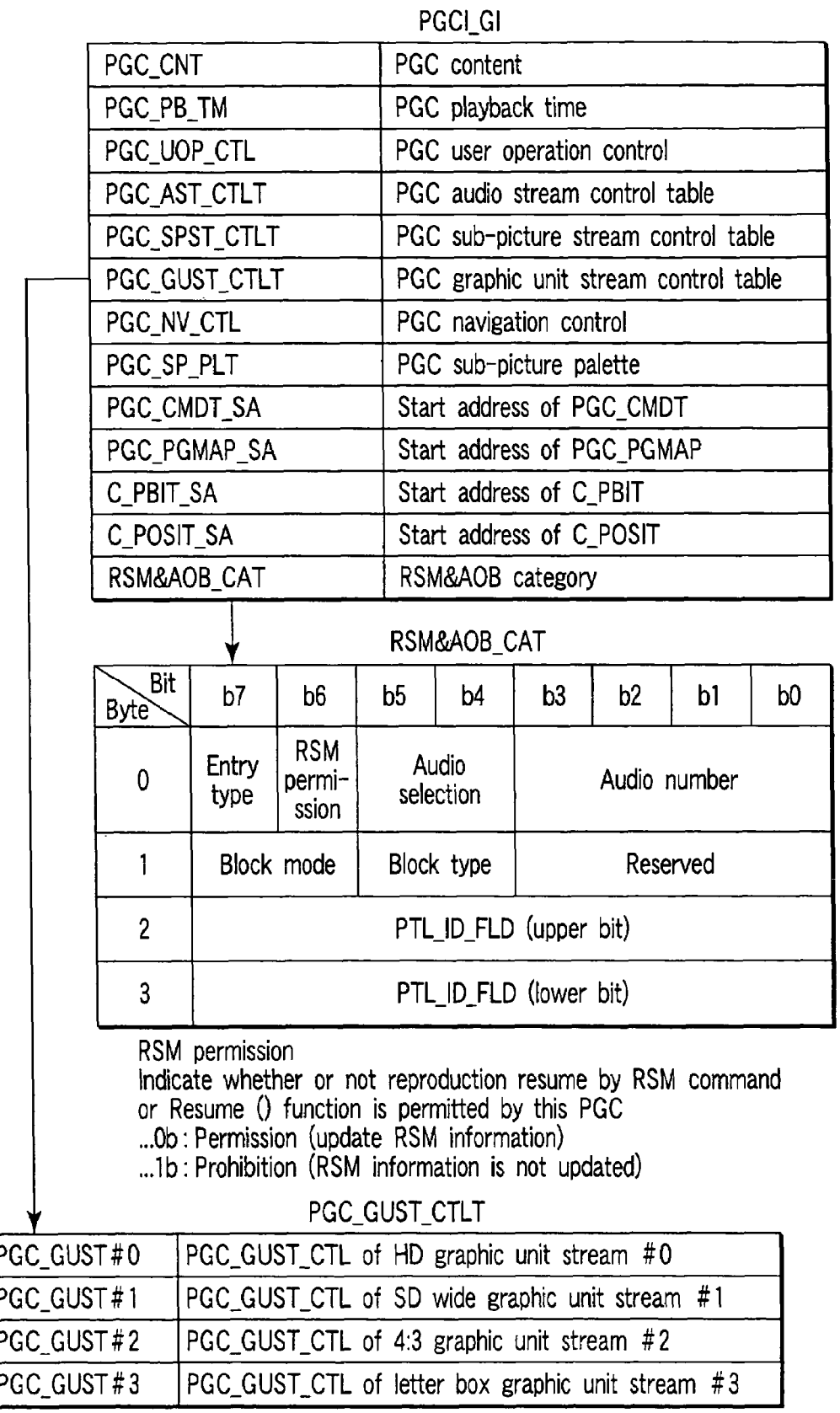
FIG. 34 is a diagram showing a data structure in program chain/general information PGCI_GI in program chain information PGCI.

Moreover, in another embodiment (second embodiment), as shown in FIGS. 33 and 34, the RSM permission flag (update permission flag of the resume information) is arranged in RSM&AOB category (RSM&AOB_CAT) in a program chain general information (PGC_GI) 50.

Moreover, in the resume sequence information indicating the command string (continuous link order of the commands) executed immediately after returning to the PGC of the title as described in [Point 4] concerning the subject matter (A) which solves the problem of (A2), as shown in FIG. 35, RSM commands (RSM_CMD) 514 are arranged as a resume (RSM) command sequence in the program chain command table (PGC_CMDT) 51. Number information RSM_CMD_Ns of the RSM commands (RSM_CMD) 514 arranged in the program chain command table (PGC_CMDT) 51 is recorded in a program chain command table information (PGC_CMDTI) 510 as shown in FIG. 36.

[Management Information Contents]

The RSM permission flag (update permission flag of the resume information) indicates whether or not the content of the resume information is updated in a stage in which the reproduction of the corresponding HDVTS_PGC is started (the resume information is successively updated in accordance with reproduction situation of the corresponding PGC). That is, when the flag is "0b", the resume information is updated. When the flag is "1b", the resume information is not updated, and a process of holding the reproduction interrupted information of HDVTS_PGC (corresponding program chain in the video title set of the present invention) reproduced before is performed.

In the specific data structure in the RSM command (RSM_CMD) 514, as shown in FIG. 36, a region "for eight bytes" is allocated to each command, and the command content is recorded in the region "for eight bytes".

(B) Language Setting for Display

[Point 1]

To solve the problem described in (B1), a screen in which a menu description language code can be set in the content is provided. Specifically, the setting of the menu description language code is allowed to be possible with first play PGC (FP_PGC) which can be first displayed immediately after the insertion of the information storage medium. To deal with the content capable of setting the menu description language code in the selection on the screen by the user, FP_PGC is set to have a video object (VOB), and this VOB is assumed to be usable only in a language selection menu. When the content supports only a language or when the content automatically takes over the value of the current menu description language code, FP_PGC does not have the VOB for the menu screen in some case. In an example of the content which automatically takes over the value of the menu description language code, there is an embodiment in which the value of SPRM(0) owned by the information reproduction device is automatically compared with the language supported by the HD DVD video content, and the menu description language code is adapted to the value in case of agreement. In this case, the resume sequence information which is a command process sequence to be automatically compared is recorded in first play program chain information (FP_PGCI: FIG. 4) which is management information on FP_PGC.

Furthermore, as a restrictive condition on the FP_PGC, a structure capable of holding one or less cell is constituted (one cell is defined when there is VOB; when the content which does not have a screen for selecting the menu description language code do not have any VOB, any cell is not included in FP_PGC). This FP_PGC permits only sequential reproduction of the program, and a parental block structure or a multi-scene structure is prohibited. Furthermore, the use of only one audio stream (one or zero) is permitted as a usable stream in the FP_PGC, further the use of sub-picture stream is prohibited, and, instead, the use of the graphic unit GU described later is introduced.

Therefore, in the embodiment of the present invention, screens for selecting the menu description language code do not have to be prepared in accordance with a plurality of menu description language codes, and an authoring operation at the time of preparation of the content is simplified. As a result, since an authoring operation time is shortened, the selling prices of the content can be reduced.

[Point 2]

To solve the problem described in (B1), a new SetM_LCD command is defined as described later. The value of SPRM(0) can be changed by this SetM_LCD command. This SetM_LCD command is included in the command region of SetSystem as described later, and is usable only in FP_PGC. As a specific command content, the value of SPRM(0) is set as a language code by a general parameter or a specific value which can be designated in SetM_LCD.

[Point 3]

To solve the problem described in (B2), as shown in FIG. 44, SPRM(21) is newly set as a place where only the use can change/set the language code and the changing by the command is impossible, so that the menu description language code set by the user can be held. Moreover, the meaning of SPRM(0) which has heretofore existed is changed a little. That is, the SPRM(21) is newly defined as a storage place of an initial menu language which is a parameter set to the information reproduction device. This SPRM(21) is a player setting language which can be changed/set only by the user, and cannot be changed by the command in the program of the content.

Moreover, the meaning of SPRM(0) is changed to a storage place of "current menu language being reproduced". This SPRM(0) can be changed/set both by the user and by the command in the content. As a result, even when SPRM(0) is changed by the command described in (B2), the menu description language code set by the user can be held, and any discomfort or excessive burden is not applied to the user.

[Concrete Description of Relation between SPRM(0) and SPRM(21)]

To describe a relation between SPRM(0) and SPRM(21), an example of the operation immediately after the insertion of the information storage medium into the information reproduction device (player) will be described. First, the value of the initial setting menu language SPRM(21) which is the menu description language code set to the information reproduction device by the user is copied to SPRM(0) before executing the process of the first play PGC (FP_PGC).

When the SetM_LCD command exists in FP_PGC, the value of SPRM(0) can be changed in accordance with the command, but in order to avoid the problem of (B2), the value copied from SPRM(21) is preferably held as the value of SPRM(0). If SPRM(0) is rewritten into a value different from that of SPRM(21) by the SetM_LCD command in the content recorded in the information storage medium, the value of SPRM(21) is held. Therefore, when another information storage medium is next inserted, the value of SPRM(0) is automatically rewritten to that of SPRM(21). Therefore, after the next information storage medium is inserted, the problem of (B2) is avoidable. For example, when VOB for the menu does not exist in FP_PGC, and exists in an HD video manager menu language unit (HDVMGM_LU) 312c shown in the language selection menu in FIG. 6, the HD video manager menu language unit (HDVMGM_LU) 312c corresponding to the value of the SPRM(0) is selected. The value of SPRM(21) is persistently changeable only by the user in a stage in which the operation of the information reproduction device is stopped. However, even when the value of SPRM(21) is rewritten by the user, the value of SPRM(0) is not simultaneously rewritten, and the conventional value is held.

[Parameter Information Recording Place in Information Reproduction Device]

Regions in which system parameters SPRM "0" to "21" are stored as shown in FIG. 44 are allocated into the memory 122 in a system block diagram in the information reproduction device shown in FIG. 39. The current menu language code information being reproduced is recorded in the SPRM(0), and the initial setting menu language code information is recorded in the SPRM(21).

[Object Information Recording Place]

Figure 1:
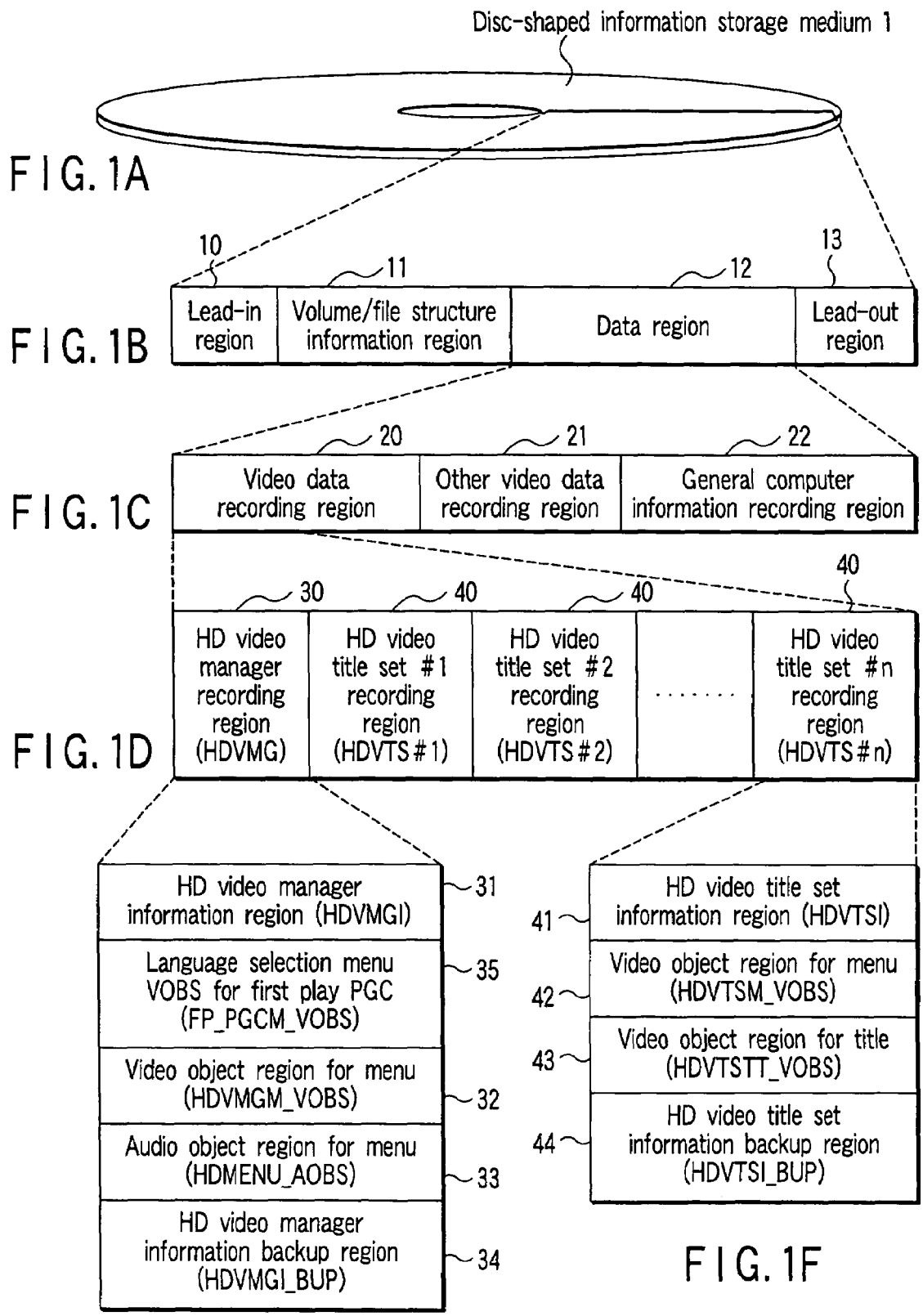
FIGS. 1A, 1B, 1C, 1D, 1E, and 1F show contents of information recorded in a disc-shaped information storage medium 1 in an embodiment of the present invention.
Figure 2:
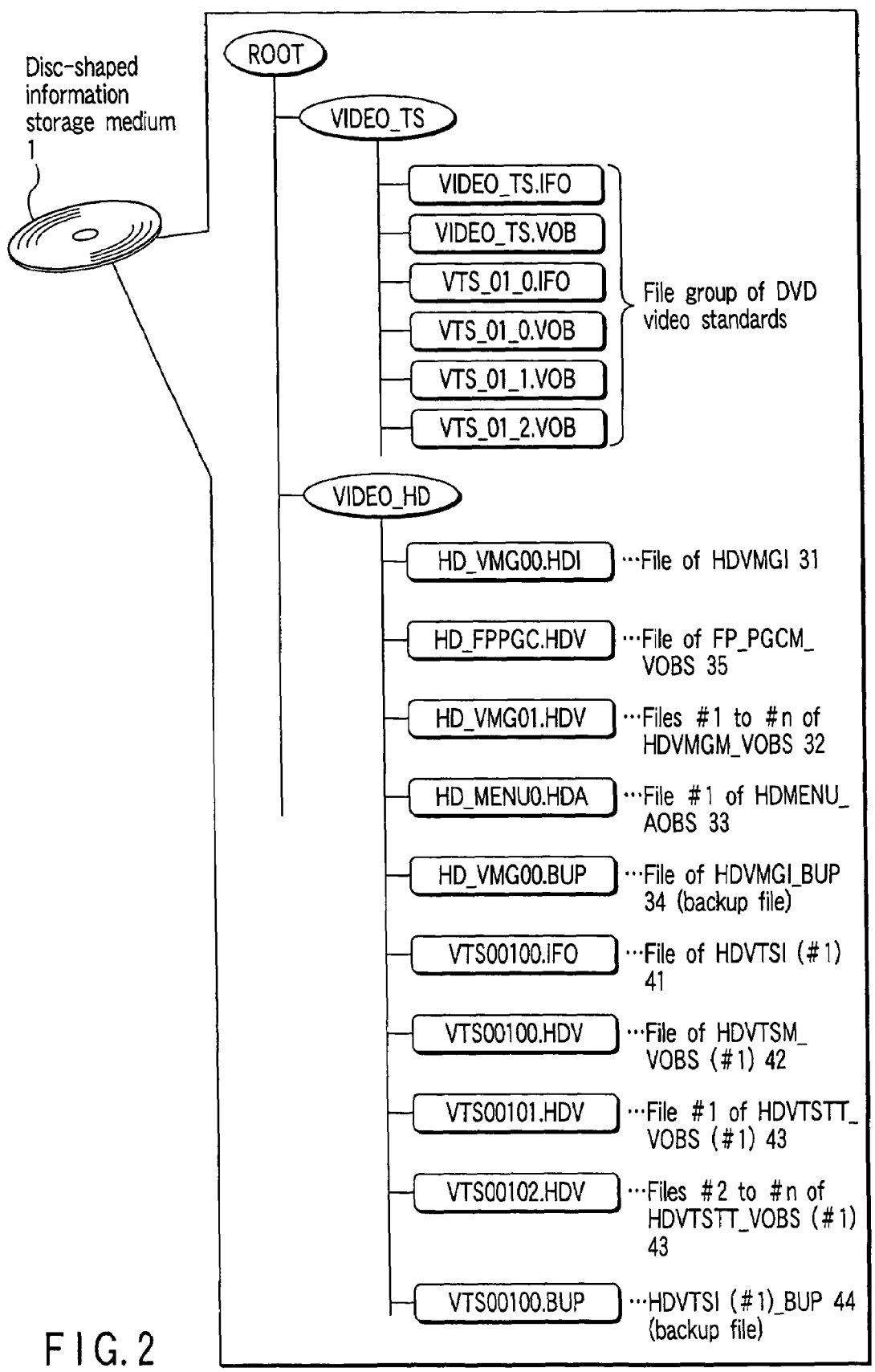
FIG. 2 is a diagram showing a file system of a conventional SD DVD video content.

As shown in FIG. 1E, a screen in which the menu description language code can be set is recorded in the region of a language selection menu VOBS for first play PGC (FP_PGC-M_VOBS) 35. This object information (video data) is independent as a single file named HD_FPPGC.HDV as shown in FIG. 2.

[Management Information Recording Place]

As shown in FIG. 4, management information with respect to the language selection menu in which the menu description language code can be set is recorded in first play PGCI (FP_PGCI) in an HD video manager information management table (HDVMGI_MAT) 310.

[2] Place Where a Content Representing Power to the User is Lacking (C) Seamless Reproduction of Still Picture [Point 1]

Seamless connection between moving pictures is assured even in the conventional DVD content. Therefore, to solve the problems described in the above (C1) and (C2), even in the video object set (VOBS) in which the still picture is recorded, the contents of VOB are defined by the same image as those of VOBS in which the moving picture is recorded. Accordingly, the seamless connection (C1) from the still picture to the moving picture in the same manner as in the seamless connection between the conventional moving pictures and the multi-angle reproduction (C2) of the still picture can be assured.

[Point 2]

A concrete method for realizing a way of thinking in [Point 1] will be described hereinafter. To apply an extended system target decoder (E-STD) which assures the seamless reproduction, an "imaginary access unit" is set in a period between I pictures in which the still picture is recorded. In a method of setting the access unit, in the embodiment of the present invention, an interval between I picture and the next I picture to start the still picture by a unit of a period of a video frame or a period integer times the period of the video frame is imaginarily and finely time-divided for each period of the access unit. Moreover, the information reproduction device is imaginarily regarded as a device in which the still picture is repeatedly reproduced/displayed for each imaginary access unit. A decoding time stamp (DTS) indicating a timing at which the still picture is input into a decoder and a presentation time stamp (PTS) indicating a timing at which the still picture is displayed are set beforehand for each still picture. A video frame period is determined by a national television system committee (NTSC) system and a phase alternation by line (PAL) system, and therefore the timing of a boundary position of the "imaginary access unit" can be easily calculated. The problem of (C1) is solved even with respect to the still picture by setting the access unit. That is, the values of STC set in a separation unit 103, video decoder unit 111, sub-picture decoder unit 112, and audio decoder unit 114 shown in FIG. 39 are switched in the boundary position of the access unit to make possible the seamless connection reproduction to the moving picture from the still picture.

When the seamless reproduction/connection to the moving picture from the still picture is assured, the user can comfortably enjoy the content, and further the representing power of the content provider to the user is enhanced. Moreover, the seamless connection/display to the moving picture from the still picture is possible only by the change in an imaginary definition without substantially changing the object structure of the conventional DVD video. Therefore, a most part of an authoring tool of the conventional DVD video is usable, and a rise in medium price in producing the present invention can be minimized.

[Point 3]

As one of the points for solving the problem of (C1), definition (restriction) with respect to the VOBU including the still picture is modified in accordance with the contents of [Point 2] as follows. That is, as shown in FIGS. 41A, 41B, 41C, 41D, and 41E, an integer number of "imaginary access units" are imaginarily set so as to constitute one VOBU. As a result, a display period of the VOBU of each still picture is integer times that of the video frame. Since the switching timing to the moving picture from the still picture surely coincides with a boundary timing of the video frame by the above-described definition (restriction), the screen can be prevented from being disturbed at the switching time (the frame with a filled gap can be displayed instead of interleaved field display), and the screen immediately before/after the switching can be clearly displayed.

In FIGS. 41A, 41B, 41C, 41D, and 41E, since one I picture indicating the still picture exists in a video access unit (VAU), and an imaginary video access unit (IVAU) does not include any I picture, any video data does not exist in the IVAU. Only one I picture exists in each of the VOBU comprising VAU1 to IVAU15 and the VOBU comprising VAU16 to IVAU30 in FIGS. 41A, 41B, 41C, 41D, and 41E. In the embodiment of the present invention, a plurality of I pictures are prohibited from being included in the same VOBU, and it is defined (restricted) that one VOBU should surely have one or less I picture. Since the sequence end code is arranged after the I picture in conformity to the standards of MPEG2, it is defined (restricted) that the VOBU including the I picture in this manner should surely have one sequence end code (i.e., both the I picture and the sequence end code are surely included in the same VOBU without separating the picture and the code into separate VOBUs).

Moreover, the same VOBU has a structure in which VAU is surely (imaginarily) arranged before IVAU. By the structure in which VAU is (imaginarily) arranged in the start position of the VOBU, when the moving picture is switched to the still picture, it is possible to decode the I picture in the VAU at a high rate, and the seamless reproduction to the still picture from the moving picture is possible.

In FIGS. 41A, 41B, 41C, 41D, and 41E, any video data (I picture) is not included in the VOBU comprising IVAU30 to IVAU45. It is also possible to define the VOB in which any video data is not held.

[Point 4]

As means for solving the problem of (C2), the IVAU is imaginarily defined with respect to a still picture object, and it is further possible to dispose still picture data (still picture object) into an interleaved unit (ILVU) by the following method. That is, a restriction that "the sequence end code is prohibited from being arranged in the video data in the cell constituting the interleaved block (ILVB)" in the current DVD video as described in (C2) is relaxed. Moreover, when the VOB is used in ILVU, the reproduction period in one VOBU is set to be integer times that of the video frame with respect to the VOB including one or more sequence end codes, and a restriction is imposed that each VOBU has only one I picture as the video data or is structured not to have any video data. Furthermore, one sequence end code is arranged in the VOBU including the I picture, and the video data (I picture in which the still picture is recorded) is surely arranged in the first VOBU in ILVU. Immediately after the angle is switched by user instruction or the like, the start position of the ILVU having the corresponding angle is surely accessed. Therefore, when the video data is surely arranged in the first VOBU of ILVU, a time can be shortened until the display of the still picture at the angle switching time.

[Object Information Recording Place]

The still picture data in which the imaginary access unit is defined is recorded in a video object region for title (HDVT-STT_VOBS) 43 in FIG. 1F. This region constitutes a VTS00102.HDV file of FIG. 2.

[Management Information Recording Place]

The management information to manage the still picture data in which the imaginary access unit is defined exists in an HD video title set information region (HDVTSI) 41 of FIG. 1F, and this region is integrated in a VTGS00100.IFO file of FIG. 2. As described above, since the period of the access unit is imaginarily and finely time-divided and imaginarily set by the unit of the period of the video frame or the period integer times that of the video frame, an actual boundary position of the imaginary access unit is calculated.

(D) Seamless Reproduction of Cell including Cell Command

[Point 1]

The seamless reproduction between the cells having cell commands is not assured in the conventional SD DVD video, whereas the seamless reproduction between the cells is assured even with respect to the cells which execute the cell commands in a case where there is not any branching point as in multi-angle. That is, the video reproduction of the next cell is started as continuously as possible as long as there is not any branching point as in the multi-angle in the video reproduction (even when the cell command is executed). As means for realizing this reproduction, a physical arrangement of contents or the like is devised in such a manner that the reproduction of the next cell can be started within 0.5 second after completion of the reproduction of the previous cell.

[Point 2]

Moreover, the following is clearly described in the management information of the object (video data) concerning a place where the seamless reproduction between the cells is assured with respect to the cell in which the cell command is to be executed. Although not shown, a seamless reproduction flag, interleaved arrangement flag, STC discontinuous flag, and cell reproduction mod information exist in cell category information (C_CAT) in cell playback information (C_PBI) 530 shown in FIG. 38.

Even with respect to the cell in which the cell command is to be executed, concerning a place where the seamless reproduction between the cells is assured, it is set with respect to the seamless reproduction flag that "the cell should be seamlessly reproduced", it is set with respect to the interleaved arrangement flag that "the flag exists in a continuous block", it is set with respect to the STC discontinuous flag that "the resetting of STC is unnecessary", and "continuous reproduction" is set to the cell reproduction mode.

[Point 3]

Figure 38:
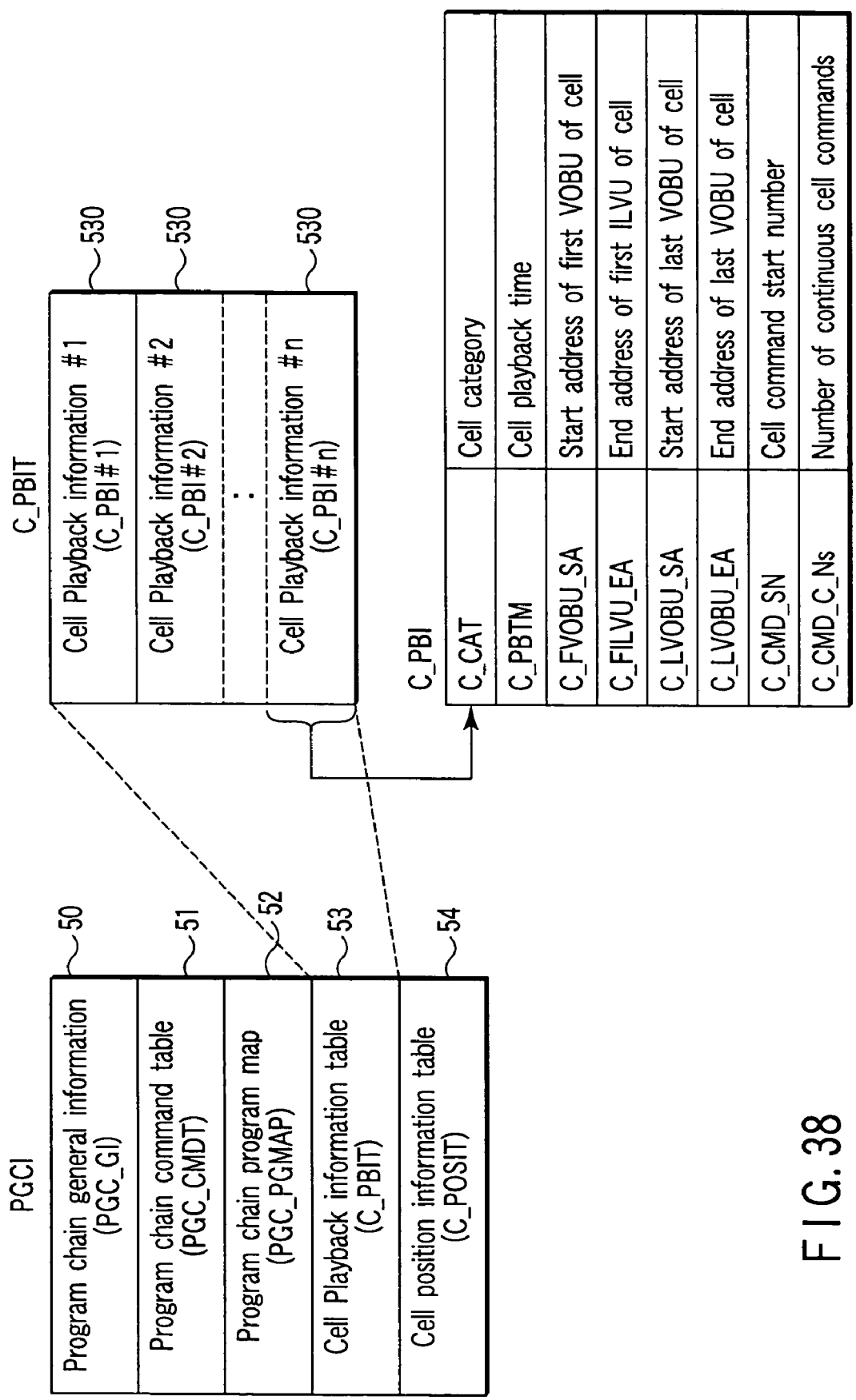
FIG. 38 is a diagram showing a data structure in a cell/Playback information table C_PBIT arranged in the program chain information PGCI.

In the conventional SD DVD video, one command is selected and executed from a set of cell commands at the end of the reproduction of each cell. However, the restriction is abolished, and the execution of the cell command is not necessarily limited to the execution at the end of the reproduction of the cell. The execution of the cell command with respect to the cell is not limited to one command, and a plurality of commands can be sequentially executed. That is, as shown in FIG. 38, cell command start number information (C_CMD_SN) and cell command continuous number information (C_CMD_C_Ns) are arranged in cell playback information (C_PBI) of the management information with respect to one cell in the HD DVD video.

As shown in FIG. 35, cell commands (C_CMD) 513 are sequentially arranged in the program chain command table (PGC_CMDT) 51. The cell command start number information (C_CMD_SN) indicates the number of the cell command to be executed from the top of the string of arranged cell commands (C_CMD) 513, and the cell command continuous number information (C_CMD_C_Ns) indicates the number of commands which are sequentially and continuously executed from the command.

(E) Measure against Unmatched Highlight Information and Sub-Picture

[Point 1]

To solve the problem of (E1), an independent stream "graphic unit" is newly defined, both the highlight information and the graphic data (heretofore arranged in the "subpicture") are simultaneously arranged in the graphic unit, and the sub-picture information is separated. Accordingly, as described in the above (E1), a content maker can prepare the content as imaged without being influenced by the display period of the sub-picture information, a degree of freedom is enhanced, and, as a result, variety of contents can be presented to the user.

Moreover, five types of graphic units can be set in accordance with 16:9 HD image, 16:9 SD image, 4:3 SD image, letter boxed SD image, and pan scan SD image, and five types of sub-stream IDs can also be set for the respective types.

The highlight information is recorded in PCI recording region in the navigation pack in the conventional SD DVD video content, whereas the recording position of the highlight information is shifted into the graphic unit and 24 buttons at maximum can be simultaneously set in one screen in the HD DVD video content of the present invention. With respect to each button, 256 colors at maximum can be designated, it is possible to change the color by the highlight at the selection time. Furthermore, mixing of contrasts up to 256 gradations can also be represented.

[Point 2]

To solve the problem described in (E2), instead of increasing the number of colors with respect to the conventional sub-picture stream, the number of usable colors is set to 256 (color representation by eight bits) with respect to the graphic data in the "graphic unit". As a result, it is possible to display a graphic unit image having bright colors to the user, a display impact to the user is enhanced, and the user can easily select the menu.

[Point 3]

To solve the problem described in (E3), the graphic data and mask data are arranged in the "graphic unit", display patterns of both the data can be set in a bit map form, and accordingly an optional shape can be set. As a result, it is possible to prepare a star-shaped or elliptic highlight information designated region (optional button shape), and there can be provided a screen much more attractive than that of the DVD content of the conventional SD.

[Point 4]

To solve the problem described in (E4), the mask data is arranged in the "graphic unit", and it is possible to simultaneously set a plurality of regions (hot spots) apart from one another in the screen as the mask data. That is, masking data can be superposed upon and set to the respective buttons of the highlight information. As a result, there can be provided a menu screen which is not inferior to the PC screen including the same URL settable with respect to a plurality of regions apart from one another in the screen or to the homepage screen of internet and which is easy to use by the user.

[Object Information Recording Place]

The graphic units can be recorded in the following four places.

(1) The information is integrated in an HD_FPPGC.HDV file of FIG. 2 in a region of language selection menu VOBS for first play PGC (FP_PGCM_VOBS) 35 of FIG. 1E.

(2) The information is integrated in an HD_VMG01.HDV file of FIG. 2 in the HD menu video object region (HDVMGM_VOBS) 32 of FIG. 1E.

(3) The information is integrated in a VTS00100.HDV file of FIG. 2 in the HD menu video object region (HDVTSM_VOBS) 42 of FIG. 1F.

(4) The information is integrated in a VTS00101.HDV or VTS00102.HDV file of FIG. 2 in the video object region for title (HDVTSTT_VOBS) 43 of FIG. 1F.

[Data Structure in Object Information]

As shown in FIG. 45D, four types of streams are separately recorded in accordance with the 16:9 HD image, 16:9 SD image, 4:3 SD image, and letter boxed SD image.

Figure 46:
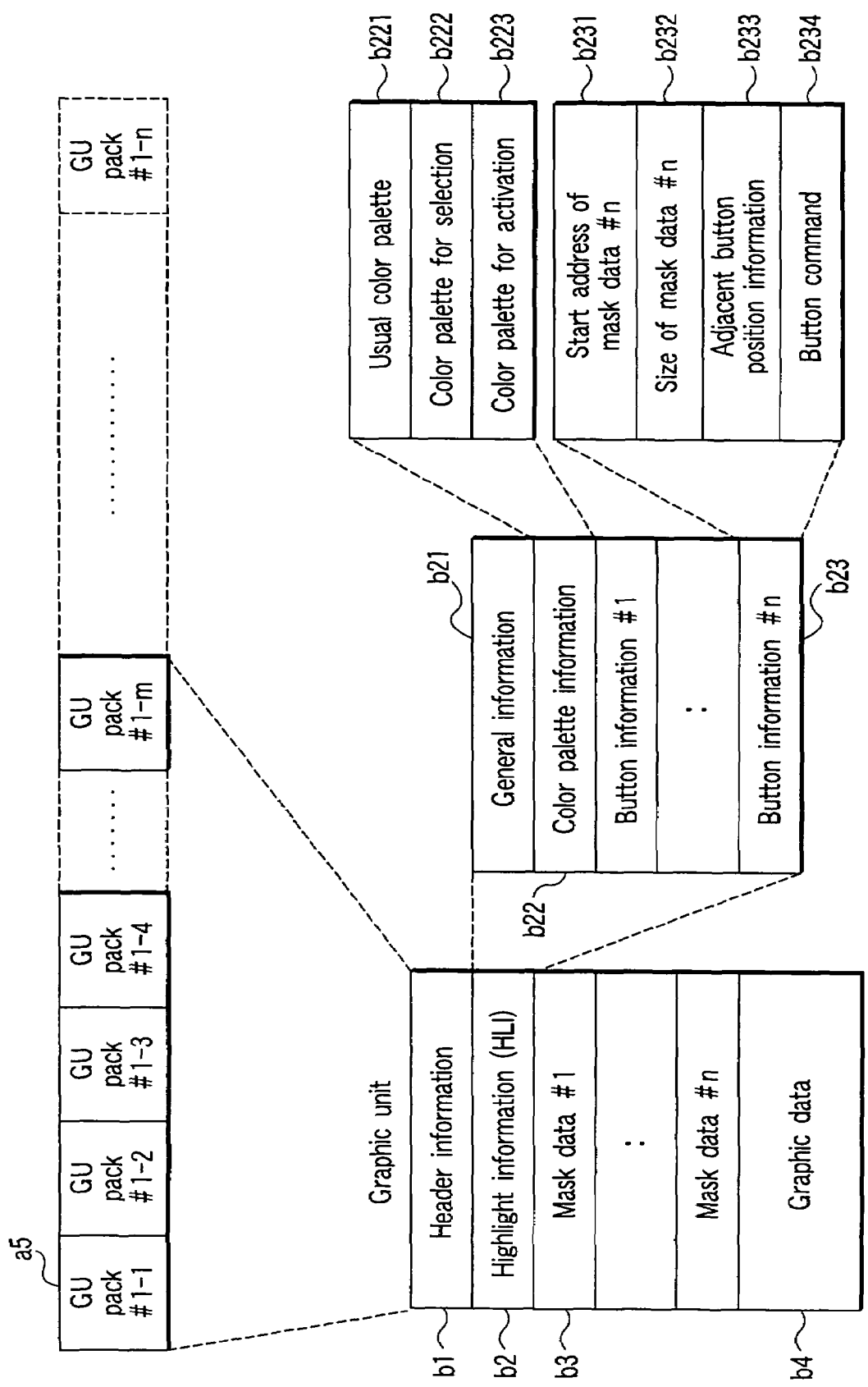
FIG. 46 is a diagram showing a data structure in the graphic unit.

Moreover, as shown in FIG. 46, the graphic unit GU comprises highlight information (HIL) b2, mask data b3, and graphic data b4.

[Management Information Recording Place]

The control information on the structure of the graphic units to be arranged in the PGC is arranged in PGC graphic unit structure control table (PGC_GUST_CTLT) of FIGS. 33 and 34.

[Management Information Contents]

As the management information on the graphic unit included in the menu of the HD video manager, HDVMGM graphic unit stream number information (HDVMGM_GUST_Ns) and HDVMGM graphic unit stream attribute information (HDVMGM_GUST_ATR) are arranged in the HD video manager information management table (HDVMGI_MAT) 310 as shown in FIG. 4.

Moreover, as shown in FIG. 21, in the management information on the graphic unit included in the HD video title set (HDVTS), graphic unit stream number information and attribute information are divided into the menu screen and title (display video) in HDVTS, and are recorded as information of HDVTSM_GUST_Ns, HDVTSM_GUST_ATR, HDVTS_GUST_Ns, and HDVTS_GUST_ATRT.

The information in a PGC graphic unit stream control table (PGC_GUST_CTLT) in which the control information on the stream of the graphic units to be arranged in the PGC is recorded is recorded in separate regions in accordance with four types of images (16:9 HD image, 16:9 SD image, 4:3 SD image, and letter boxed SD image) as shown in FIGS. 33 and 34.

(F) Audio Data Reproduction at Menu Screen Switching Display Time

[Point 1]

To solve the problem described in (F), a unique audio data storage place is set in accordance with the menu. The reproduction/display of the unique audio data is started simultaneously at a reproduction start time of the PGC in which the menu is displayed. The reproduction/display of the audio data is stopped simultaneously with the start of the reproduction of PGC (e.g., of VTS) which does not require the reproduction of the audio data, for example, with the completion of the display of a series of menu. The audio data is copied in the memory 122 of FIG. 39 before the menu is displayed, and the audio data copied in the memory 122 is continuously and repeatedly reproduced for a period for which the user shifts and displays the menu. A maximum capacity of the audio data which can be copied in the memory 122 is set to 8 MB. When a transfer rate of compressed audio data is, for example, 384 Kbps, it is possible to store the audio data for 2.5 minutes with the maximum capacity of 8 MB.

[Point 2]

Selection designation information of the audio data is arranged in PGCI which is the management information of PGC so as to make possible selective reproduction instruction between the audio data recorded in VOBS for video present in the DVD video for the conventional SD and the above-described unique audio data. As a result, the content provider can designate the selection of the audio data continuously displayed even with the switching of the menu or the audio data set to be optimum for each menu, and the representing power of the content provider to the user is enhanced.

[Object Information Recording Place]

Figure 19:
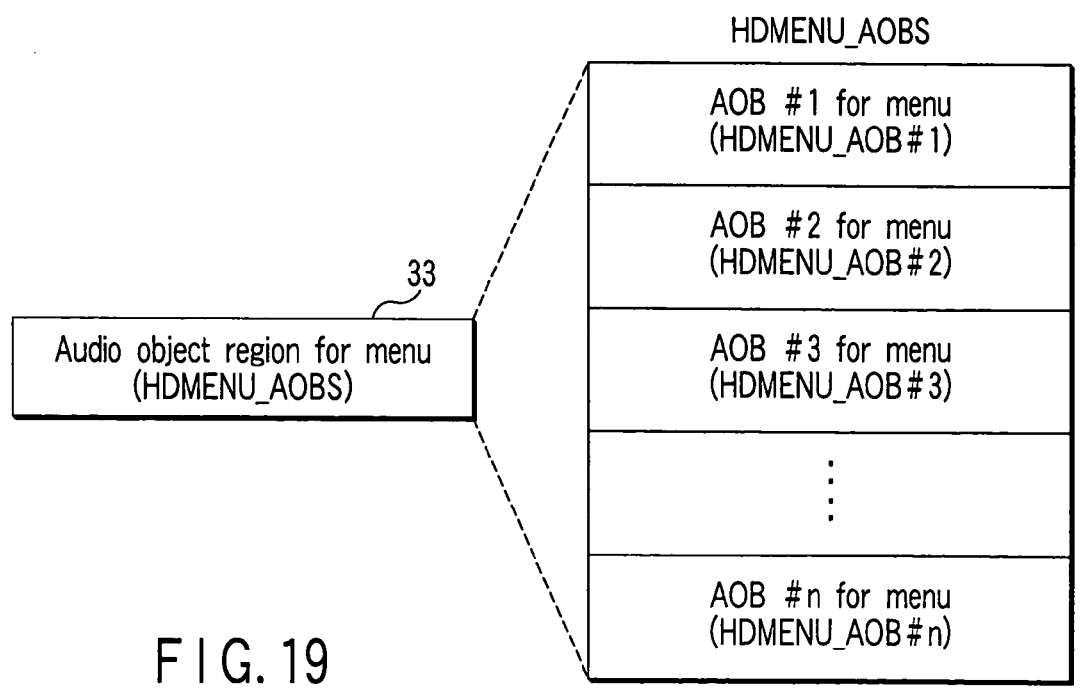
FIG. 19 is a diagram showing a data structure in an audio object region (HDMENU_AOBS) for HD menu.

As shown in FIG. 1E, a HD menu audio object region (HDMENU_AOBS) 33 in which audio information to be output in parallel with menu display is recorded is newly arranged in an HD video manager recording region 30. A recording place of the HD menu audio object region 33 in a file structure is an HD_MENUO.HDA file which is a unique file in a common directory (folder) of VIDEO_HD as shown in FIG. 2. In the embodiment of the present invention, it is possible to record a plurality of types of menu audio objects (audio data) in the information storage medium. Menu audio objects (AOB) are arranged/recorded in order in the HD menu audio object region (HDMENU_AOBS) 33 as shown in FIG. 19.

[Management Information Recording Place]

Figure 3:
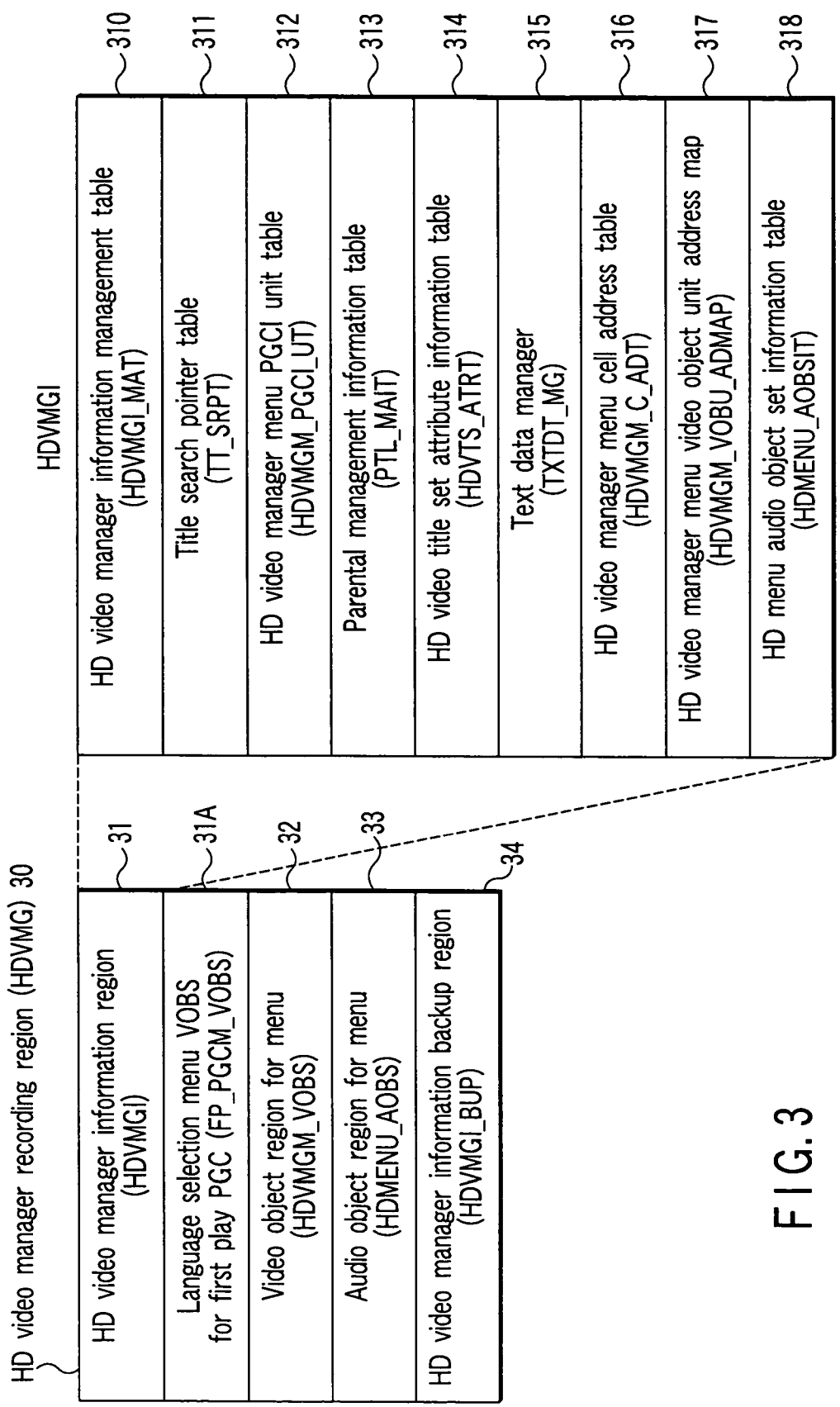
FIG. 3 is a diagram showing a data structure in an HD video manager information region (HDVMGI) 31 shown in FIG. 1E.

Management data with respect to the object of the HD menu audio object region (HDMENU_AOBS) 33 is recorded in an HD menu audio object set information table (HD-MENU_AOBSIT) 318 in the HD video manager information region (HDVMGI) 31 as shown in FIG. 3.

Figure 7:
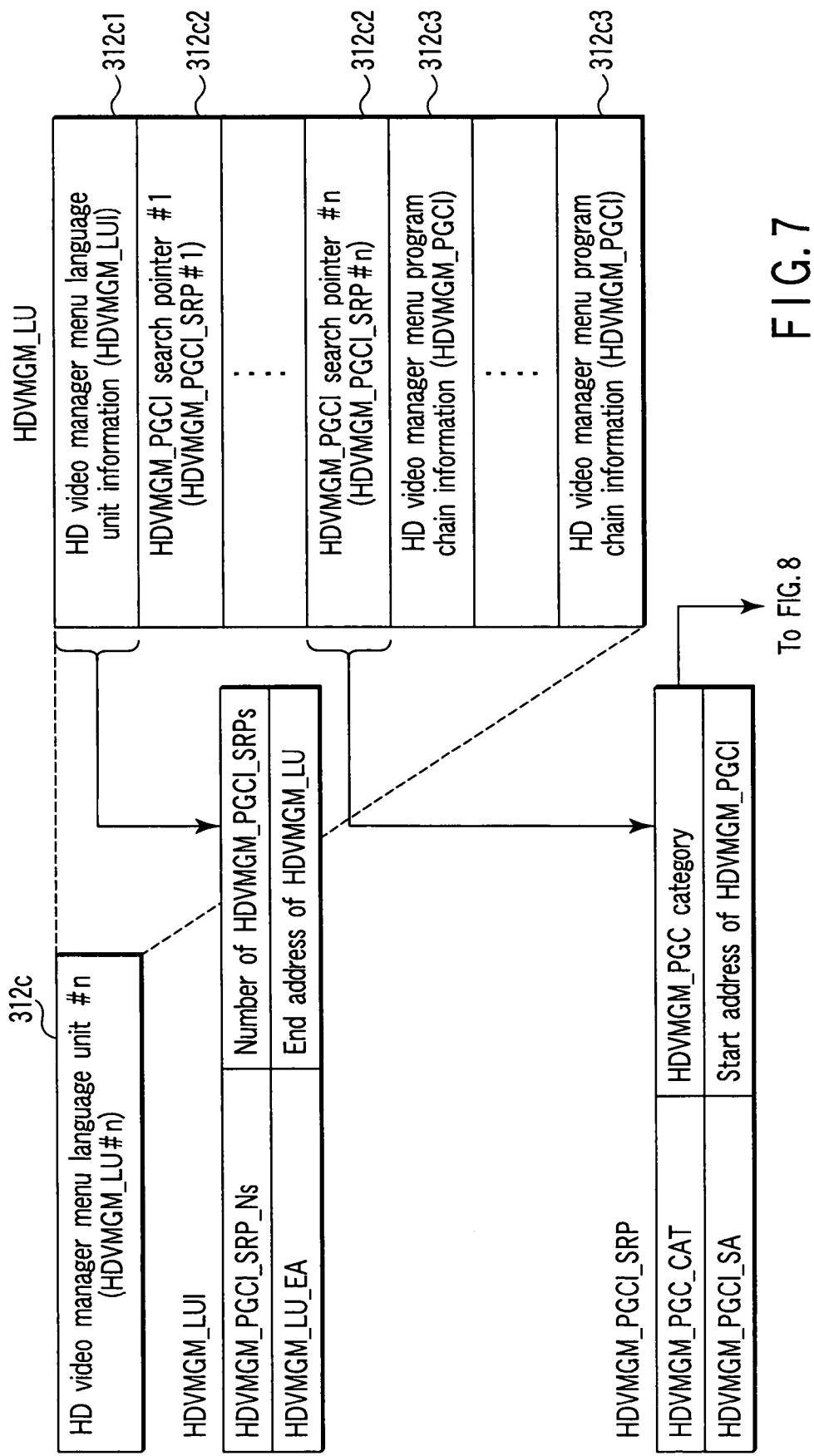
FIG. 7 is a diagram showing a data structure in an HD video manager menu language unit #n (HDVMGM_LU #n) 312*c* (FIG. 6) recorded in the HD video manager menu PGCI (HDVMGM_PGCI_UT) 312 shown in FIG. 3.
Figure 26:
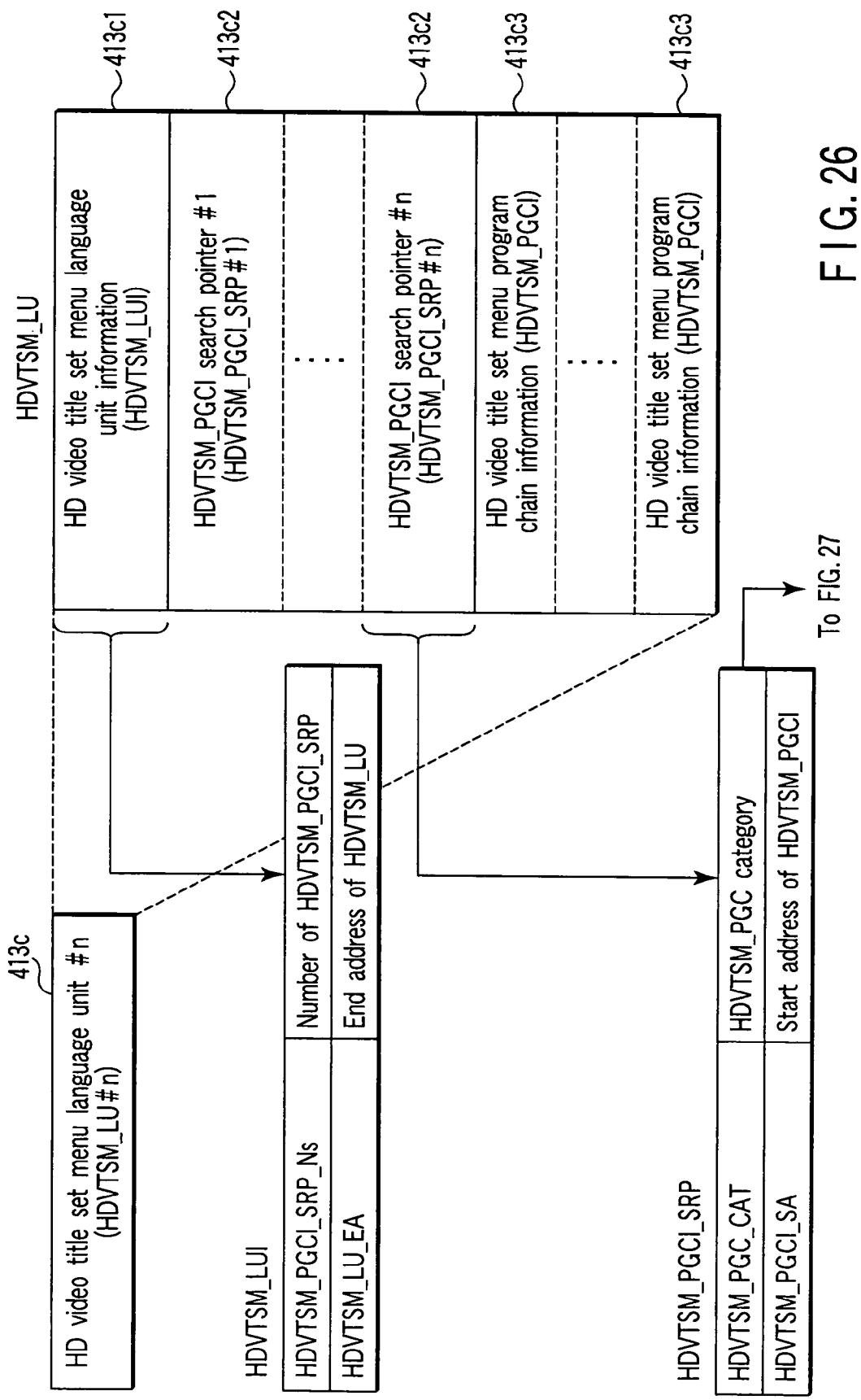
FIG. 26 is a diagram showing a data structure in an HD video title set menu/language unit (HDVTSM_LU) 413c shown in FIG. 25.

Moreover, in a place where information for referring to (designating) HD menu AOB (HDMENU_AOB) is set with respect to the whole menu in the embodiment of the present invention, as shown in FIG. 7, the information is arranged in HDVMGM_PGC category information (HDVMGM_PGC_CAT) in an HDVMGM_PGCI search pointer #n (HDVMGM_PGCI_SRP #n) 312c2 in an HD video manager menu language unit 312c. Concerning the menu by an HDVTS unit, as shown in FIG. 26, the information is arranged in an HDVTSM_PGC category information (HDVTSM_PGC_CAT) in an HDVTS_PGCI search pointer #n (HDVTSM_PGCI_SRP #n) 413c2.

In another embodiment of the present invention, as shown in FIGS. 33 and 34, the information is arranged in an RSM&AOB category (RSM&AOB_CAT) in the program chain general information (PGC_GI) 50.

[Management Information Content]

Concerning the whole menu, as shown in FIG. 7, the followings are recorded in the HDVMGM_PGC category information (HDVMGM_PGC_CAT) in the HDVMGM_PGCI search pointer #n (HDVMGM_PGCI_SRP #n) 312c2 in the HD video manager menu language unit 312c. Concerning the menu by the HDVTS unit, as shown in FIGS. 26 and 27, the followings are recorded in the HDVTSM_PGC category information (HDVTSM_PGC_CAT) in the HDVTS_PGCI search pointer #n (HDVTSM_PGCI_SRP #n) 413c2:

(1) Audio information number designating AOB number #n to be reproduced in HDMENU_AOBS (the number of the corresponding AOB in the AOBs for the menu (HDMENU_AOB) arranged in FIG. 19); and (2) Audio information selection flag indicating selected information of audio information to be reproduced simultaneously with the screen display of the HD content menu, and start/continue/end trigger information of audio information reproduction.

Figure 17:
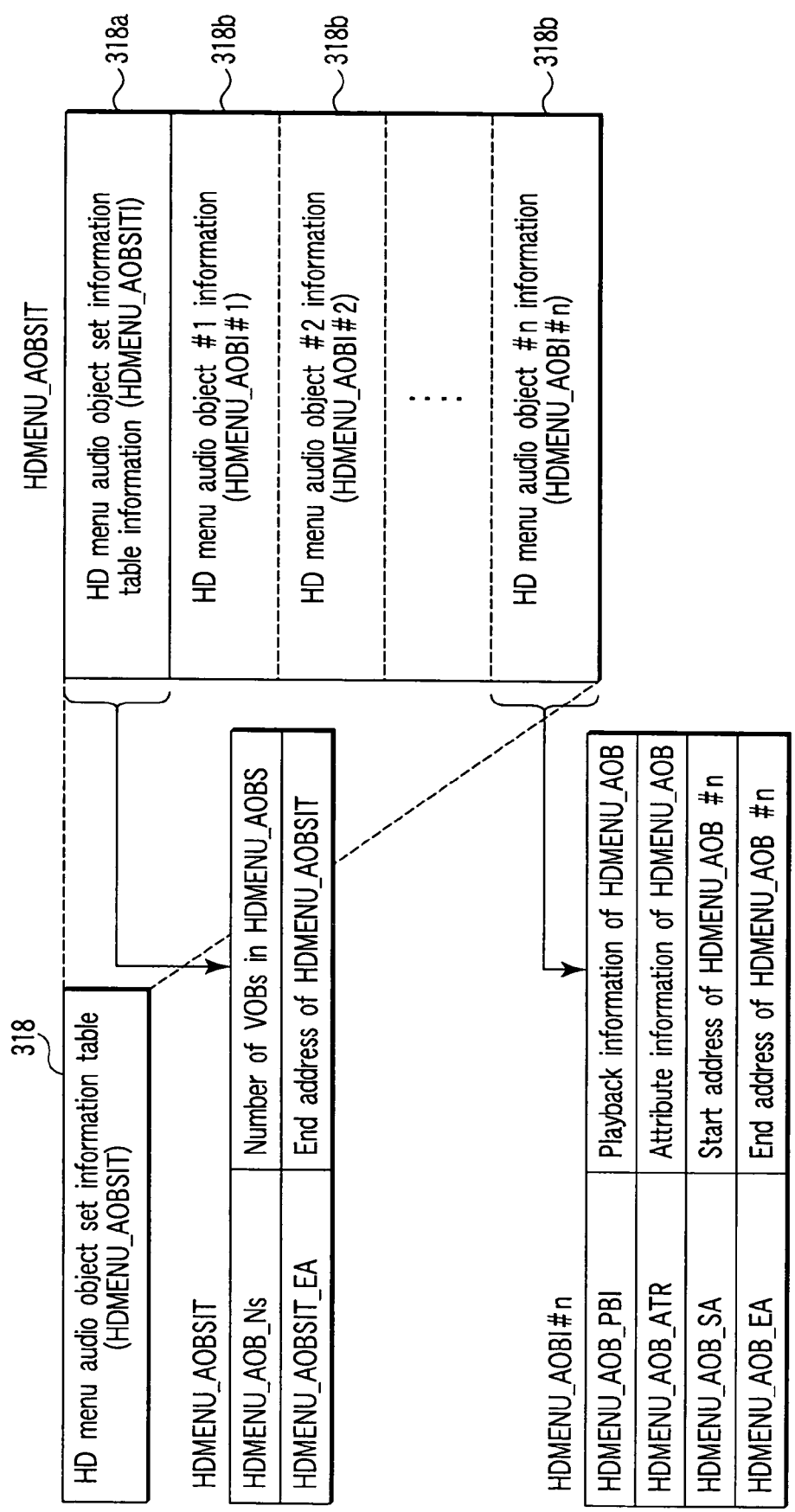
FIG. 17 is a diagram showing contents of management information with respect to AOB for HD video content menu (HDMENU_AOB)

FIGS. 7 and 24 or 33 and 34 show management information which designates the HD menu audio object to be displayed simultaneously with the display of the menu screen. Accordingly, as shown in FIG. 17, contents of management information with respect to the menu audio object comprise HD menu audio object set information table information (HDMENU_AOBSITI) 318a and HD menu audio object information (HDMENU_AOBI) 318 which are individual management information with respect to the AOBs for the menu recorded in the information storage medium.

This HDMENU_AOBI includes: HDMENU_AOB_PBI indicating playback information (playback time of music) of HDMENU_AOB; HDMENU_AOB_ATR indicating attributes (LPCM, AC-3, and the like) of the object; and HDMENU_AOB_SA, HDMENU_AOB_EA indicating a start address and an end address of HDMENU_AOB#n. An absolute or relative size of HDMENU_AOB#n is sometimes written with respect to the start or end address.

Moreover, the information of (1), (2) may also be represented by RSM&AOB_CAT in FIG. 33.

[Access Information]

As shown in FIG. 4, HDMENU_AOBS start address information (HDMENU_AOBS_SA) indicating a place where the HD menu audio object region (HDMENU_AOBS) 33 is recorded, and HDVMGM_AOB information table start address information (HDMENU_AOBSIT_SA) indicating a place where the HD menu audio object set information table (HDMENU_AOBSIT) 318 is recorded are recorded in the HD video manager information management table (HDVMGI_MAT) 310. The audio information to be output simultaneously with the menu display in the information storage medium (optical disk or HD DVD disk) is recorded in the region 33, and the management information for the audio object for the menu is recorded in the table 318.

(G) The above-described subject matters are provided, and the representing power to the user is further enhanced. Moreover, the content easy to use by the user is managed in a directory (folder) separated from a place where the conventional DVD video content is recorded as shown in FIG. 2. That is, in the conventional DVD video content, video information (video data, sub-picture data, and audio data are generically referred to as the video object) and the management data for managing the video information are integrated, arranged, and managed under the directory (folder) named VIDEO_TS.

On the other hand, in the content having the subject matters (A) to (F), the video and the management data for managing the video information are managed together in another directory (folder) named VIDEO_HD as shown in FIG. 2, and convenience of reproduction control of the information reproduction device is enhanced.

In the HD content of the present invention, the HD_MENUO.HDA file exists in which the audio information to be output simultaneously with the menu display is recorded, but the file does not exist in the conventional DVD video content.

Moreover, the information reproduction device according to the present invention includes a graphic decoder unit 113 as shown in FIG. 39, but the information reproduction device for reproducing the conventional DVD video content does not include the graphic decoder unit 113. Therefore, when the conventional DVD video content and the HD content of the present invention are mixed/reproduced, a circuit and control program for use in each content need to be switched on an information reproduction device side. When the directory (folder) is divided for each content as shown in FIG. 2, it is very easy to identify the content on the information reproduction device side. By the process of switching the circuit and control program at the time of access to the file, a switching process is smoothly performed at a high rate, when the HD and SD contents are mixed/reproduced.

<<Relation Among Subject Matters>>

In the present invention, the content easy to use by the user by simple authoring is provided by a combination of subject matters (A), (B), the content representing power to the user is further enriched by a combination of subject matters (C) to (F), and the appeal of the DVD video to the user is further enhanced.

An effect of the combination of the subject matters (A) to (F) will be concretely described in accordance with two examples.

[I] Example of a Case Where the User Selects an Optimum Language from the Menu and Thereafter Searches for a Place to see Using Another Menu After the HD DVD video disk (information storage medium) is attached to the information reproduction device of the present invention, a screen for selecting the language by the user is displayed in a first displayed screen (FP_PGC) (B). At this time, a unique shape different from a conventional rectangular shape is displayed with respect to the highlight information indicating the language to be selected by the user in the screen (E), and accordingly the user can easily select the language. For example, when the language of each country is displayed in the screen, the shape of the corresponding country on the geographical map is displayed in a display range of the highlight information, and the user can only identify the shape of the display range of the highlight information without reading the language to be selected to designate the desired language. Japan is marked in red on the terrestrial globe or global map in many cases. Therefore, 256 display colors of the graphic units are arranged (E), each language is displayed in the corresponding color (Japanese is displayed in red), and the user can only identify the color to identify the corresponding language.

Moreover, after selecting the language, the user shifts to a thumbnail (reduced image indicating a top screen designating a playback start position) list of titles, and searches for a video place to see in many cases. Even in the conventional DVD video menu, a text indicating the playback start position is displayed under the thumbnail in many cases. At this time, the user can further easily search for the place to see using the graphic unit (E). That is, the display range of the highlight information is displayed in the "star shape" in a place indicating a large pause such as a large change of scene in a video title, the inside of the star is represented in conspicuous colors such as red. A place which belongs a lower class and which indicates a skip destination is displayed by a "round mark" and is represented in light yellow or blue and can be graphically displayed so that a large pause is eliminated.

Furthermore, when the subject matter described in (F) is used, the audio information can be output continuously without being interrupted in a period of a series of operation in which "the user shifts to the thumbnail list of the titles, after selecting the language, to search for the video place to see" (even when the menu screen for the language selection switches to the title thumbnail list screen). The user can readily switch the menu.

A concrete process method for realizing the above operation in the information reproduction device shown in FIG. 39 will be described. When the HD DVD video disk (information storage medium 1) is attached to the information reproduction device, a disk drive 101 reads the HD video manager information region (HDVMGI) 31 and HD video title set information region (HDVTSI) 41 shown in FIGS. 1E and 1F which are management information to read the regions into the memory 122. Next, an MPU 121 analyzes a content temporarily stored in the memory 122 to confirm presence/absence of audio data AOB of a preload reproduction object. When the MPU 121 determines that the audio data AOB of the preload reproduction object exists, the MPU 121 controls the disk drive 101 to read the HD menu audio object information (HDMENU_AOBS) 33 shown in FIG. 1E, and the information is temporarily stored in the memory 122. Next, a menu screen for the language selection is displayed with respect to the user in accordance with the information of the first play PGCI (FP_PGCI) shown in FIG. 4. Moreover, the reproduction of the audio data AOB temporarily stored in the memory 122 is started. Next, at the time of the switching to the screen showing the thumbnail list of the titles by the user, the audio information number in HDVTSM_PGC_CAT shown in FIG. 27 coincides with the AOB number reproduced at the time of the display of the menu for the language selection. When the audio information selection flag is set to "10b" (HDMENU_AOBS is continuously reproduced), the audio data is continuously output without being influenced by the switching of the menu screen.

[II] Example of the Returning to the Video Title After Displaying the Menu Screen and Bonus Content Halfway in the Video Title Reproduction The reproduction of the multi-angle comprising a plurality of types of slide shows for continuously reproducing the still pictures by the definition of the imaginary VAU (IVAU), or the multi-angle comprising the slide show of the still pictures and the moving pictures is seamlessly performed (C). The reproduction between the cells in which the cell command is executed can be seamlessly performed (D). By a method of setting an RSM permission flag in HDVTS_PGC_CAT (setting of "0b: permission") shown, for example, in FIG. 24 which is the management information for managing the seamless reproduction, the user calls the menu screen halfway in the seamless reproduction of the above-described multi-angle or halfway in the seamless reproduction between the cells in which the cell command is executed. Thereafter, for example, when returning from the display of the bonus content such as a movie preview and a shooting spot (additionally, in a case where the RSM permission flag in HDVTS_PGC_CAT corresponding to the bonus content is set to "1b: prohibition"), it is possible to continue the seamless reproduction of the multi-angle or the seamless reproduction between the cells to execute the cell command (A). Especially, the seamless reproduction is not assured with respect to the multi-angle comprising the slide show of still pictures and the moving picture in the conventional SD DVD video standards. However, by the combination of the subject matters (A) and (C) or (A) and (D), after the screen jumps from "menu screen" →"bonus content reproduction" halfway in the multi-angle video reproduction, the screen returns to the original multi-angle video comprising the slide show of still pictures and the moving picture, and subsequently the seamless reproduction is continued. This and versatile representation modes can be realized.

Furthermore, a combination effect of these subject matters will be described in a case where the following process is performed as an example indicating versatile representation modes by a combination of these subject matters.

(1) Halfway in the display of painters' names (in sub-pictures) and continuously switching paintings with sound explanations, (2) sound language for the explanation is switched at the menu screen. Furthermore, (3) the menu screen is instructed so as to delete. the painters' names simultaneously displayed in the sub-pictures.

(4) After the reproduction of bonus video in which a specific painting is explained in detail, (5) the reproduction is continued from the painting immediately before the shifting to the menu screen.

In the conventional SD DVD video standards, when returning to the operation of (5), it is not easy to "continue the reproduction from the painting immediately before the shifting to the menu screen". When returning to the operation of (5), the user needs to turn over the paintings from the beginning. A complicated authoring process is required in a case where the forcible continuing of the reproduction from the painting just before is programmed. When (2) and (3) are performed, the continuous reproduction without interrupting the audio data is impossible in the conventional DVD video, and this is not possible until the subject matter (F) is achieved. A data structure in which the subject matters (A), (C), (D), and (F) can be simultaneously achieved is defined in the standards, accordingly the memory capacity of the memory 122 of the information reproduction device shown in FIG. 39 is set, the management method in a memory region is set, and it is possible to simultaneously achieve the subject matters (A), (C), (D), and (F). That is, at the time of the switching to the menu screen in accordance with the subject matter (A), the values of system parameters 4 (title number) to 8 (highlight button number) shown in FIG. 44 are set. Moreover, a region in the memory 122 is secured in which the corresponding cell number information, address information of the navigation pack arranged first in the corresponding cell, and information of the number of VTS are recorded, and the information is managed based on the RSM permission flag information of FIG. 24. A place where the data for the interleave unit (ILVU) corresponding to the imaginary video access unit IVAU can be recorded is secured in the memory 122 in order to execute (C) in parallel. A storage region of (preload) audio data to be temporarily stored beforehand is allocated into the memory 122 in such a manner that (F) can be achieved, and the allocated region is managed based on audio information selection and audio information number shown in FIGS. 8 and 27. In the information reproduction device in the embodiment of the present invention, the memory 122 is managed in this manner, and simultaneous achievement of the subject matters (A), (C), (D), and (F) is made possible.

Moreover, the subject matter (E) is used in the stage of the operation of the subject matters (2) and (3), 256 colors are represented, and the display contour of the highlight information is constituted in a unique shape (other than the rectangular shape), so that the user can easily see and select the selection menu (this has been impossible in the conventional DVD video standards). By combining the subject matter (F), further comfort can be presented to the user.

Moreover, in the embodiment of the present invention, the sub-picture stream is prohibited from being arranged in FP_PGC, and instead the use of the graphic unit is defined. The 256 color representation in which the language selection menu screen to the user is defined by the graphic unit and the contour shape (not limited to the rectangular shape) of the screen region in which the highlight information is shown can be variously set. Therefore, the language selection menu screen to the user is further easily selected. For example, the user can select the language code by the shape or the color without reading characters by the following representation.

(a) "Japanese" is described, a screen region is formed in "a shape of Japanese map", and the inside is marked in "red" often used in the terrestrial globe or the global map in a place where Japanese is selected.

(b) "English" is described, and the screen region is formed in "a star shape" while conscious of Stars and Stripes where English (American language) is selected.

(c) Furthermore, the inside of the star shape is marked in "blue" using the color of a part including the stars in Stars and Stripes.

Especially, as shown in FIG. 4, the information of first play PGCI (FP_PGCI) in which the management information is recorded with respect to the menu for the language selection to the user, exhibiting the subject matter (B) is arranged. Moreover, start address information (HDMENU_AOBS_SA) of HDMENU_AOBS, and start address information (HDMENU_AOBSIT_SA) of HDMENU_AOBS information table, exhibiting the subject matter (F), are arranged. HDVMGM graphic unit stream number information (HDVMGM_GUST_Ns), and HDVMGM graphic unit stream attribute information (HDVMGM_GUST_ATR), exhibiting the subject matter (E), are also arranged in common HD video manager information management table (HDVMGI_MAT) 310. In this case, the management is facilitated. The process program is simplified in the simultaneous or continuous representation of the subject matters (A) to (F) to the user in the information reproduction device of the embodiment of the present invention. The reliability and stability of the information reproduction device are enhanced. Additionally, price reduction of the information reproduction device can be achieved by the simplification of the program.

Similarly, as shown in FIGS. 33 and 34, RSM permission flag information exhibiting the subject matter (A) in the embodiment of the present invention, PGC graphic unit stream control table information (PGC_GUST_CTLT) exhibiting the subject matter (E), and the audio information selection and audio information number exhibiting the subject matter (F) are arranged in the common program chain general information (PGC_GI) 50 to facilitate the management. In the simultaneous or continuous representation of the subject matters (A) to (F) to the user in the information reproduction device of the embodiment of the present invention, the process program is simplified, the reliability and stability of the information reproduction device are enhanced, and the price reduction of the information reproduction device can be achieved by the simplification of the program.

Contents of information to be recorded in a disc-shaped information storage medium 1 in the embodiment of the present invention will be described with reference to FIGS. 1A, 1B, 1C, 1D, 1E, and 1F. The information storage medium 1 comprises a lead-in region 10, data region 12, and lead-out region 13 from an inner peripheral side.

In the information storage medium 1, a bridge structure of IS09660 and UDF, and a part of the data region 12 has a volume/file structure information region 11 of IS09660 and UDF. Mixed arrangement of a video data recording region 20 and general computer information recording region 22 is permitted in the data region 12. The video data recording region 20 comprises an HD video manager recording region (HDVMG: HD video manager) 30 in which management information on the whole HD DVD video content recorded in the video data recording region 20 is recorded; and HD video title set recording regions (HDVTS: HD video title set) 40 which are integrated for titles and in which the management information and video information (video object) are integrated/recorded for each title.

The HD video manager recording region (HDVMG: HD video manager) 30 comprises an HD video manager information region (HDVMGI: HD video manager information) 31 indicating the management information on the whole video data recording region 20; an HD video manager information backup region (HDVMGI_BUP) 34 for the backup, in which the same information as that of the HD video manager information region (HDVMGI: HD video manager information) 31 is recorded; and an HD menu video object region (HD-VMGM_VOBS) 32 in which a top menu screen indicating the whole video data recording region 20 is recorded. Furthermore, in the embodiment of the present invention, an. HD menu audio object region (HDMENU_AOBS) 33 in which the audio information to be output in parallel at the menu display time is recorded is newly arranged in the HD video manager recording region 30. In the embodiment of the present invention, a screen capable of setting the menu description language code is recorded in the region of the language selection menu VOBS for first play PGC (FP_PGC-M_VOBS) 35.

The HD video title set recording region (HDVTS: HD video title set) 40 in which the management information and video information (video object) for each title are integrated and recorded comprises an HD video title set information region (HDVTSI) 41 in which the management information on all the contents in the HD video title set recording region (HDVTS: HD video title set) 40 is recorded; an HD video title set information backup region (HDVTSI_BUP) 44 in which the same information as that of the HD video title set information region (HDVTSI) 41 is recorded as the backup data; an HD menu video object region (HDVTSM_VOBS) 42 in which the information of the menu screen is recorded by a video title set unit; and a video object region for title (HDVT-STT_VOBS) 43 in which video object (video information of title) data in the video title set is recorded.

Each region constitutes a separate file in a file system including the bridge structure of ISO9660 and UDF. As shown in FIG. 2, the conventional SD DVD video contents are integrated and arranged under the directory named "VIDEO_TS". On the other hand, in the embodiment of the present invention, the directory is divided, and the. HD DVD video contents are integrated and arranged under the directory named "VIDEO_HD".

That is, the recording place in the file structure of the HD menu audio object region 33 is a unique file which is an HD_MENUO.HDA file in the common directory (folder) of VIDEO_HD shown in FIG. 2. Screen data (video data) for setting the menu description language code is independent as a single file first in the region of the language selection menu VOBS for first play PGC (FP_PGCM_VOBS) 35, and the file name is HD_FPPGC.HDV. The HD video manager information region (HDVMGI: HD video manager information) 31 is stored in an HD_VMG00.HDI file. The HD video manager information backup region (HDVMGI_BUP) 34 is stored in an HD_VMG00.BUP file. The HD menu video object region (HDVMGM_VOBS) 32 is stored in an HD_VMG01.HDV file. The HD video title set information region (HDVTSI) 41 is stored in a VTS00100.IFO file. The HD video title set information backup region (HDVTSI_BUP) 44 is stored in a VTS0010.BUP file. The HD menu video object region (HD-VTSM_VOBS) 42 is stored in a VTS00100.HDV file. The video object region for title (HDVTSTT_VOBS) 43 is stored in a VTS00101.HDV file or VTS00102.HDV file. The regions are stored in the individual files in this manner.

A detailed data structure in the HD video manager information region (HDVMGI) 31 shown in FIG. 1E is shown in FIG. 3.

The management data with respect to the object of the HD menu audio object region (HDMENU_AOBS) 33 is recorded in an HD menu audio object set information table (HD-MENU_AOBSIT) 318 in the HD video manager information region (HDVMGI) 31 as shown in FIG. 3. A data structure from the HD video manager information management table (HDVMGI_MAT) 310 to the HD video manager menu video object unit address map (HDVMGM_VOBU_ADMA) 317 matches the management information of the conventional SD DVD video. In the embodiment of the present invention, the newly added HD menu audio object set information table (HDMENU_AOBSIT) 318 is arranged separately from and behind a part matching the management information of the conventional DVD video. Accordingly, the conventional control program using the management information of the conventional SD DVD video can also be used, and the control program of the information reproduction device for the embodiment of the present invention can be simplified.

Moreover, the HD video manager information region (HD-VMGI) 31 includes HD video manager information management table (HDVMGI_MAT) information 310 in which the management information common to the whole HD DVD video content recorded in the video data recording region 20 is integrated and recorded; title search pointer table (TT_SRPT) information 311 in which information useful for searching for each title present in the HD DVD video content (playback start position detection) is recorded; HD video manager menu PGCI unit table (HDVMGM_PGCI_UT) information 312 in which the management information of the menu screen divided and arranged for each menu description language code displaying the menu is recorded; parental management information table (PTL_MAIT) information 313 in which information for managing video which can be shown or cannot be shown to children as parental information is recorded; HD video title set attribute information table (HDVTS_ATRT) information 314 in which attributes of the title set are integrated and recorded; text data manager (TXTDT_MG) information 315 in which text information displayed to the user is integrated and recorded; HD video manager menu cell address table (HDVMGM_C_ADT) information 316 in which information useful for searching for the start address of the cell constituting the menu screen is recorded; and HD video manager menu video object unit address map (HDVMGM_VOBU_ADMAP) information 317 in which address information of VOBU indicating a minimum unit of the video object constituting the menu screen is recorded.

A detailed data structure in the HD video manager information management table (HDVMGI_MAT) 310 of FIG. 3 is shown in FIG. 4.

As shown in FIG. 4, the information of the first play PGCI (FP_PGCI) in which the management information on the menu for the language selection by the user, exhibiting the subject matter (B), the start address information (HDMENU_AOBS_SA) of HDMENU_AOBS and the start address information (HDMENU_AOBSIT_SA) of HDVMGM_AOBS information table, exhibiting the subject matter (F), and graphic unit stream number information (HDVMGM_GUST_Ns) of HDVMGM and graphic unit stream attribute information (HDVMGM_GUST_ATR) of HDVMGM, exhibiting the subject matter (E) are arranged in the common HD video manager information management table (HDVMGI_MAT) 310.

Additionally, in the HD video manager information management table (HDVMGI_MAT) 310, various information are recorded such as an HD video manager identifier (HDVMG_ID); end address (HDVMG_EA) of HD video manager; an end address (HDVMGI_EA) of HD video manager information; a version number (VERN) of HD-DVD video standards; an HD video manager category (HDVMG_CAT); a volume set identifier (VIMS_ID); adaptation identifier (ADP_ID); the number of HD video title sets (HDVTS_Ns); a provider unique identifier (PVR_ID); a POS code (POS_CD); an end address (HDVMGI_MAT_EA) of an HD video manager information management table; a start address (FP_PGCI_SA) of first play program chain information; a start address (HDVMGM_VOBS_SA) of HDVMGM_VOBS; a start address (TT_SRPT_SA) of TT_SRPT; a start address (HDVMGM_PGCI_UT_SA) of HDVMGM_PGCI_UT; a start address (PTL_MAIT_SA) of PTL_MAIT; a start address (HDVTS_ATRT_SA) of HDVTS_ATRT; a start address (TXTDT_MG_SA) of TXTDT_MG; a start address (HDVMGM_C_ADT_SA) of HDVMGM_C_ADT; a start address (HDVMGM_VOBU_ADMAP_SA) of HDVMGM_VOBU_ADMAP; an HDVMGM video attribute (HDVMGM_V_ATR); an HDVMGM audio stream number (HDVMGM_AST_Ns); an HDVMGM audio stream attribute (HDVMGM_AST_ATR); an HDVMGM sub-picture stream number (HDVMGM_SPST_Ns); and an HDVMGM sub-picture stream attribute (HDVMGM_SPST_ATR).

Figure 5:
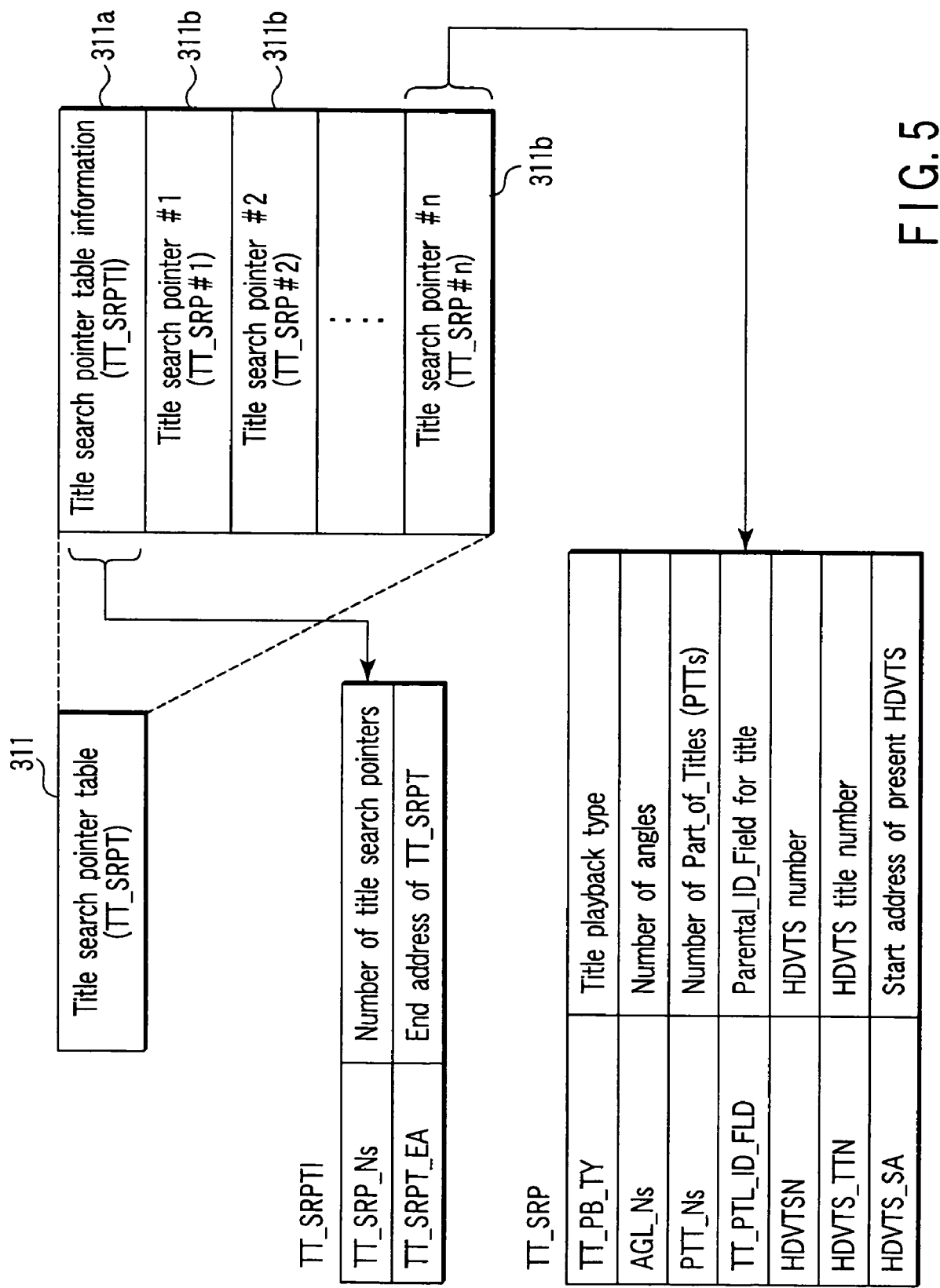
FIG. 5 is a diagram showing a data structure in a title search pointer table (TT_SRPT) 311 shown in FIG. 3.

A data structure in the title search pointer table (TT_SRPT) 311 shown in FIG. 3 is shown in FIG. 5. The title search pointer table (TT_SRPT) 311 comprises title search pointer table information (TT_SRPTI) 311*a* and title search pointer (TT_SRP) information 311*b*. An optional number of pieces of title search pointer (TT_SRP) information 311*b* in the title search pointer table (TT_SRPT) 311 can be set in accordance with the title number in the HD DVD video content. Common management information of the title search pointer table (TT_SRPT) 311 is recorded in the title search pointer table information (TT_SRPTI) 311*a*. Information of the number of title search pointers (TT_SRP_Ns) included in the title search pointer table (TT_SRPT) 311, and end address (TT_SRPT_EA) information of the title search pointer table (TT_SRPT) 311 in the file (HD_VMG00.HDI) of HD video manager information region (HDVMGMI) are recorded.

Moreover, in one piece of title search pointer (TT_SRP) information 311*b*, various information are recorded such as title playback type (TT_PB_TY) concerning the title indicated by this search pointer; angle number (AGL_Ns); the number (PTT_Ns) of Part_of_Title (PTT); Parental_ID_Field (TT_PTL_ID_FLD) information for the title; HDVTS number (HDVTSN); HDVTS title number (HDVTS_TTN); and the start address (HDVTS_Sstructure in the HD video manager menu PGCI unit table (HDA) of the present HDVTS.

Figure 6:
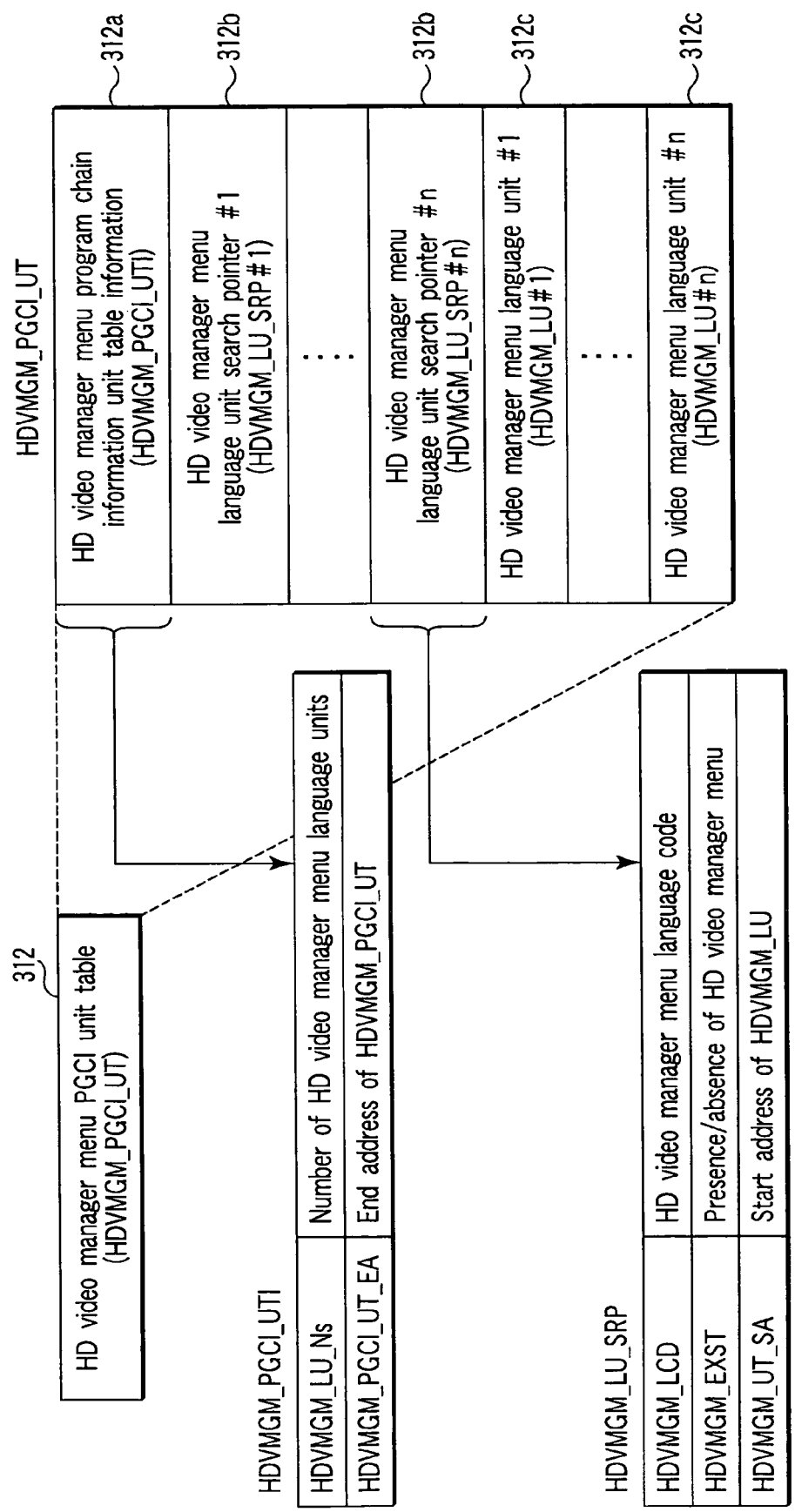
FIG. 6 is a diagram showing a data structure in an HD video manager menu PGCI unit table (HDVMGM_PGCI_UT) 312 shown in FIG. 3.

Next, a data VMGM_PGCI_UT) 312 shown in FIG. 3 is shown in FIG. 6. In the HD video manager menu PGCI unit table (HDVMGM_PGCI_UT) 312, an HD video manager menu program chain information unit table information (HDVMGM_PGCI_UTI) 312*a* in which common management information in the HD video manager menu PGCI unit table (HDVMGM_PGCI_UT) 312 is recorded, and an HD video manager menu language unit (HDVMGM_LU) 312*c* which is integrated for each menu description language code to display the menu and in which the management information on the menu information is recorded are recorded. The information of the HD video manager menu language unit (HDVMGM_LU) 312*c* is arranged by the number of menu description language codes supported by the HD DVD video content. In order to facilitate the access to the HD video manager menu language unit (HDVMGM_LU) 312*c* for each menu description language code, the HD video manager menu PGCI unit table (HDVMGM_PGCI_UT) 312 includes the number of pieces of HD video manager menu language unit search pointer (HDVMGM_LU_SRP) information 312*b* including the start address information of each HD video manager menu language unit (HDVMGM_LU) 312*c*. The number of pieces is equal to that of HD video manager menu language units (HDVMGM_LU) 312*c*.

The HD video manager menu PGCI unit table (HDVMGM_PGCI_UT) 312 includes information on the number (HDVMGM_LU_Ns) of HD video manager menu language units; and end address (HDVMGM_PGCI_UT_EA) information of the HD video manager menu PGCI unit table (HDVMGM_PGCI_UT) 312 in the file (HD_VMG00.HDI) of HD video manager information region (HDVMGI).

Moreover, the information on the HD video manager menu language unit search pointer (HDVMGM_LU_SRP) 312*b* includes not only difference address information (HDVMGM_UT_SA) of the start position of the HD video manager menu PGCI unit table (HDVMGM_PGCI_UT) 312 to the start position of the corresponding HD video manager menu language unit (HDVMGM_LU) 312*c* in the file (HD_VMG00.HDI of FIG. 2) of the HD video manager information region (HDVMGI) described above; but also the information on HD video manager menu language code (HDVMGM_LCD) indicating the menu description language code of the corresponding HD video manager menu language unit (HDVMGM_LU) 312*c*; and HD video manager presence/absence (HDVMGM_EXST) information indicating whether or not the corresponding HD video manager menu language unit (HDVMGM_LU) 312*c* includes the menu screen displayed to the user as VOB.

A detailed data structure in the HD video manager menu language unit #n (HDVMGM_LU #n) 312*c* (FIG. 6) recorded in the HD video manager menu PGCI (HDVMGM_PGCI_UT) 312 shown in FIG. 3 is shown in FIG. 7.

The HD video manager menu language unit (HDVMGM_LU) 312c includes various information such as HD video manager menu language unit information (HDVMGM_LUI) 312c1 in which common management information on the menu in the HD video manager menu language unit (HDVMGM_LU) 312c is recorded; HD video manager menu program chain information (HDVMGM_PGCI) 312c3 including the structure shown in FIG. 7; and HDVMGM_PGCI search pointer (HDVMGM_PGCI_SRP #1) information 312c2 indicating the difference address of the start position of the HD video manager menu language unit (HDVMGM_LU) 312c to the start position of each HD video manager menu program chain information (HDVMGM_PGCI) 312c3 in the file (HD_VMG00.HDI) of the HD video manager information region (HDVMGI).

The HD video manager menu language unit information (HDVMGM_LUI) 312c1 arranged in the first region (group) in the HD video manager menu language unit #n (HDVMGM_LU #n) 312c includes the information on the number of HDVMGM_PGCI_SRPs (HDVMGM_PGCI_SRP_Ns); and end address (HDVMGM_LU_EA) information of HDVMGM_LU. The information on HDVMGM_PGCI search pointer (HDVMGM_PGCI_SRP #1) 312c2 includes start address (HDVMGM_PGCI_SA) information of HDVMGM_PGCI; and HDVMGM_PGC category (HDVMGM_PGC_CAT) information.

In the HDVMGM_PGC category information (HDVMGM_PGC_CAT) in the HDVMGM_PGCI search pointer #n (HDVMGM_PGCI_SRP #n) 312c2, selection information of audio information produced simultaneously with the screen display of the menu of HD content in the present invention, and an audio information selection flag (audio information selection) indicating the start/end trigger of audio information reproduction are recorded. Either of the following can be selected as the audio data reproduced simultaneously with the screen display of the menu of the HD content in the present invention:

(1) audio data recorded in the HD menu video object region (HDVMGM_VOBS) 32 shown in FIG. 1E (scattered/recorded in the audio pack although not shown); and (2) audio data which exists in the HD menu audio object region (HDMENU_AOBS) 33 shown in FIG. 1E and in which one or more HD menu AOBs (HDMENU_AOB) are arranged in order as shown in FIG. 19.

Here, when "00b" of the audio information selection flag (audio information selection) is selected, the audio data of (1) is reproduced, and sound reproduction is interrupted at the switching time of the menu. When "10b" of "11b" of the audio information selection flag (audio information selection) is selected, the audio data of the HD menu AOB (HDMENU_AOB) present in the HD menu audio object region (HDMENU_AOBS) 33 shown in (2) is reproduced. To reproduce the audio data shown in (2), when "11b" is designated, the reproduction of the audio data is started from the beginning every change of the menu screen. When "10b" is designated, the reproduction of the audio data is continued regardless of the switching of the menu screen. In the embodiment of the present invention, as shown in FIG. 19, a plurality of types of HD menu AOBs (HDMENU_AOB) are stored beforehand in the HD menu audio object region (HDMENU_AOBS) 33. The audio information number shown in FIG. 8 shows the selection information of the HD menu AOB (HDMENU_AOB) reproduced simultaneously with the display of the corresponding PGC for menu display. The AOB is selected from the HD menu AOBs arranged in FIG. 19 by number information indicating "the number of AOBs to be selected from above" which is the selection information of the HD menu AOB.

As shown in FIG. 8, in the HDVMGM_PGC category (HDVMGM_PGC_CAT) information, entry type information for judging entry PGC, menu ID information indicating identification of the menu (e.g., the menu of the title or the like), block mode information, block type information, and PTL_ID_FLD information are recorded.

A data structure in the parental management information table (PTL_MAIT) 313 shown in FIG. 3 is shown in FIG. 9. In parental management information table information (PTL_MAITI) 313a, various information are recorded such as the number of countries (CTY_Ns), the number of HDVTS (HDVTS_Ns), and the end address (PTL_MAIT_EA) of PTL_MAIT. A parental management information search pointer (PTL_MAI_SRP) 313b includes information of a country code (CTY_CD) and the start address (PTL_MAI_SA) of PTL_MAI.

Figure 10:
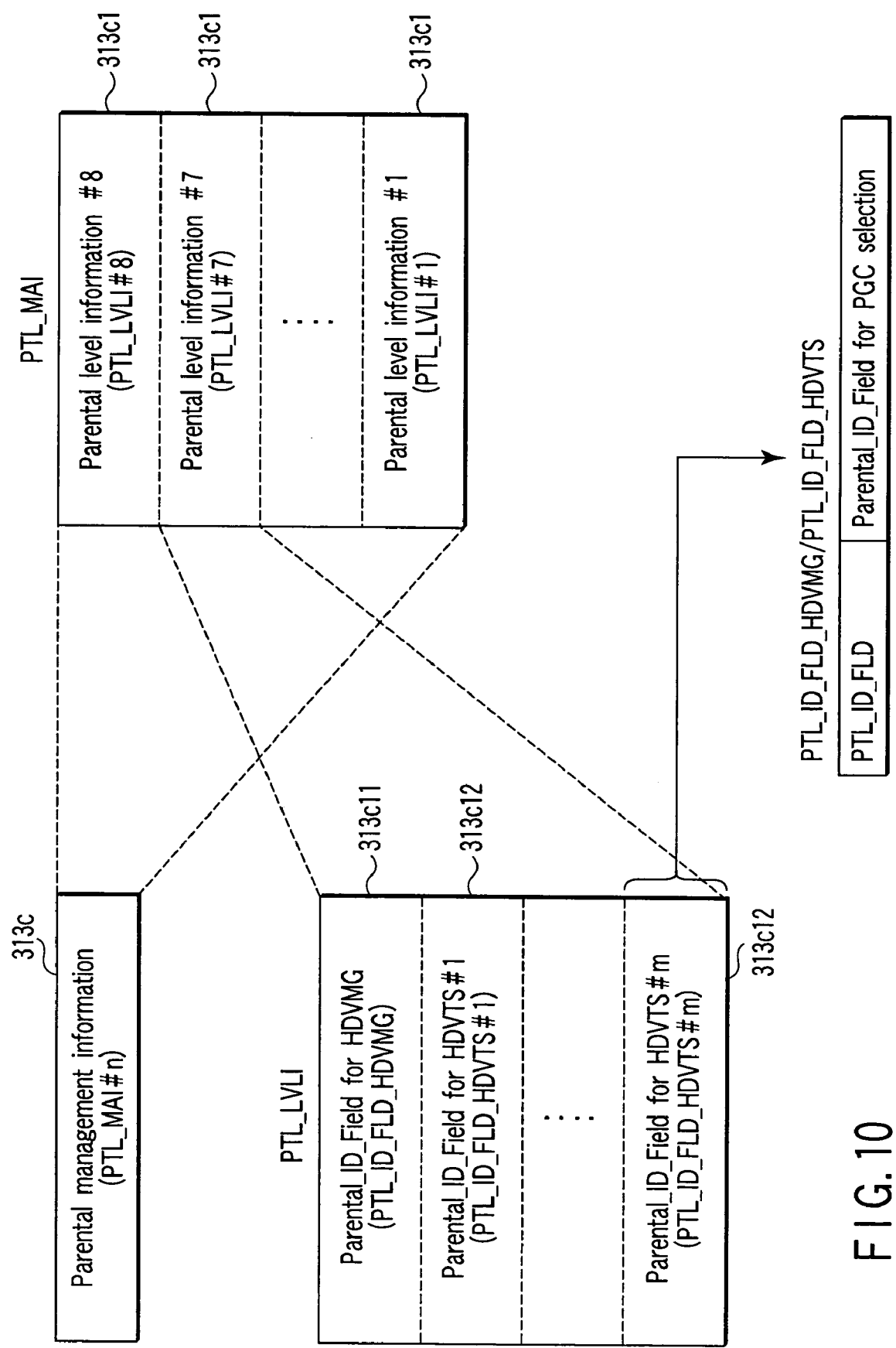
FIG. 10 is a diagram showing a data structure in parental management information (PTL_MAI) 313*c* shown in FIG. 8.

Moreover, the data structure in the parental management information (PTL_MAI) 313c shown in FIG. 9 includes parental level information (PTL_LVLI) 313c1 as shown in FIG. 10. The parental level information (PTL_LVLI) 313c1 includes information of Parental_ID_Field (PTL_ID_FLD_HDVMG) 313c11 for HDVMG and Parental_ID_Field (PTL_ID_FLD_HDVTS) 313c12 for HDVTS. Furthermore, Parental_ID_Field (PTL_ID_FLD) exists in the information of Parental_ID_Field (PTL_ID_FLD_HDVTS) 313c12 for HDVTS.

Figure 11:
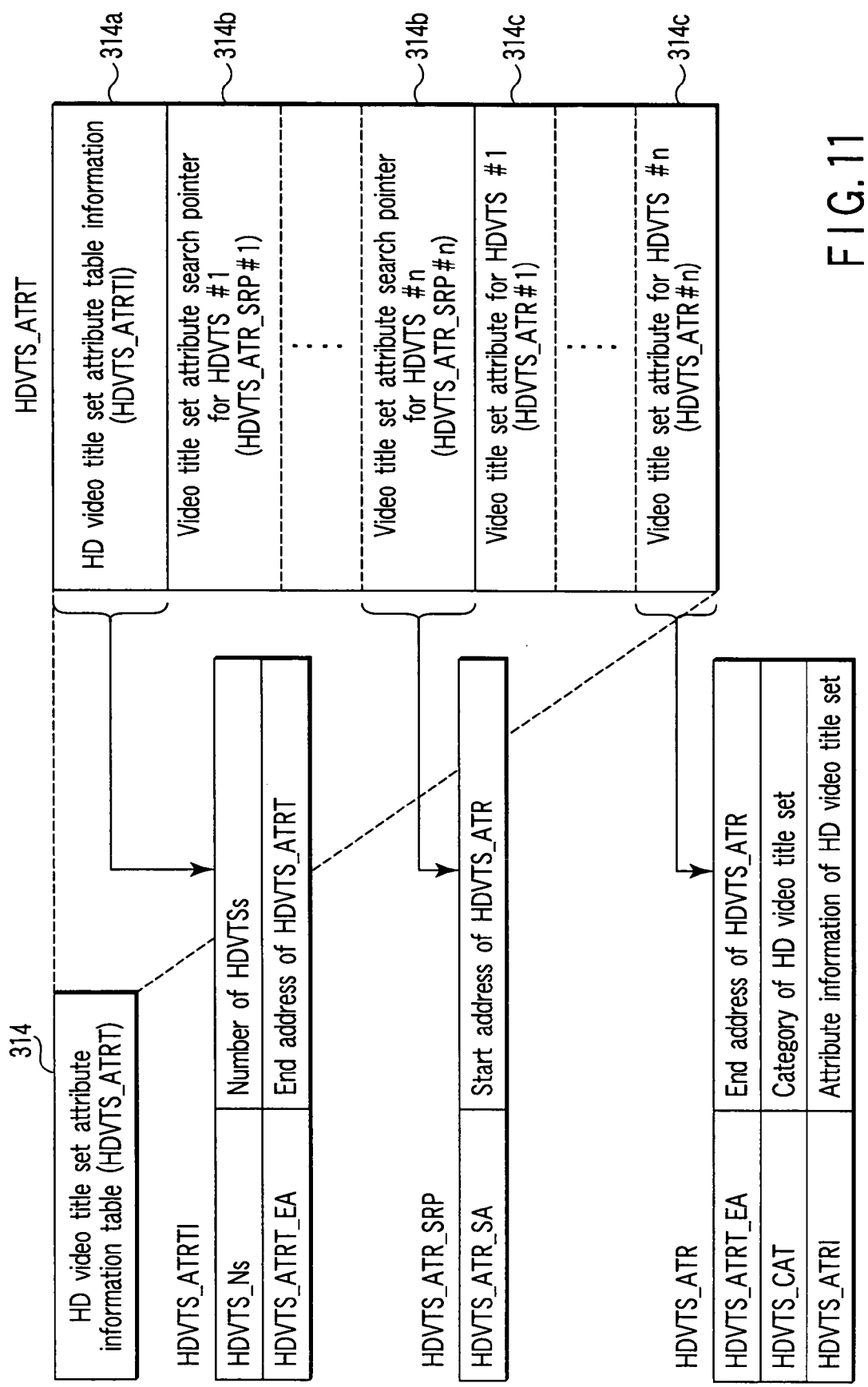
FIG. 11 is a diagram showing a data structure in an HD video title set attribute information table (HDVTS_ATRT) 314 shown in FIG. 3.

As shown in FIG. 11, the HD video title set attribute information table (HDVTS_ATRT) 314 shown in FIG. 3 comprises:

(a) HD video title set attribute table information (HDVTS_ATRTI) 314a including information of the number of HDVTS (HDVTS_Ns) and the end address (HDVTS_ATRT_EA) of HDVTS_ATRT;

(b) an HD video title set attribute search pointer (HDVTS_ATR_SRP) 314b in which the information of the start address (HDVTS_ATR_SA) of HDVTS_ATR is recorded; and (c) an HD video title set attribute (HDVTS_ATR) 314c including each information of the end address (HDVTS_ATRT_EA) of HDVTS_ATR, category of the HD video title set (HDVTS_CAT), and attribute information of the HD video title set (HDVTS_ATRI).

Figure 12:
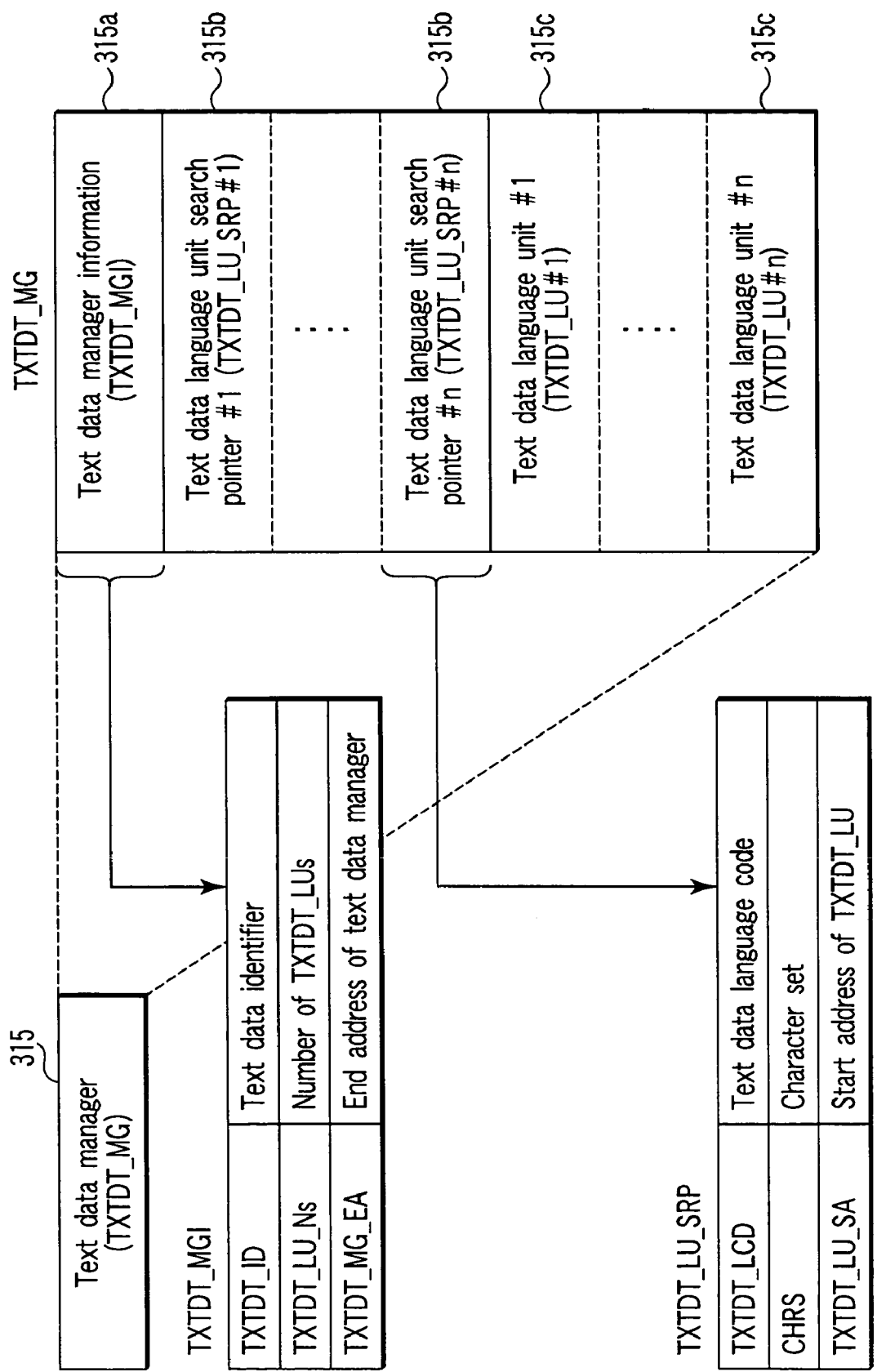
FIG. 12 is a diagram showing a data structure in a text data manager (TXTDT_MG) 315 shown in FIG. 3.

As shown in FIG. 12, the text data manager (TXTDT_MG) 315 shown in FIG. 3 comprises:

(a) text data manager information (TXTDT_MGI) 315a including information such as a text data identifier (TXTDT_ID), the number (TXTDT_LU_Ns) of TXTDT_LUs, and end address (TXTDT_MG_EA) of the text data manager;

(b) a text data language unit search pointer (TXTDT_LU_SRP) 315b in which various information such as a text data language code (TXTDT_LCD), character set (CHRS) and start address (TXTDT_LU_SA) of TXTDT_LU are recorded; and (c) text data language unit (TXTDT_LU) 315c.

Figure 13:
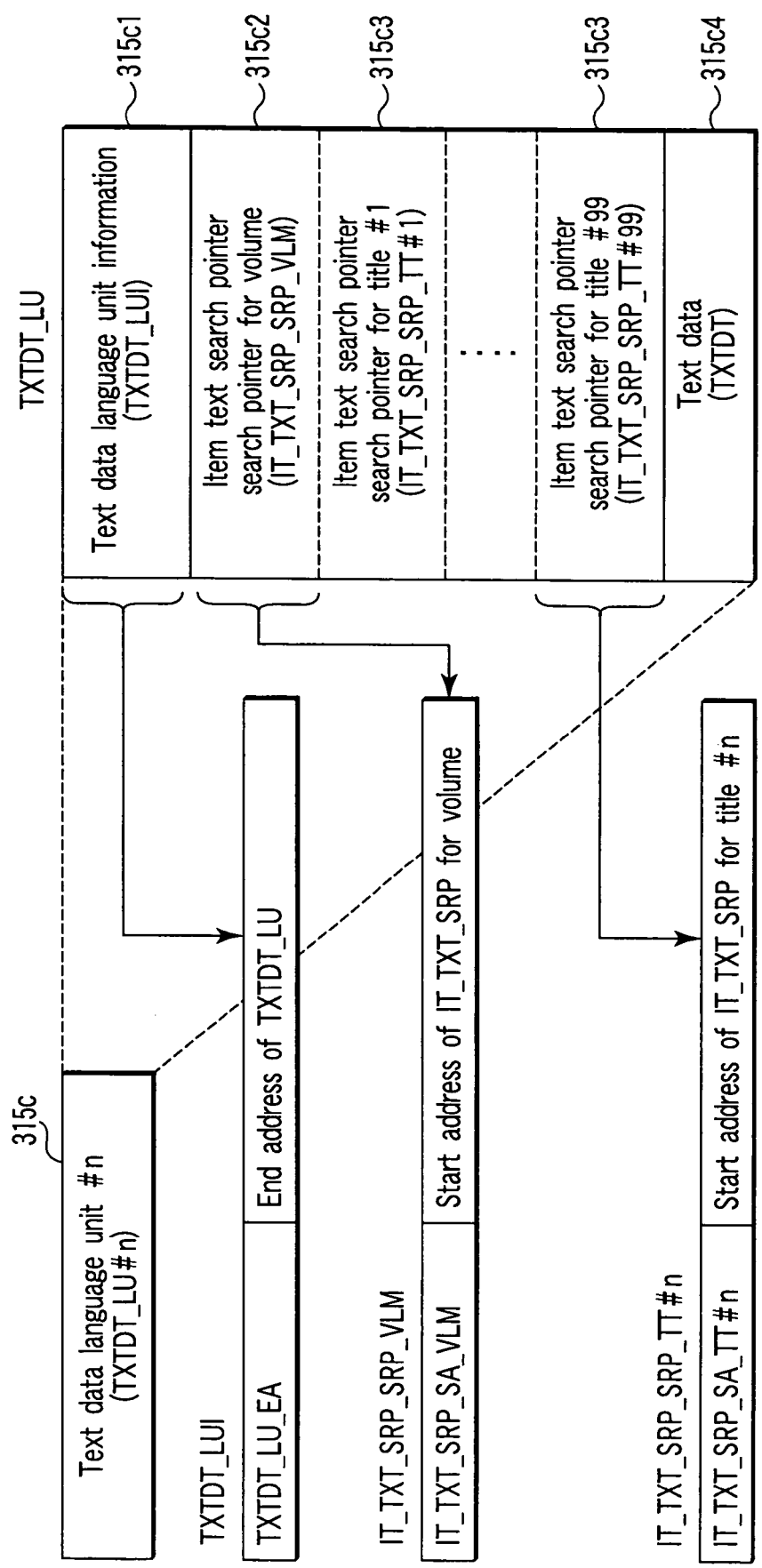
FIG. 13 is a diagram showing a data structure in a text data language unit (TXTDT_LU) 315*c* in the text data manager (TXTDT_MG) 315 shown in FIG. 12.

Furthermore, as shown in FIG. 13, the text data language unit (TXTDT_LU) 315c comprises:

(a) text data language unit information (TXTDT_LUI) 315c1 in which end address information (TXTDT_LU_EA) of TXTDT LU is recorded;

(b) an item text search pointer search pointer for volume (IT_TXT_SRP_SRP_VLM) 315c2 in which start address (IT_TXT_SRP_SA_VLM) information of IT_TXT_SRP for volume is recorded;

(c) an item text search pointer search pointer for title (IT_TXT_SRP_SRP_TT) 315c3 including start address (IT_TXT_SRP_SA_TT) information of IT_TXT_SRP for title; and (d) text data (TXTDT) 315c4.

As shown in FIG. 14, in the text data (TXTDT) 315c4, various information is recorded:

(a) text data information (TXTDTI) 315c41 including information of the number (IT_TXT_SRP_Ns) of IT_TXT_SRP;

(b) an item text search pointer (IT_TXT_SRP) 315c42 in which information of an item text identifier code (IT_TXT_IDCD) and start address (IT_TXT_SA) of IT_TXT are recorded; and (c) item text (IT_TXT) 315c43.

Figure 15:
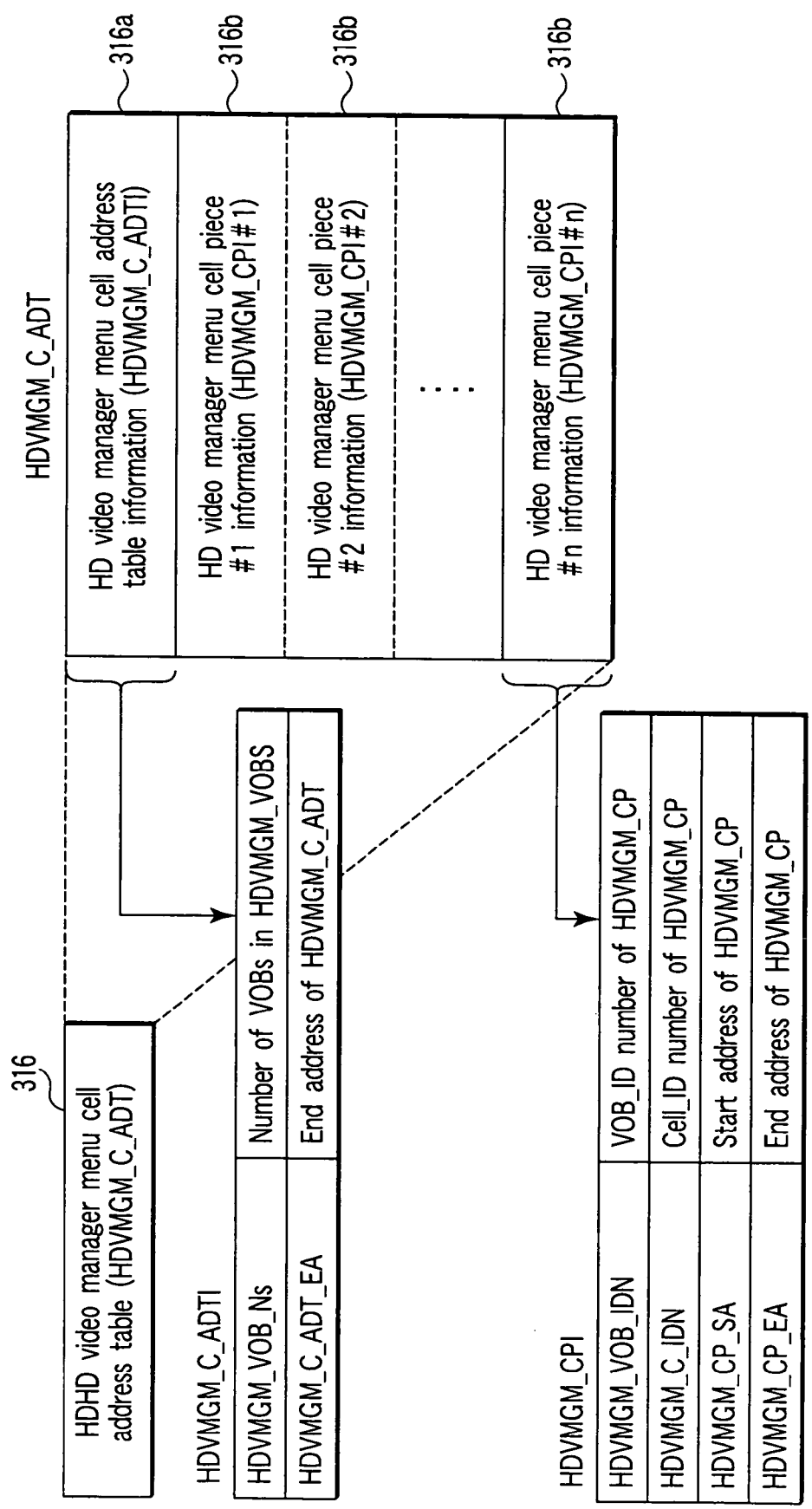
FIG. 15 is a diagram showing a data structure in an HD video manager menu cell address table (HDVMGM_C_ADT) 316 shown in FIG. 3.

As shown in FIG. 15, in the HD video manager menu cell address table (HDVMGM_C_ADT) 316 shown in FIG. 3, various information is recorded such as:

(a) HD video manager menu cell address table information (HDVMGM_C_ADTI) 316a including various information such as the number of VOBs (HDVMGM_VOB_Ns) in HDVMGM_VOBS and the end address (HDVMGM_C_ADT_EA) of HDVMGM_C_ADT; and (b) HD video manager menu cell piece information (HDVMGM_CPI) 316b in which information is recorded such as VOB_ID number (HDVMGM_VOB_IDN) of HDVMGM_CP, Cell_ID number (HDVMGM_C_IDN) of HDVMGM_CP, start address (HDVMGM_CP_SA) of HDVMGM_CP, and end address (HDVMGM_CP_EA) of HDVMGM_CP.

Figure 16:
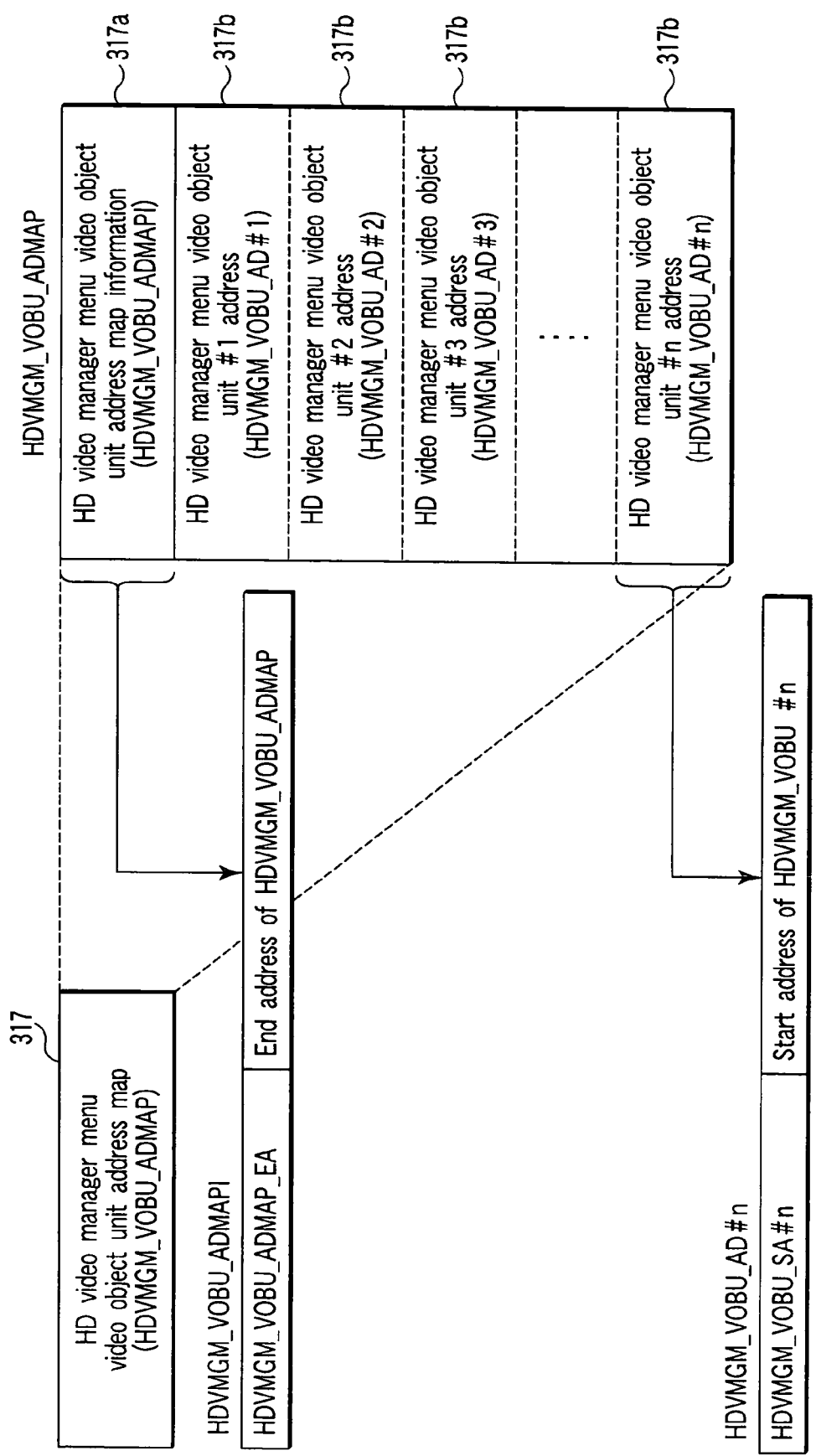
FIG. 16 is a diagram showing a data structure in an HD video manager menu video object unit address map (HDVMGM_VOBU_ADMAP) 317 shown in FIG. 3.

As shown in FIG. 16, in the HD video manager menu video object unit address map (HDVMGM_VOBU_ADMAP) 317 shown in FIG. 3, various information is recorded such as:

(a) HD video manager menu video object unit address map information (HDVMGM_VOBU_ADMAPI) 317a including information of the end address (HDVMGM_VOBU_ADMAP_EA) of HDVMGM_VOBU_ADMAP; and (b) the start address (HDVMGM_VOBU_SA) of HDVMGM_VOBU.

FIG. 17 shows a management information content with respect to the HD menu AOB (HDMENU_AOB), and shows the inner data structure of the HD menu audio object set information table (HDMENU_AOBSIT) 318 shown in FIG. 3, which exists in the HD video manager information region (HDVMGI) 31 shown in FIG. 1E. In the HD menu audio object set information table information (HDMENU_AOBSITI) 318a arranged first in the HD menu audio object set information table (HDMENU_AOBSIT) 318, HDMENU_AOB_Ns which is AOB number information in HDMENU_AOBS, and end address information (HDMENU_AOBSIT_EA) of HDMENU_AOBSIT exist. In the embodiment of the present invention, a plurality of types of audio objects (audio data) for the menu can be recorded in the information storage medium.

In FIG. 17, HD menu audio object information (HDMENU_AOBI) 318b indicates the management information on the audio object (audio data) for each menu, and comprises playback information (HDMENU_AOB_PBI) of HDMENU_AOB; attribute information (HDMENU_AOB_ATR) of HDMENU_AOB; start address information (HDMENU_AOB_SA) of HDMENU_AOB #n (corresponding HDMENU_AOB); and end address information (HDMENU_AOB_EA) of HDMENU_AOB #n (corresponding HDMENU_AOB).

Figure 18:
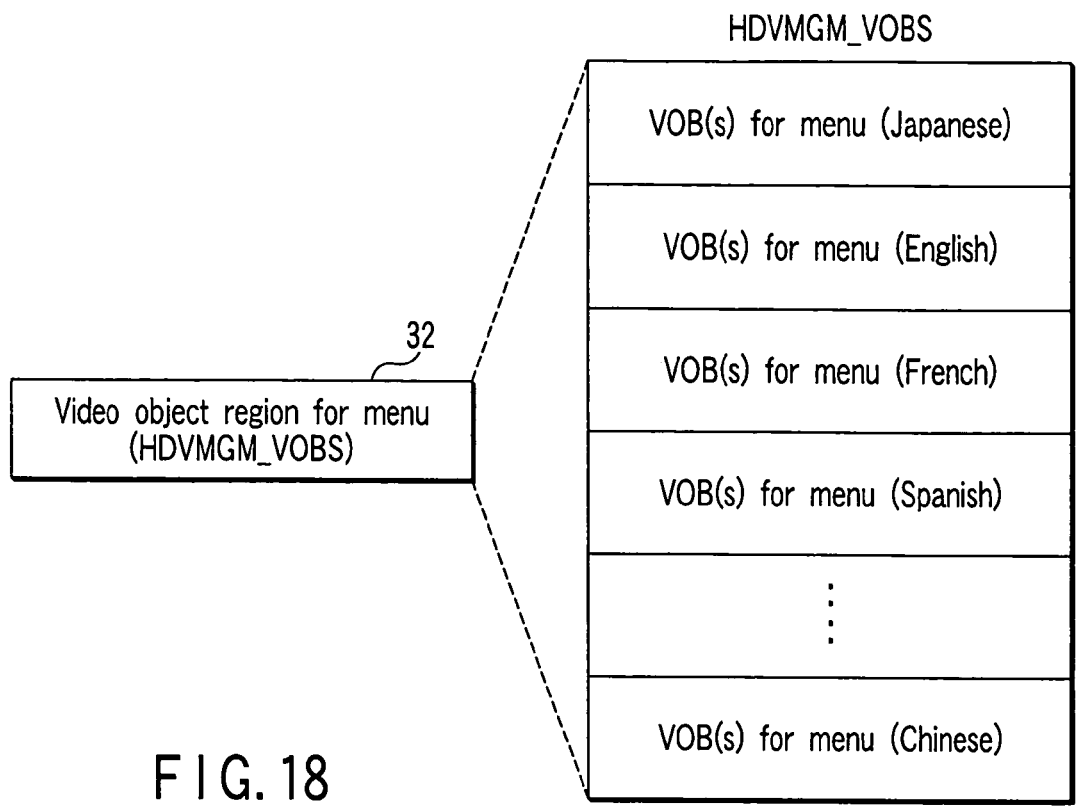
FIG. 18 is a diagram showing a data structure in a HD menu video object region (HDVMGM_VOBS) 32 shown in FIG. 1E integrated and stored in an HD_VMG01.HDV file of FIG. 2.

In a data structure in the HD menu video object region (HDVMGM_VOBS) 32 shown in FIG. 1E, integrated and stored in the HD_VMG01.HDV file of FIG. 2, as shown in FIG. 18, menu screens (video objects) in which the same menu screen is recorded in different menu description language codes are arranged.

In the embodiment of the present invention, a plurality of types of audio objects (audio data) for the menu can be recorded in the information storage medium. As described above, the recording place of the audio object (AOB) for the menu is the HD menu audio object region (HDMENU_AOBS) 33 in the HD video manager recording region (HDVMGI) 30 as shown in FIG. 1D. This HD menu audio object region (HDMENU_AOBS) 33 constitutes one file named HD_MENU0.HDA as shown in FIG. 2. The respective audio objects (AOB) for the menu are arranged/recorded in order in the HD menu audio object region (HDMENU_AOBS) 33 constituting one file named HD_MENU0.HDA as shown in FIG. 19.

Figure 20:
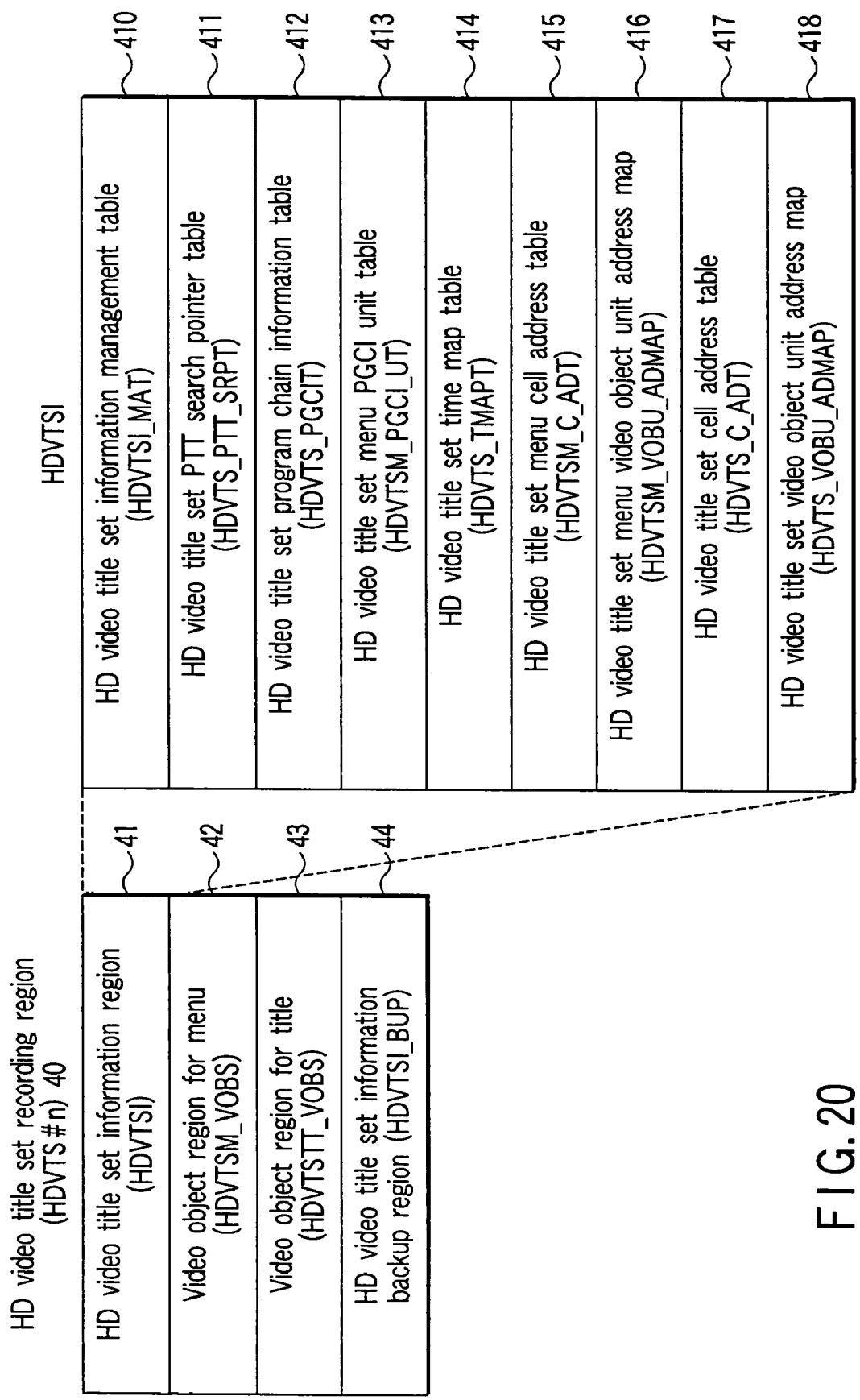
FIG. 20 is a diagram showing a data structure in an HD video title set information region (HDVTSI) 41 shown in FIGS. 1F.

The HD video title set information region (HDVTSI) 41 shown in FIG. 1E is integrated and recorded in the VTS00100.IFO file shown in FIG. 2, and is, as shown in FIG. 20, divided into regions (management information groups) such as an HD video title set information management table (HDVTSI_MAT) 410; HD video title set PTT search pointer table (HDVTS_PPT_SRPT) 411; HD video title set program chain information table (HDVTS_PGCIT) 412; HD video title set menu PGCI unit table (HDVTSM_PGCI_UT) 413; HD video title set time map table (HDVTS_TMAPT) 414; HD video title set menu cell address table (HDVTSM_C_ADT) 415; HD video title set menu video object unit address map (HDVTSM_VOBU_ADMAP) 416; HD video title set cell address table (HDVTS_C_ADT) 417; and HD video title set video object unit address map (HDVTS_VOBU_ADMAP) 418.

The management information common to the corresponding video title set is recorded in the HD video title set information management table (HDVTSI_MAT) 410. The common management information is arranged in the first region (management information group) of the HD video title set information region (HDVTSI) 41, therefore, the common management information in the video title set is immediately read. A reproduction control process of the information reproduction device is simplified, and a control process time is shortened.

The management information on the graphic unit included in HDVTS (HD video title set of the present invention) is recorded in the HD video title set information management table (HDVTSI_MAT) 410 (see FIG. 20) arranged in the first region (group) in the HD video title set information region (HDVTSI) 41 shown in FIG. 1E. As shown in FIG. 21, in a concrete management information content of the HD video title set information management table (HDVTSI_MAT) 410, graphic unit stream number information and attribute information are divided into a menu screen and title (display video) in HDVTS. The information is recorded as HDVTSM graphic unit stream number information (HDVTSM_GUST_Ns), HDVTSM graphic unit stream attribute information (HDVTSM_GUST_ATR), HDVTS graphic unit stream number information (HDVTS GUST_Ns), and HDVTS graphic unit stream attribute table information (HDVTS_GUST_ATRT).

Moreover, in addition to the common management information in the video title set, as shown in FIG. 21, various information are recorded in the HD video title set information management table (HDVTSI_MAT) 410 such as an HD video title set identifier (HDVTS_ID); an HDVTS end address (HDVTS_EA); an HDVTSI end address (HDVTSI_EA); a version number (VERN) of HD-DVD video standards; an HDVTS category (HDVTS_CAT); an HDVTSI_MAT end address (HDVTSI_MAT_EA); an HDVTSM_VOBS start address (HDVTSM_VOBS_SA); an HDVTSTT_VOBS start address (HDVTSTT_VOBS_SA); an HDVTS_PTT_SRPT start address (HDVTS_PTT_SRPT_SA); an HDVTS_PGCIT start address (HDVTS_PGCIT_SA); an HDVTSM_PGCI_UT start address (HDVTSM_PGCI_UT_SA); an HDVTS_TMAP start address (HDVTS_TMAP_SA); an HDVTSM_C_ADT start address (HDVTSM_C_ADT_SA); an HDVTSM_VOBU_ADMAP start address (HDVTSM_VOBU_ADMAP_SA); an HDVTS_C_ADT start address (HDVTS_C_ADT_SA); an HDVTS_VOBU_ADMAP start address (HDVTS_VOBU_ADMAP_SA); HDVTSM video attributes (HDVTSM_V_ATR); an HDVTSM audio stream number (HDVTSM_AST_Ns); HDVTSM audio stream attributes (HDVTSM_AST_ATR); a start address (HDVTSM_SPST_Ns) of an HDVTSM sub-picture stream number; HDVTSM sub-picture stream attributes (HDVTSM_SPST_ATR); HDVTS video attributes (HDVTS_V_ATR); an HDVTS audio stream number (HDVTS_AST_Ns); an HDVTS audio stream attribute table (HDVTS_AST_ATRT); an HDVTS sub-picture stream number (HDVTS_SPT_Ns); an HDVTS sub-picture stream attribute table (HDVTS_SPST_ATRT); and an HDVTS multi-channel audio stream attribute table (HDVTS_MU_AST_ATRT).

Figure 22:
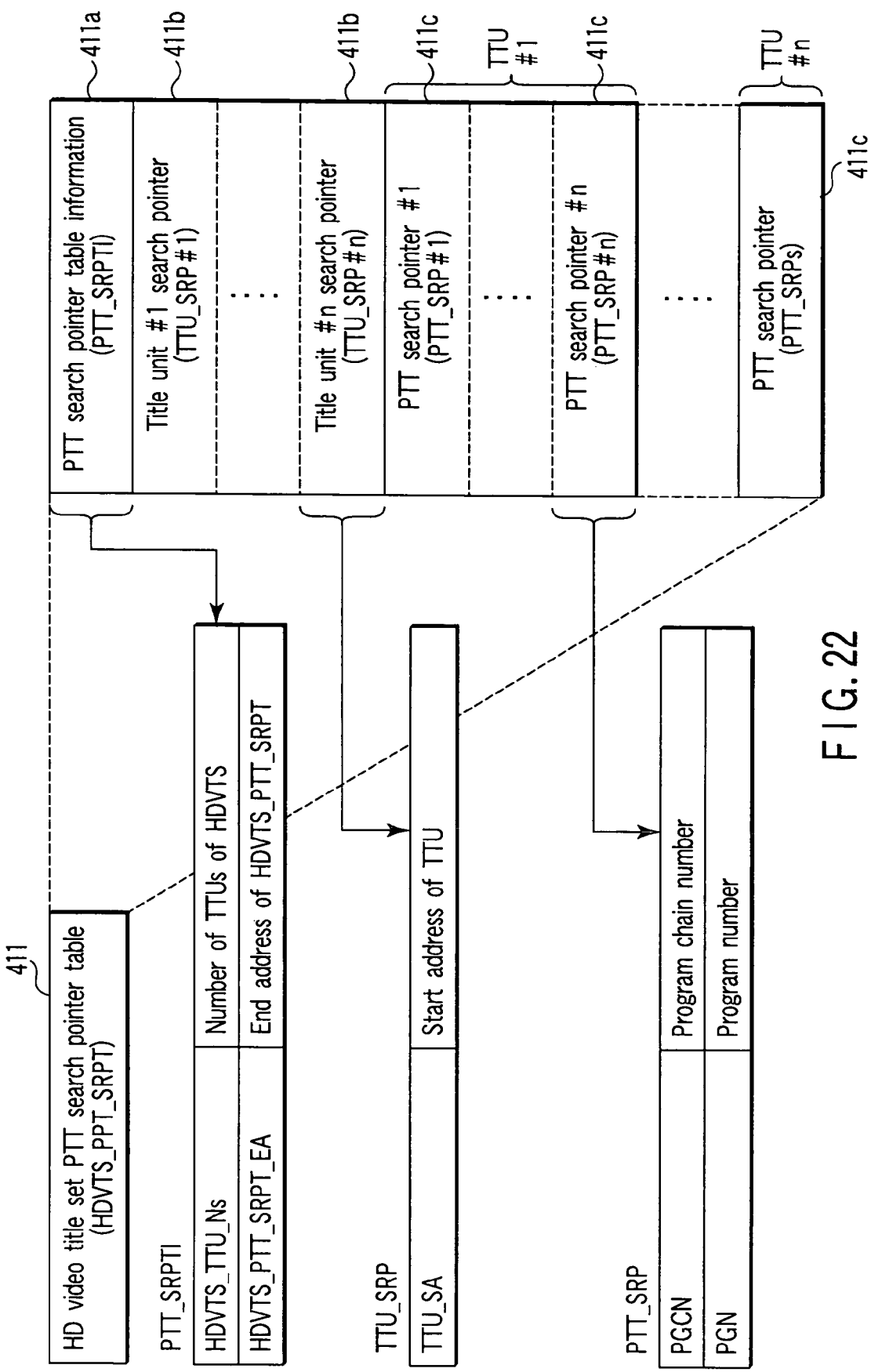
FIG. 22 is a diagram showing a data structure in an HD video title set PTT search pointer table (HDVTS_PPT_SRPT) 411 shown in FIG. 20.

The data structure in the HD video title set PTT search pointer table (HDVTS_PPT_SRPT) 411 shown in FIG. 20 is shown in FIG. 22. The HD video title set PTT search pointer table (HDVTS_PPT_SRPT) 411 comprises various information such as:

(a) PTT search pointer table information (PTT_SPRTI) 411a including the information such as the number (HDVTS_TTU_Ns) of HDVTS_TTUs and an end address (HDVTS_PTT_SRPT_EA) of HDVTS_PTT_SRPT;

(b) a title unit search pointer (TTU_SRP) 411b in which the information of the start address (TTU_SA) of TTU is recorded; and (b) a PTT search pointer (PTT_SRP) 411c including the information of a program chain number (PGCN) and program number (PGN).

Figure 23:
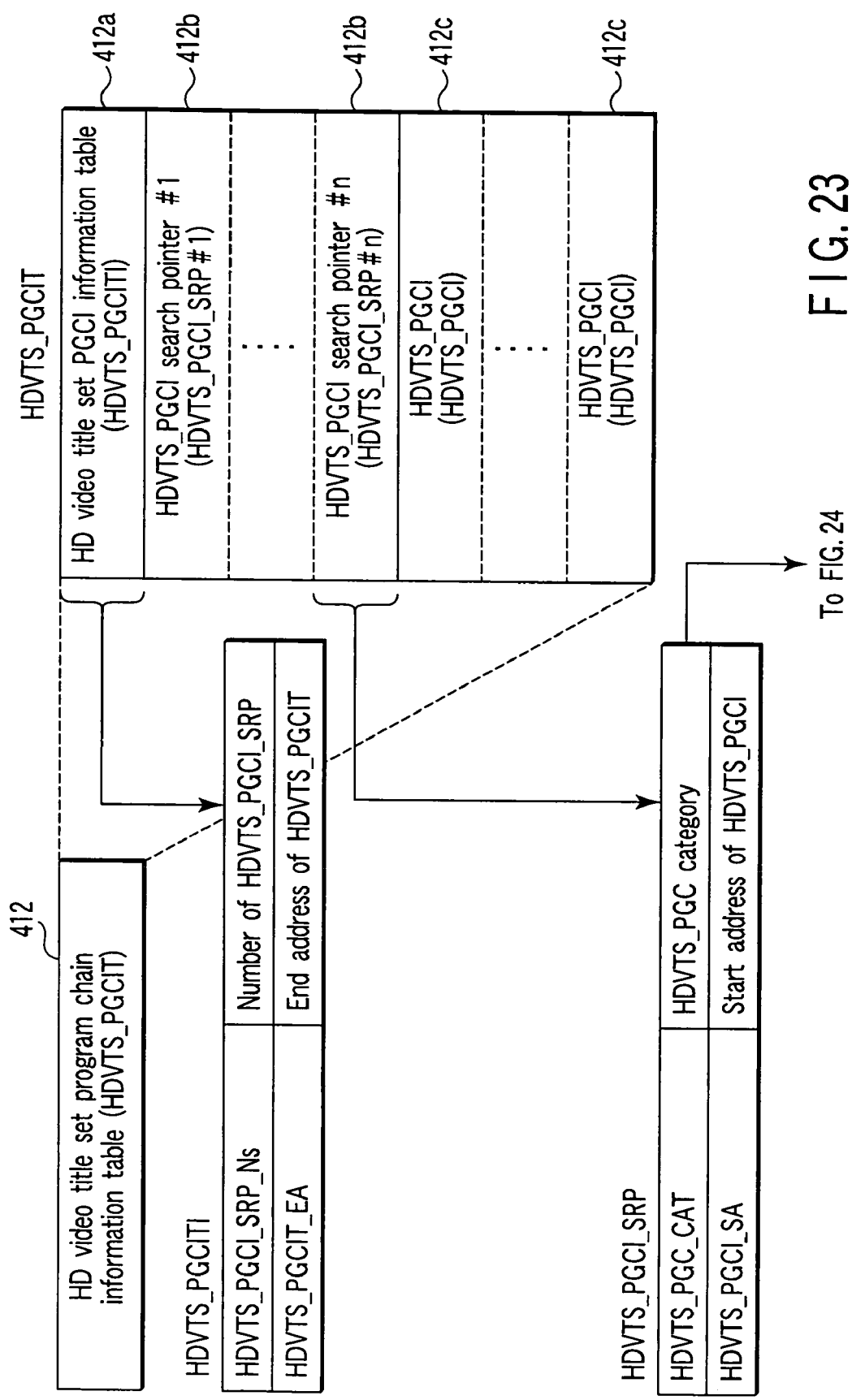
FIG. 23 is a diagram showing a data structure in an HD video title set program chain information table (HDVTS_PGCIT) 412 shown in FIG. 20.

In a place where the information for managing resume information is arranged in the first embodiment of the present invention, as shown in FIGS. 23 and 24, the RSM permission flag (update permission flag of resume information) is arranged in the HDVTS_PGC category in the HDVTS_PGCI search pointer 412. The information of the HDVTS_PGCI search pointer 412 is arranged in the HD video title set program chain information table (HDVTS_PGCIT) 412 shown in FIG. 20, existing in the HD video title set information region (HDVTSI) 41 shown in FIG. 1F. Further in the HD video title set program chain information table (HDVTS_PGCIT) 412, as shown in FIG. 23, the information of HD video title set PGCI information table (HDVTS_PGCITI) 412a including the information of the number (HDVTS_PGCI_SRP_Ns) of HDVTS_PGCI_SRP and the end address (HDVTS_PGCIT_EA) of HDVTS_PGCIT is recorded. Moreover, the information of the start address (HDVTS_PGCI_SA) of HDVTS_PGCI is also recorded in the HDVTS_PGCI search pointer (HDVTS_PGCI_SRP) 412b together with the above-described HDVTS_PGC category (HDVTS_PGC_CAT).

The RSM permission flag shown in FIG. 24 (update permission flag of the resume information) designates whether or not the contents of the resume information are updated (resume information is successively updated in accordance with a reproduction situation of the corresponding PGC) in a stage in which the reproduction of the corresponding HDVTS_PGC is started. That is, when the flag is "0b", the resume information is updated. When the flag is "1b", the resume information is not updated, and the reproduction interrupted information of HDVTS_PGC reproduced before (the corresponding program chain in the HD video title set of the present invention) is held. Further in the HDVTS_PGC category (HDVTS_PGC_CAT), entry type information for judging entry PGC, title number information in the video title set (VTS) indicated by the corresponding PGC, block mode information, block type information, and PTL_ID_FLD information are recorded.

Figure 25:
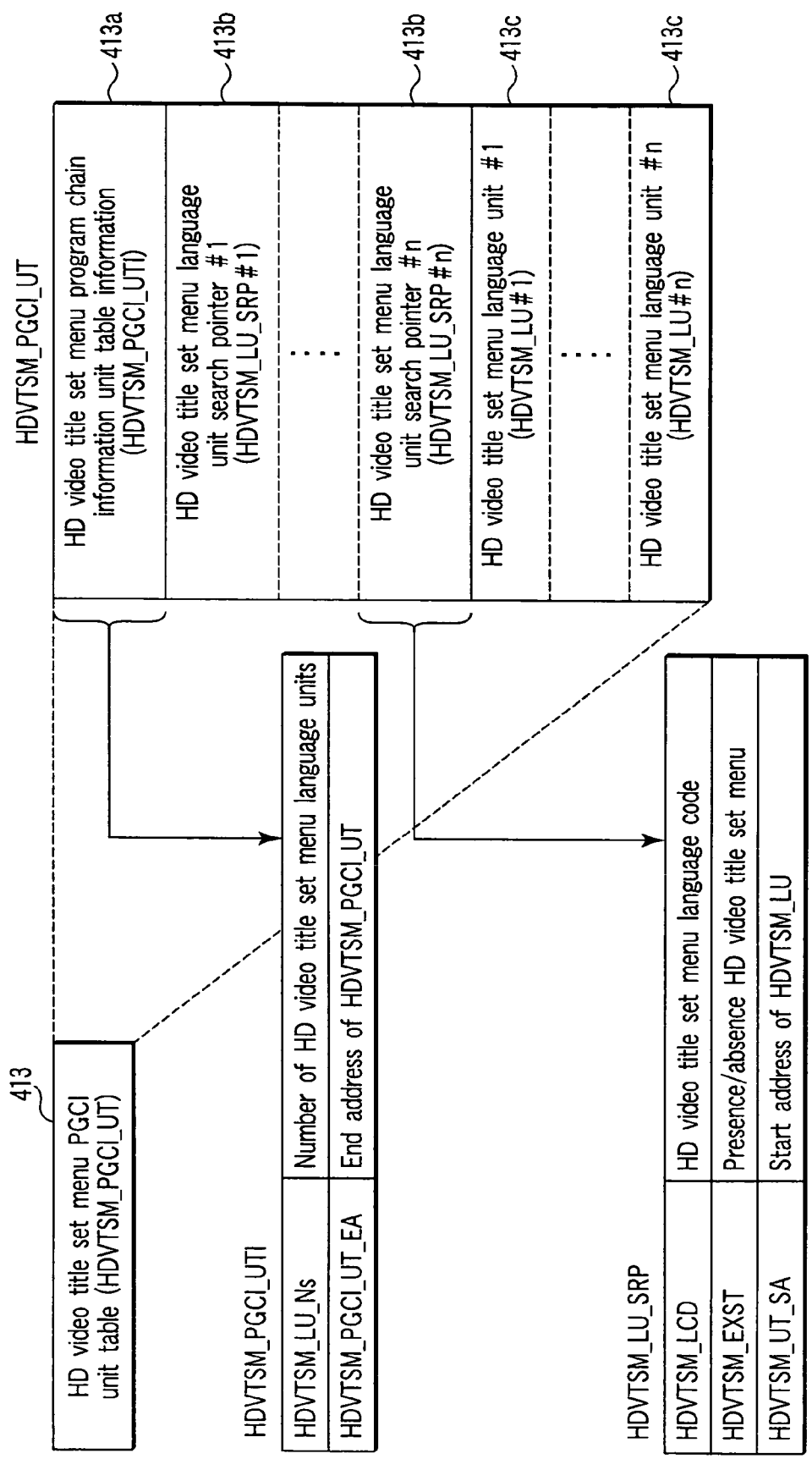
FIG. 25 is a diagram showing a data structure in an HD video title set menu/PGCI/unit table (HDVTSM_PGCI_T) 413 shown in FIG. 20.

The data structure in the HD video title set menu PGCI unit table (HDVTSM_PGCI_UT) 413 shown in FIG. 20 is shown in FIG. 25. The HD video title set menu PGCI unit table (HDVTSM_PGCI_UT) 413 comprises various information such as:

(a) HD video title set menu program chain information unit table information (HDVTSM_PGCI_UTI) 413a including information such as the number (HDVTSM_LU_Ns) of HD video title set menu language units and the end address (HDVTSM_PGCI_UT_EA) of HDVTSM_PGCI_UT;

(b) an HD video title set menu language unit search pointer (HDVTSM_LU_SRP) 413b in which information is recorded such as an HD video title set menu language code (HDVTSM_LCD), presence/absence of HD video title set menu (HDVTSM_EXST), and the start address (HDVTSM_UT_SA) of HDVTSM_LU; and (c) an HD video title set menu language unit (HDVTSM_LU) 413c.

Moreover, as shown in FIG. 26, the data structure in the HD video title set menu language unit (HDVTSM_LU) 413c comprises:

(a) HD video title set menu language unit information (HDVTSM_LUI) 413c1 including the information such as the number (HDVTSM_PGCI_SRP_Ns) of HDVTSM_PGCI_SRP and the end address (HDVTSM_LU_EA) of HDVTSM_LU;

(b) HD video title set menu program chain information (HDVTSM_PGCI) 413c3 including the same data structure as that of FIG. 33 or 34; and (c) an HDVTSM_PGCI search pointer (HDVTSM_PGCI_SRP) 413c2 in which the information is recorded such as an HDVTSM_PGC category (HDVTSM_PGC_CAT) and the start address (HDVTSM_PGCI_SA) of HDVTSM_PGCI.

A place where information to refer to (designate) the HD menu AOB (HDMENU_AOB) is set with respect to the menu by an HDVTS unit in the first embodiment of the present invention is the HDVTSM_PGC category information (HDVTSM_PGC_CAT) in the HDVTS_PGCI search pointer #n (HDVTSM_PGCI_SRP #n) 413c2 as shown in FIG. 26. The audio information number (HDVTSM_PGC_CAT) in the HDVTSM_PGC category information shown in FIG. 27 means an audio information number (AOB number) which designates AOB number #n to be reproduced in HDMENU_AOBS (the corresponding AOB number in AOBs (HDMENU_AOB) for the menu arranged in FIG. 19). The audio information selection means the selection information of the audio information to be reproduced simultaneously with the screen display of the menu of the HD content in the present invention, and the audio information selection flag (audio information selection) indicating the start/end trigger information of the audio information reproduction.

Here, when the audio information selection flag (audio information selection) "00b" is selected, the audio data recorded in each video object for the menu is reproduced, and the sound reproduction is interrupted at the switching time of the menu. When the audio information selection flag (audio information selection) "10b" or "11b" is selected, the audio data of the HD menu AOB (HDMENU_AOB) existing in the HD menu audio object region (HDMENU_AOBS) 33 is reproduced. To reproduce the audio data for the menu (AOB), when "11b" is designated, the reproduction of the audio data is started from the beginning every change of the menu screen. When "10b" is designated, the reproduction of the audio data is continued regardless of the switching of the menu screen. In the embodiment of the present invention, as shown in FIG. 19, a plurality of types of AOBs (HDMENU_AOB) for the menu are stored beforehand in the HD menu audio object region (HDMENU_AOBS) 33. The audio information number shown in FIG. 27 indicates the selection information of the HD menu AOB (HDMENU_AOB) to be reproduced simultaneously with the display of the corresponding PGC for the menu display. The AOB is selected from the AOBs for the menu arranged in FIG. 19 by number information indicating "the number of AOB to be selected from above" which is selection information of the HD menu AOB. Further in the HDVTSM PGC category (HDVTSM_PGC_CAT), the entry type information for judging the entry PGC, menu ID information indicating the identification of the menu (e.g., the menu of the title or the like), block mode information, block type information, and PTL_ID_FLD information are recorded.

Figure 28:
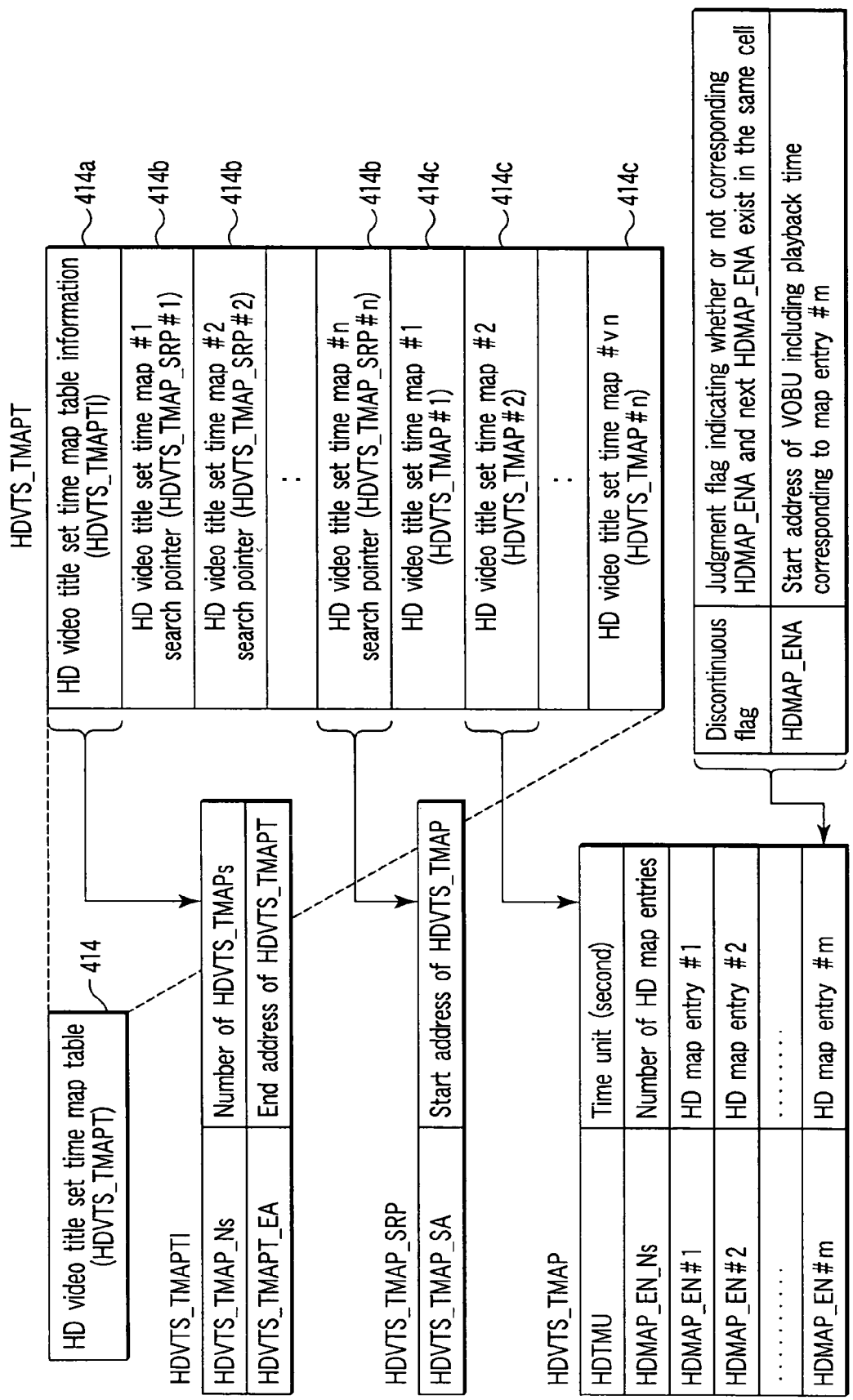
FIG. 28 is a diagram showing a data structure in an HD video title set time map table (HDVTS_TMAPT) 414 shown in FIG. 20.

The data structure in the HD video title set time map table (HDVTS_TMAPT) 414 shown in FIG. 20 is shown in FIG. 28. The HD video title set time map table (HDVTS_TMAPT) 414 comprises:

(a) HD video title set time map table information (HDVTS_TMAPTI) 414a in which various information is recorded such as the number (HDVTS_TMAP_Ns) of HDVTS_TMAP and the end address (HDVTS_TMAPT_EA) of HDVTS_TMAPT;

(b) an HD video title set time map search pointer (HDVTS_TMAP_SRP) 414b including the information of the start address (HDVTS_TMAP_SA) of HDVTS_TMAP; and (c) an HD video title set time map (HDVTS_TMAP) 414c in which various information is recorded such as a length (TMU) of a time unit (second) constituting a standard in map entry, the number of map entries (MAP_EN_Ns), and map entry (MAP_EN).

The HD map entry (HDMAP_EN) comprises a "discontinuous flag" indicating a flag for judging whether or not the corresponding HDMAP_ENA and the next HDMAP_ENA exist in the same cell; and start address information (HDMAP_ENA) of VOBU including a playback time corresponding to the corresponding HD map entry (HDMAP_EN).

Figure 29:
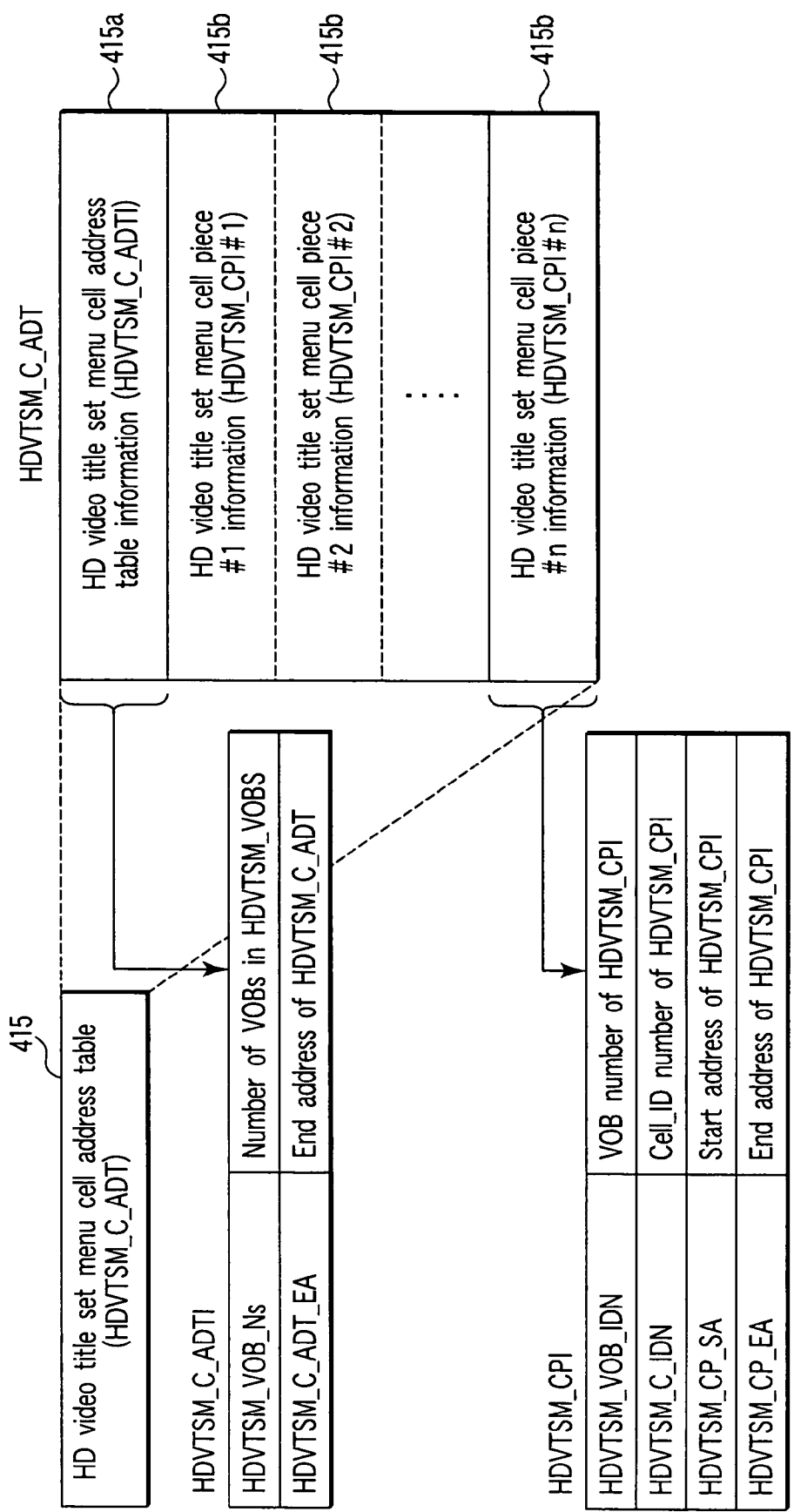
FIG. 29 is a diagram showing a data structure in an HD video title set menu cell address table (HDVTSM_C_ADT) 415 shown in FIG. 20.

Moreover, as shown in FIG. 29, the data structure in the HD video title set menu cell address table (HDVTSM_C_ADT) 415 shown in FIG. 20 comprises:

(a) HD video title set menu cell address table information (HDVTSM_C_ADTI) 415a including information such as the number (HDVTSM_VOB_Ns) of VOBs in HDVTSM_VOBS and the end address (HDVTSM_C_ADT_EA) of HDVTSM_C_ADT; and (b) HD video title set menu cell piece information (HDVTSM_CPI) 415b in which various information is recorded such as VOB_ID number (HDVTSM_VOB_IDN) of HDVTSM_CP, Cell_ID number (HDVTSM_C_IDN) of HDVTSM_CP, start address (HDVTSM_CP_SA) of HDVTSM_CP, and end address (HDVTSM_CP_EA) of HDVTSM_CP.

Figure 30:
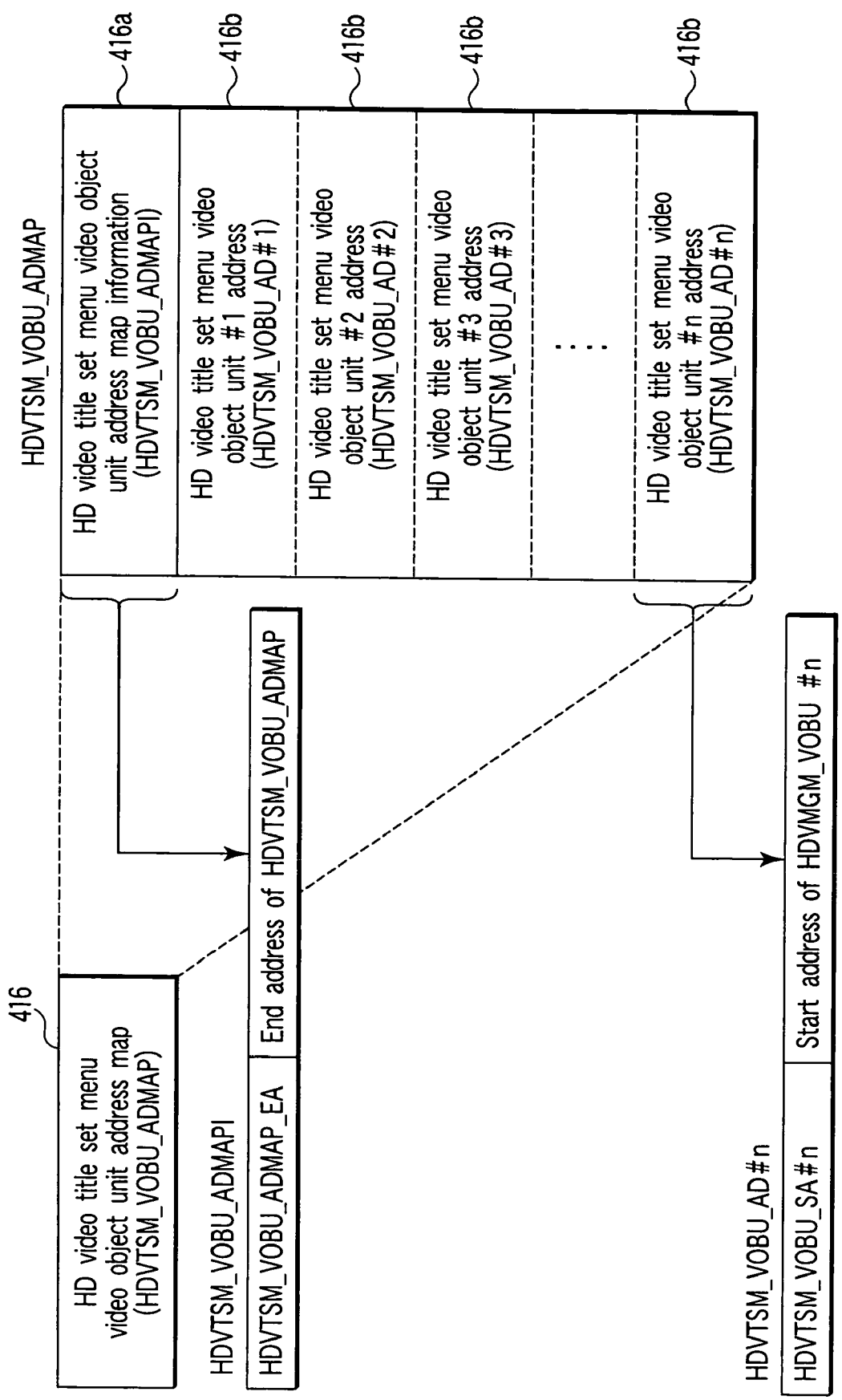
FIG. 30 is a diagram showing a data structure in an HD video title set menu video object unit address map (HDVTSM_VOBU_ADMAP) 416 shown in FIG. 20.

As shown in FIG. 30, the HD video title set menu video object unit address map (HDVTSM_VOBU_ADMAP) 416 shown in FIG. 20 comprises information such as:

(a) HD video title set menu video object unit address map information (HDVTSM_VOBU_ADMAPI) 416a in which the information of the end address (HDVTSM_VOBU_ADMAP_EA) of HDVTSM_VOBU_ADMAP; and (b) HD video title set menu video object unit address (HDVTSM_VOBU_AD) 416b including the information of the start address (HDVTSM_VOBU_SA) of HDVTSM_VOBU.

Moreover, the data structure in the HD video title set cell address table (HDVTS_C_ADT) 417 shown in FIG. 20 is shown in FIG. 31. The HD video title set cell address table (HDVTS_C_ADT) 417 comprises various information such as:

(a) HD video title set cell address table information (HDVTS_C_ADTI) 417a including information of the number (HDVTS_VOB_Ns) of VOBs in HDVTS_VOBS and the end address (HDVTS_C_ADT_EA) of HDVTS_C_ADT; and (b) HD video title set cell piece information (HDVTS_CPI) 417b including various information such as VOB_ID number (HDVTS_VOB_IDN) of HDVTS_CP, Cell_ID number (HDVTS_C_IDN) of HDVTS_CP, start address (HDVTS_CP_SA) of HDVTS_CP, and end address (HDVTS_CP_EA) of HDVTS_CP.

Figure 32:
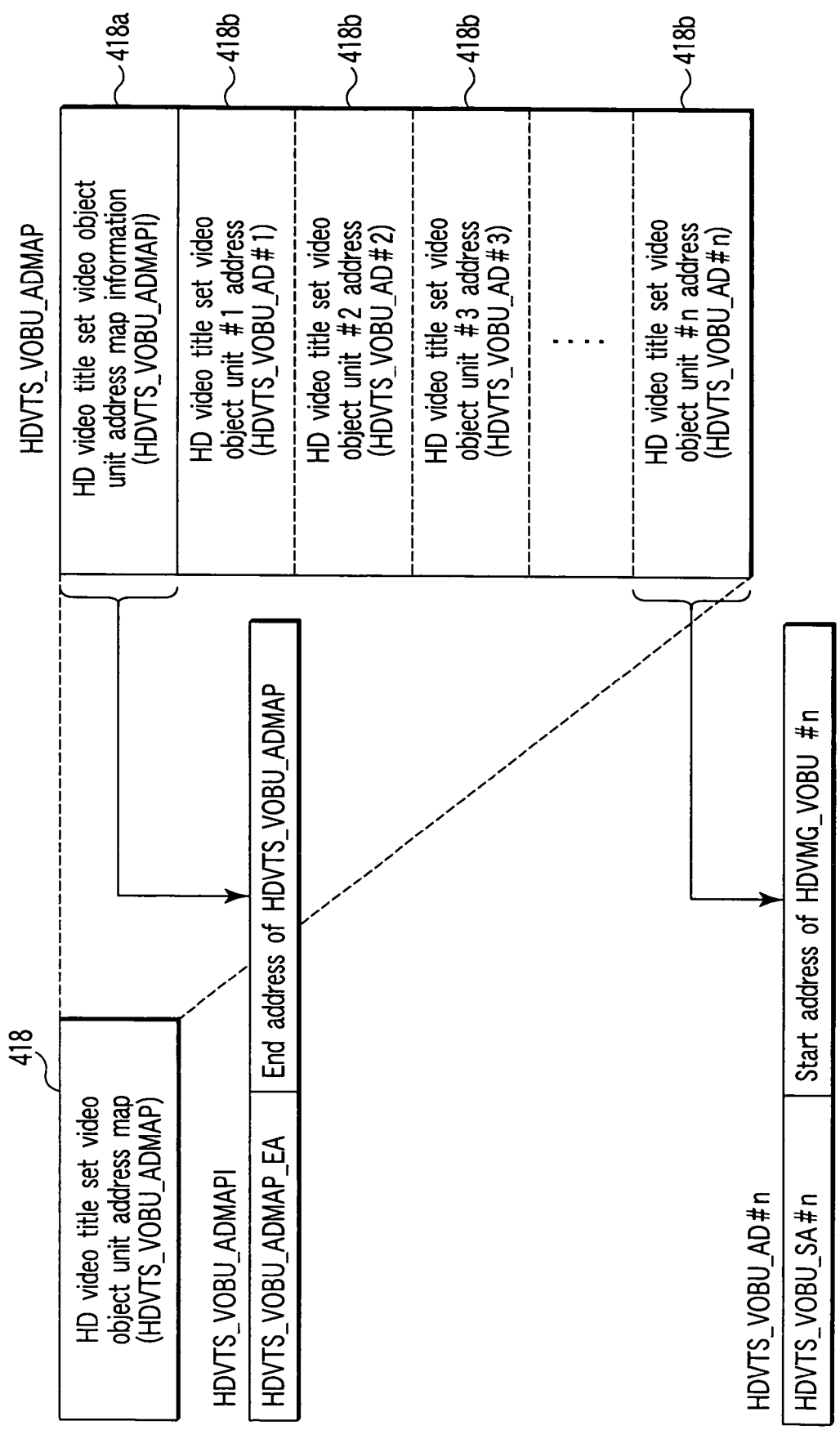
FIG. 32 is a diagram showing a data structure in the HD video title set/cell/address table (HDVTS_C_ADT) 417 shown in FIG. 20.

Furthermore, the data structure in the HD video title set video object unit address map (HDVTS_VOBU_ADMAP) 418 shown in FIG. 20 is shown in FIG. 32. The HD video title set video object unit address map (HDVTS_VOBU_ADMAP) 418 comprises various information such as:

(a) HD video title set video object unit address map information (HDVTS_VOBU_ADMAPI) 418a including information of the end address (HDVTS_VOBU_ADMAP_EA) of HDVTS_VOBU_ADMAP; and (b) HD video title set video object unit address (HDVTS_VOBU_AD) 418b in which information of start address (HDVTS_VOBU_SA) by an HDVTS_VOBU unit.

RSM permission flag information which realizes the subject matter (A) and the audio information selection flag/audio information number which realize the subject matter (F) are arranged in the search pointer information of program chain information PGCI as shown in FIGS. 22, 7, 24 in the first embodiment of the present invention. The present invention is not limited to this embodiment, and they may also be arranged in PGCI itself. Another embodiment (second embodiment) of the present invention is shown in FIGS. 33 and 34. The PGCI information shown in FIGS. 33 and 34 correspond to:

[a] the HD video manager menu program chain information (HDVMGM_PGCI) 312c3 shown in FIG. 7 concerning the HD video manager menu language unit (HDVMGM_LU) 312c of FIG. 6 existing in the HD video manager menu PGCI unit table (HDVMGM_PGCI_UT) 312 (FIG. 3) in the HD video manager information region (HDVMGI) 31 of FIG. 1E;

[b] the HD video title set menu program chain information (HDVTSM_PGCI) 413c3 shown in FIG. 26 and arranged in the HD video title set menu language unit (HDVTSM_LU) 413c in FIG. 25 in the HD video title set menu PGCI unit table (HDVTSM_PGCI_UT) 413 in FIG. 20 showing the data structure in the HD video title set information region (HDVTSI) 41 of FIG. 1F; and

[c] HDVTS_PGCI 412c(FIG. 23) in the HD video title set program chain information table (HDVTS_PGCIT) 412 in FIG. 20 showing the data structure in the HD video title set information region (HDVTSI) 41 of FIG. 1F (the PGCI information shown in FIGS. 33 and 34 may be arranged in three places [a] to [c]).

As shown in FIGS. 33 and 34, the program chain information (PGCI) comprises five regions (five management information groups) including program chain general information (PGC_GI) 50; program chain command table (PGC_CMDT) 51; program chain program map (PGC_PGMAP) 52; cell playback information table (C_PBIT) 53; and cell position information table (C_POSIT) 54.

As shown in FIGS. 33 and 34, RSM&AOB category information (RSM&AOB_CAT) is recorded in the last of the program chain general information (PGC_GI) 50 arranged in the first region (management information group) in PGCI. RSM permission flag information, audio information selection flag, and audio information number exist in RSM&AOB category information (RSM&AOB_CAT). This RSM permission flag information means the same content as that described in FIG. 24. The contents of the audio information selection flag and audio information number match those described in FIG. 8 or 27. Further in the RSM&AOB category information (RSM&AOB_CAT), the entry type information for judging the entry PGC, block mode information, block type information, and PTL_ID_FLD information are recorded.

As shown in FIGS. 33 and 34, the information in the PGC graphic unit stream control table (PGC_GUST_CTLT) in which the control information on the stream of the graphic units to be arranged in the PGC is recorded is individually recorded in separate regions in accordance with four types of images (16:9 HD image, 16:9 SD image, 4:3 SD image, and letter boxed SD image). The separate regions are PGC_GUST_CTL (PGC_GUST #0) region of a graphic unit stream #0 for HD; PGC_GUST_CTL (PGC_GUST #1) region of a graphic unit stream #1 for SD wide; PGC_GUST_CTL (PGC_GUST #2) region of a graphic unit stream #2 for 4:3 (SD); and PGC_GUST_CTL (PGC_GUST #3) region of a graphic unit stream #3 for letter box (SD).

In addition to the above-described information, further in the program chain general information (PGC_GI) 50; various information is recorded such as PGC content (PGC_CNT); PGC playback time (PGC_PB_TM); PGC user operation control (PGC_UOP_CTL); PGC audio stream control table (PGC_AST_CTLT); PGC sub-picture stream control table (PGC_SPST_CTLT); PGC navigation control (PGC_NV_CTL); PGC sub-picture palette (PGC_SP_PLT); start address (PGC_CMDT_SA) of PGC_CMDT; start address (PGC_PGMAP_SA) of PGC_PGMAP; start address (C_PBIT_SA) of C_PBIT; and start address (C_POSIT_SA) of C_POSIT.

The command information adapted for each PGC is integrated and arranged in the program chain command table (PGC_CMDT) 51 as shown in FIG. 35. Places where the PGCI information is arranged may be three places [a] to [c] as described in the description of the places with reference to FIGS. 33 and 34. The resume sequence information described in [Point 4] described in the subject matter (A) is recorded in the program chain command table (PGC_CMDT) 51 as shown in FIG. 35. The information content of the resume sequence information in the embodiment of the present invention (resume (RSM) command sequence clearly described with reference to FIG. 35) is described in a form in which the RSM commands (RSM_CMD) 514 are successively arranged in this region. The RSM command (RSM_CMD) 514 described in a column in FIG. 35 means a command which can be designated in the HD DVD video content in the present invention, and the RSM commands (RSM_CMD) 514 arranged in the resume (RSM) command sequence region are continuously (sequentially) executed in-order from above.

In the embodiment of the present invention, the arrangement of cell commands (C_CMD) 513 described in FIG. 35 also means a sequential command series. That is, it is meant that the command processes are successively executed from above in accordance with the arrangement order of the cell commands (C_CMD) 513 shown in FIG. 35. As described with reference to FIG. 36, a part of a cell command process procedure (first cell command number to start the sequential process of the cell command and execution range of the sequential process of the cell command for each cell) can be designated for each cell.

The RSM command (RSM_CMD) 514 indicates a part of the command procedure to be executed "immediately before the reproduction from halfway in PGC" whose reproduction is interrupted before, after returning to the corresponding PGC (e.g., from the menu screen). On the other hand, a pre-command (PRE_CMD) 511 means a command to be executed "immediately before reproducing the corresponding PGC from the beginning". The command executed after reproducing the corresponding PGC is a post-command (POST_CMD) 512. In FIG. 35, the numbers of pre-commands (PRE_CMD) 511, post-commands (POST_CMD) 512, cell commands (C_CMD) 513, and RSM commands (RSM_CMD) 514 which can be arranged in one program chain command table (PGC_CMDT) 51 can be freely set (any of the numbers of commands described above may also be "0"). Additionally, in the embodiment of the present invention, an upper limit of a total value of added numbers of pre-commands (PRE_CMD) 511, post-commands (POST_CMD) 512, cell commands (C_CMD) 513, and RSM commands (RSM_CMD) 514 which can be arranged in one program chain command table (PGC_CMDT) 51 is defined as 1023. Therefore, for example, when all the numbers of pre-commands (PRE_CMD) 511, post-commands (POST_CMD) 512, and RSM commands (RSM_CMD) 514 are 0, the number of cell commands (C_CMD) 513 may be set to 1023 at maximum.

As shown in FIG. 36, number information PRE_CMD_Ns of pre-commands (PRE_CMD) 511, number information POST_CMD_Ns of post-commands (POST_CMD) 512, number information C_CMD_Ns of cell commands (C_CMD) 513, and number information RSM_CMD_Ns of RSM commands (RSM_CMD) 514 which can be arranged in one program chain command table (PGC_CMDT) 51 are recorded in the program chain command table information (PGC_CMDTI) 510.

A concrete data structure in the RSM command (RSM_CMD) 514 recorded in the program chain command table (PGC_CMDT) 51 will be described hereinafter. Here, the concrete data structure in the RSM command (RSM_CMD) 514 will be described. The data structures in the pre-command (PRE_CMD) 511, post-command (POST_CMD) 512, and cell command (C_CMD) 513 are also the same as the concrete data structure in the RSM command (RSM_CMD) 514. In the concrete data structure in the RSM command (RSM_CMD) 514, as shown in FIG. 36, a region for eight bytes is only allocated to each command. The contents of command are recorded in the region for eight bytes. In any command, three bits from the MSB of eight bytes enter data of "command ID-1". The contents of data of and after the three bits from the MSB differs with the value of the "command type", but the contents have information such as "I-flag for comparison" and "Compare Field" in common regardless of the command type.

Figure 37:
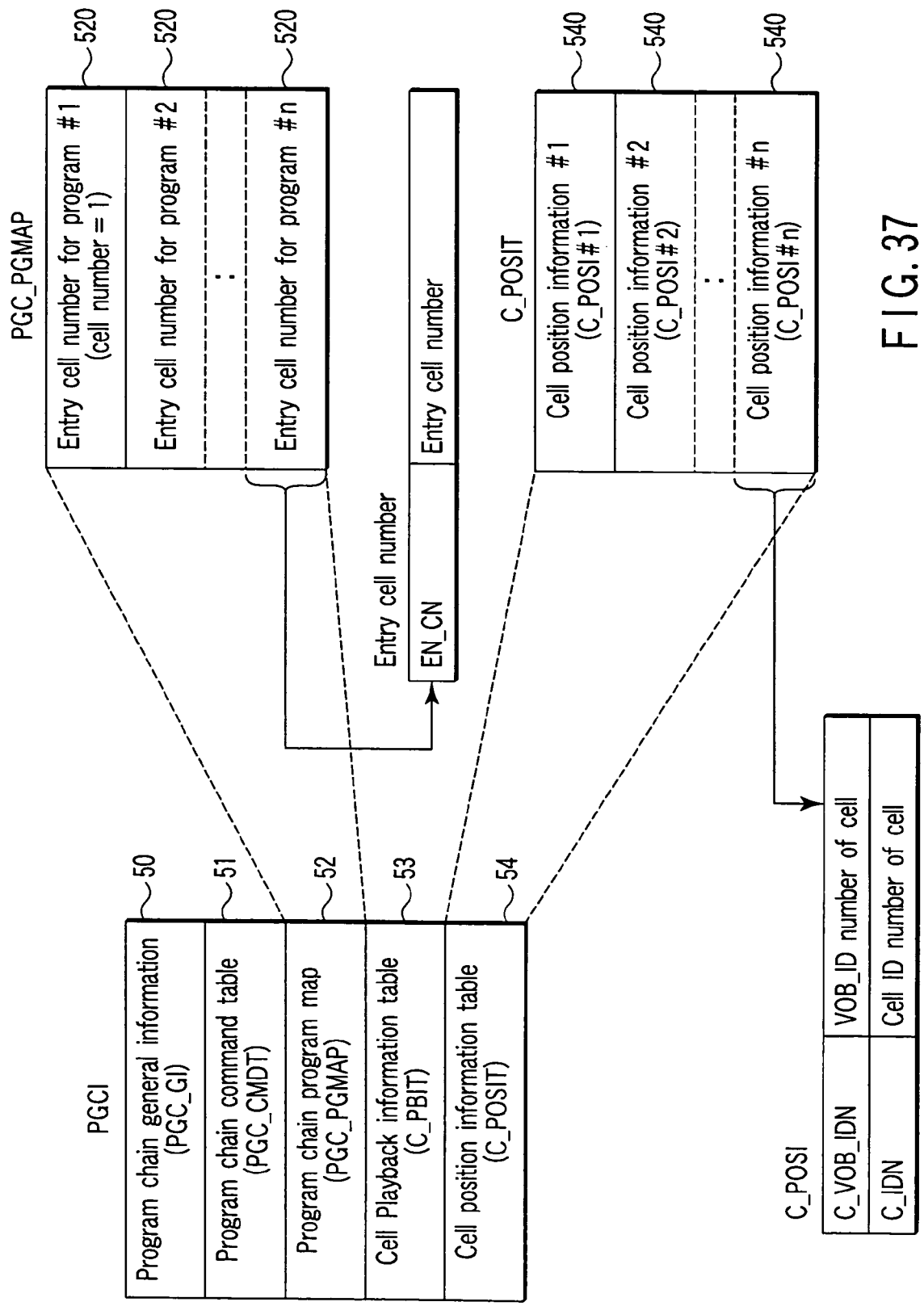
FIG. 37 is a diagram showing a data structure in program chain/program map (PGC_PGMAP) and cell/position information table (C_POSIT) 54 arranged in the program chain information PGCI.

Detailed structures of the program chain program map (PGC_PGMAP) 52 and cell position information table (C_POSIT) 54 arranged in program chain information (PGCI) are shown in FIG. 37.

Entry cell number 520 for program information in which an entry cell number (EN_CN) is recorded in accordance with each entry is arranged in the program chain program map (PGC_PGMAP) 52, and the number of pieces of information corresponding to the number of entry numbers are arranged. The cell position information table (C_POSIT) 54 has a structure in which cell position information (C_POSI) 540 comprising a set of VOB ID number (C_VOB_IDN) and cell ID number (C_IDN) of the cell is arranged in order.

It has been described with reference to FIG. 35 that a part of the cell command process procedure (the first cell command number to start the sequential process of the cell command and an execution range of the sequential process of the cell command for each cell) can be designated for each cell in a series of cell command process procedure designated to the cell command #k (C_CMD #k) 513 from cell command #1 (C_CMD #1) 513. Execution range information of the sequential process of the cell command which can be set for each cell is shown in FIG. 38. The places where the PGCI information is recorded may be three places [a] to [c] as in the description of the places with reference to FIGS. 33 and 34. As shown in FIG. 38, the management information on the individual cells constituting the PGC is recorded in cell playback information (C_PBI) 530 in the cell playback information table (C_PBIT) 53 in the PGCI which is the management information of the corresponding PGC.

In a series cell command process procedure designated to the cell command #k (C_CMD #k) 513 from the cell command #1 (C_CMD #1) 513 shown in FIG. 35, the information on the first cell command number to start the sequential process of the cell command specified for each cell is recorded in cell command start number information (C_CMD_SN) in the cell playback information (C_PBI) 530 as shown in FIG. 38. Moreover, cell command continuous number information (C_CMD_C_Ns) indicating a command number to execute the command process continuously is recorded in the cell playback information (C_PBI) 530, including the cell command (C_CMD) 513 designated by the cell command start number information (C_CMD_SN). The execution range of the sequential process of the cell command executed by the corresponding cell is specified from both information. In the embodiment of the present invention, after ending the reproduction of the corresponding cell, a series of command procedure (command sequence) is executed in a range designated by the cell command start number information (C_CMD_SN) and cell command continuous number information (C_CMD_C_Ns) of FIG. 38.

Moreover, in the cell playback information (C_PBI) 530, information is recorded such as: a cell category (C_CAT) indicating whether the corresponding cell constitutes the interleaved block corresponding to the multi-angle or constitutes a part of a general continuous block, or corresponds to a top or last cell of the interleaved block in a case where the cell constitutes a part of the interleaved block for the multi-angle; a cell playback time (C_PBTM) indicating a playback time required at the time of the reproduction of the corresponding whole cell; start address position information of first VOBU of the cell (C_FVOBU_SA); end address position information of first ILVU of the cell (C_FILVU_EA); start address position information of last VOBU of the cell (C_LVOBU_SA); and end address position information of last VOBU of the cell (C_LVOBU_EA).

A system block diagram in the information reproduction device in the embodiment of the present invention is shown in FIG. 39. In FIG. 39, the HD DVD video content of the present invention are recorded in the information storage medium 1 in FIG. 39. The disk drive 101 reproduces the HD DVD video content from the information storage medium 1 to transfer the content to a data processor 102. The VOB which is video data in the HD DVD video content comprises a group of VOBUs which are base units as shown in FIGS. 45A, 45B, 45C, and 45D, and the navigation pack a3 is arranged in the front of each VOBU. The video data is recorded in the video pack a4, the audio data in the audio pack a6, and sub-picture data in the sub-picture (SP) pack a7. These packs are multiplexed. Moreover, in the embodiment of the present invention, graphic unit data is recorded in a graphic unit (GU) pack a5. The VOB in which these various data is multiplexed/arranged is packet-divided by the separation unit (demultiplexer) 103. The video data recorded in the video pack a4 is sent to the video decoder unit 111. The sub-picture data recorded in the sub-picture pack a7 is sent to the sub-picture decoder unit 112, the graphic data recorded in the graphic unit pack a5 is sent to the graphic decoder unit 113, and the audio data recorded in the audio pack a6 is sent to the audio decoder unit 114. Various sent data are decoded by the respective decoder units 111 to 114, synthesized in the video processor, converted into analog signals by D/A converters 132 and 133, and output. These series of processes are generally managed by the MPU 121, and the data which needs to be temporarily stored during the process is temporarily stored in the memory 122. The process program to be processed by the MPU 121 or fixed information set beforehand is recorded in the ROM 123. FIG. 39 shows that the user inputs the information into the information reproduction device by key input via the key input device 131, but the present invention is not limited to this, and the key input device 131 may also be a general remote controller.

Figure 40:
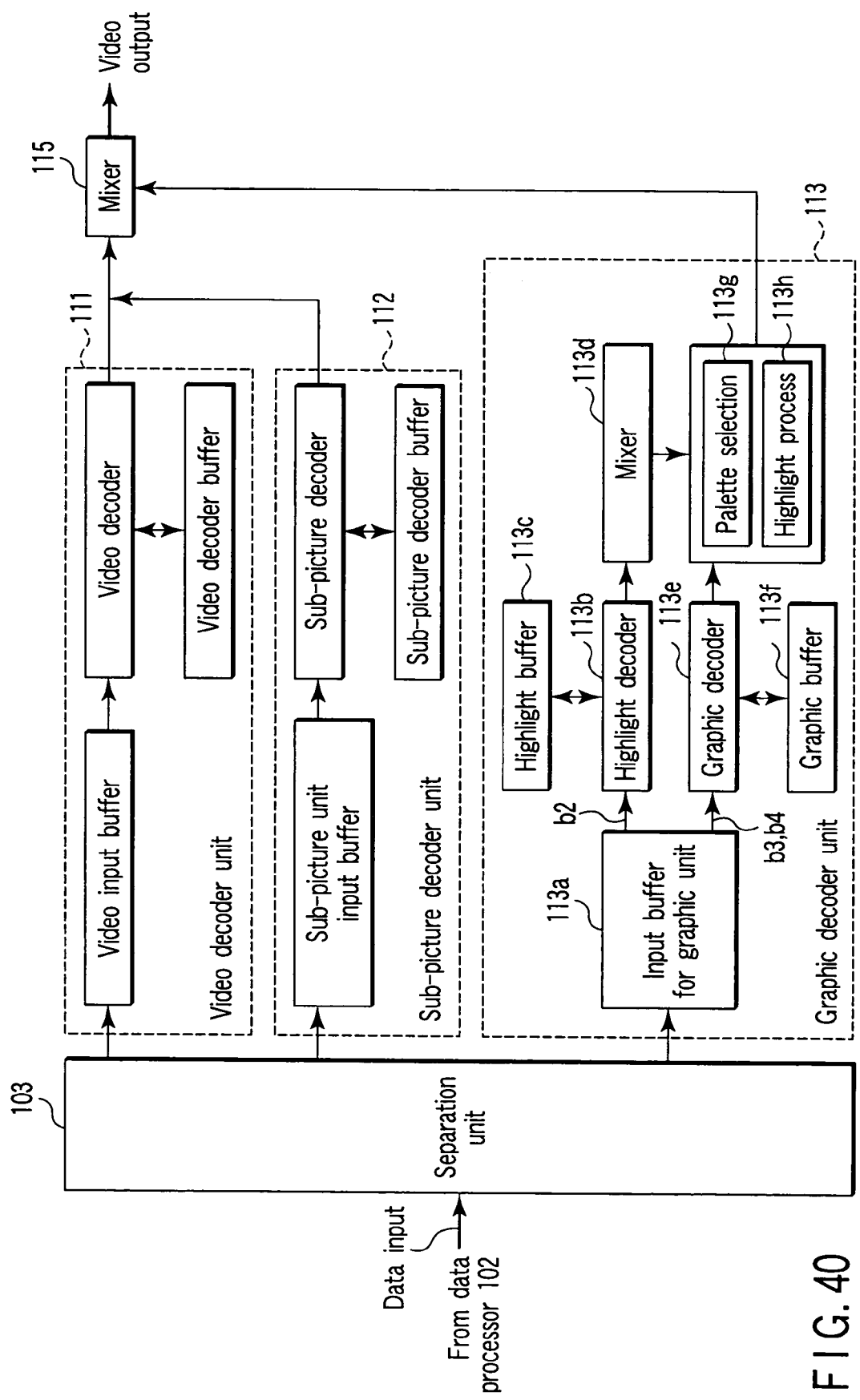
FIG. 40 is a block diagram showing a detailed constitution of a graphic decoder unit 113 of the information reproduction device shown in FIG. 39.

FIG. 40 is a diagram showing an inner structure of the graphic decoder unit 113 shown in FIG. 39 in detail. The graphic unit data separated/extracted by the separation unit 103 is temporarily stored in the graphic unit input buffer 113a. The graphic unit data comprises highlight information b2 and graphic data b4 and mask data b3 as shown in FIG. 46. The highlight information b2 is sent to the highlight decoder 113b to decode highlight information. Moreover, the graphic data b4 and mask data b3 are decoded into 256 colors of screen information in the graphic decoder 113e. Furthermore, after performing palette selection 113g and highlight process 113h by the control of the mixer 113d, the video data is synthesized with sub-picture data by a mixer 115. The mixer 115 of FIG. 40 means a part of the video processor of FIG. 39.

Next, an imaginary video access unit IVAU in the embodiment of the present invention will be described with reference to FIGS. 41A, 41B, 41C, 41D, and 41E.

The VOB of a moving picture (movie) in the conventional SD DVD video content is divided into video access units (VAU) as shown in FIG. 41A. When a boundary position of VOB is matched with that of VAU, seamless reproduction between different VOBs is possible.

As shown in FIG. 41B, according to the HD DVD video of the present invention, imaginary access units IVAU2 to IVAUn (imaginary VAU) are imaginarily arranged in periods between VAU1 including I picture in which the still picture is recorded and VAUL including I picture in which the still picture to be displayed next is recorded. In a method of setting the access unit, an interval between (VAU1 including) the I picture to start the still picture and (VAUL including) the next picture is imaginarily and finely time-divided for each period of the access unit, using a period of the video frame or a period integer times that of the video frame as a unit. A decoding time stamp (DTS) indicating a timing at which the still picture is input into the decoder and a presentation time stamp (PTS) indicating a timing at which the still picture is displayed are set beforehand for each still picture, and one video frame period is determined by an NTSC system and PAL system. Therefore, the timing of the boundary position of the imaginary access unit is calculated and obtained as imaginary PTS as shown in FIG. 41C. Moreover, it is (imaginarily) assumed that the still picture is repeatedly reproduced/displayed for each imaginary access unit.

Moreover, in the embodiment of the present invention, as shown in FIG. 41D, an integer number of imaginary access units are imaginarily set to constitute one VOBU. As a result, in the embodiment of the present invention, a display period of the VOBU of each still picture is integer times that of the video frame. In FIG. 41C, since one I picture showing the still picture exists in VAU, and any I picture is not included in IVAU, any video data does not exist in IVAU. That is, only one I picture exists in the VOBU comprising VAU1 to IVAU15 or VOBU comprising VAU16 to IVAU 30. On the other hand, any video data (I picture) is not included in the VOBU comprising IVAU30 to IVAU45. In the embodiment of the present invention, it is also possible to define the VOBU which does not include any video data. In the embodiment of the present invention, the identical VOBU is prohibited from including a plurality of I pictures, and it is defined (restricted) that one VOBU surely has one or less I picture. In the embodiment of the present invention, as seen from comparison of the positions of FIGS. 41C and 41D, the identical VOBU includes a structure in which the VAU is surely (imaginarily) arranged before IVAU.

Moreover, as shown in FIG. 41E, the video data (I picture in which the still picture is recorded) is surely arranged in the first VOBU in the interleaved unit (ILVU).

A relation between the imaginary video access unit IVAU in the embodiment of the present invention shown in FIGS. 41A, 41B, 41C, 41D, and 41E and HD map entry (HDMAP_EN) shown in FIG. 28, and a relation between the imaginary video access unit and HD video title set video object unit address (HDVTS_VOBU_SA) shown in FIG. 32 will be described hereinafter.

The imaginary video access unit IVAU in the embodiment of the present invention is set in the still picture. FIGS. 42A, 42B, 42C, 42D, and 42E show a management data content described in the HD video title set video object unit address (FIG. 32: HDVTS_VOBU_SA) to manage the data of VOB in which the still picture is recorded.

As shown in FIG. 42D, for example, VOBU including the video access unit VAU in which data of one still picture is recorded with a format of the I picture defined, for example, by MPEG (or a format of "JPEG data" in another example) is referred to as "real VOBU" in the embodiment of the present invention. An imaginary VOBU comprising only the imaginary video access unit IVAU (which does not include any still picture data) is referred to as "imaginary VOBU". It is assumed that the start addresses of places where real VOBUs #1, #2, #5 are recorded in the information storage medium are "α", "β", "γ". The value of HDVTS_VOBU_SA #1 in which the start address information of real VOBU #1 is described is "α" in accordance with the above-described value as shown in FIG. 42E. Moreover, similarly, the value of HDVTS_VOBU_SA #2 in which the start address information of real VOBU #2 is described is "β" and the value of HDVTS_VOBU_SA #5 in which the start address information of real VOBU #5 is described is "γ".

In the embodiment of the present invention, as shown in FIG. 42D, imaginary VOBUs #3 and #4 are persistently imaginarily set VOBUs, and any still picture data does not exist in these VOBUs. Therefore, even when the start position of the imaginary VOBU #3 or #4 is accessed, and the information of and after the position is reproduced, any still picture data is not obtained. The still picture data corresponding to the imaginary VOBUs #3 and #4 are arranged in real VOBU #2.

Therefore, in the embodiment of the present invention, the value of the HD video title set video object unit start address (HDVTS_VOBU_SA) sets the start address of the real VOBU existing in the preceding position (I picture, or VOBU in which the still picture data recorded in the format of JPEG exists). In an example of FIG. 42D, the values to be recorded in HDVTS_VOBU_SA #3 and #4 in which the start address information of the imaginary VOBUs #3 and #4 are described are set to "β" which is the start address of the preceding real VOBU (here, real VOBU #2). When HDVTS_VOBU_SA corresponding to the imaginary VOBU is set in this manner, and the address position described in HDVTS_VOBU_SA is accessed, the still picture data necessarily corresponding to VOBU (even with respect to the imaginary VOBU) can be acquired, and high-rate search and simplicity of a search process can be secured with respect to a specific still picture in the VOB.

Next, a relation between the imaginary video access unit IVAU in the embodiment of the present invention shown in FIGS. 41A, 41B, 41C, 41D, and 41E and the HD map entry (HDMAP_EN) shown in FIG. 28 will be described with reference to FIGS. 43A, 43B, and 43C. FIG. 43C shows data arrangement of VOB of the still picture recorded along the track of the information storage medium (optical disk). Moreover, the setting of the access unit including the imaginary video access unit (IVAU) imaginarily set in the data arrangement of VOB is shown in FIG. 43B adjacent to FIG. 43C. The VOB data of the still picture is arranged along the track in order of reproduction. Therefore, when the data arrangement is traced along the track, an approximate playback time is obtained. An approximate standard of the playback time of each time unit (HDVMU) (e.g., every five or ten seconds) shown in FIG. 28 is shown in FIG. 43A. "A" to "D" show the playback time of the time unit (HDTMU) interval. The start address information of VOBU in which the playback time "A" is included is recorded in HDMAP_ENA #1 (corresponding to HDMAP_ENA of FIG. 28) shown in FIG. 43C, and the start address information of VOBU including the playback times "B" to "D" are similarly recorded in HDMAP_ENAs #2 to #4. FIG. 43C shows the value recorded in each HDMAP_ENA. The start addresses of real VOBUs #1 and #4 including actual still picture data are set to "α", "β", and the start address of the following real VOBU is set to "γ" although not shown.

Since the VOBU including the playback time A apparently shows real VOBU #1, the value of HDMAP_ENA #1 is "α". Additionally, all the VOBUs including the playback times "B", "C", "D" are imaginary VOBUs. Therefore, even if the start address of the imaginary VOBU can be defined, and the address is accessed, the still picture data cannot be acquired, because any still picture data is not included.

Therefore, in the embodiment of the present invention, in the same manner as in FIGS. 42A, 42B, 42C, 42D, and 42E, when the still picture data recorded in the format of the I picture or JPEG is not included in the VOBU including the playback time corresponding to the HD map entry (in the imaginary VOBU), the start address information of VOBU (real VOBU) including the still picture data in the preceding position is recorded in HD map entry information (in HDMAP_ENA in the map entry (HDMAP_EN) in detail). In the embodiment of FIGS. 43A, 43B, and 43C, real VOBUs preceding the imaginary VOBUs #3, #5, #7 which are VOBUs including the playback times "B", "C", "D" are real VOBUs #1, #3, #4. Therefore, as shown in FIG. 43C, the values of HDMAP_ENA #2, #3, #4 are "α", "β", "β". As described above, the value in the HD map entry is arranged in the preceding position, and the start address of the VOBU including the I picture, or the still picture data recorded in the format of JPEG is recorded. Accordingly, when the address designated by HDMAP_ENA is accessed, it is assured that the still picture data to be reproduced in the playback time designated in an HDTMU interval is read. Accordingly, the high-rate search for desired still picture data by time search and the simplicity of the search process can be secured.

A region in which the system parameter SPRM is stored as shown in FIG. 44 is allocated to the memory 122 in the system block diagram in the information reproduction device shown in FIG. 39. Current menu language code (CM_LCD) information being reproduced is recorded in SPRM(0), and initial menu language code (IM_LCD) information is recorded in SPRM(21). The current menu language code (CM_LCD) being reproduced can be changed/set both by the user and the command, but the initial menu language code (IM_LCD) can be changed/set only by the user.

Moreover, information is stored in another system parameter: an audio stream number (ASTN) in a title domain is recorded in SPRM(1); a sub-picture stream number (SPSTN) and on/off flag in the title domain are recorded in SPRM(2); an angle number (AGLN) in the title domain is recorded in SPRM(3); a title number (TTN) in the title domain is recorded in SPRM(4); a VTS title number (VTS_TTN) in the title domain is recorded in SPRM(5); a title PGC number (TT_PGCN) in the title domain is recorded in SPRM(6); part_of_title number (PTTN) for one_sequential_PGC_title is recorded in SPRM(7); a highlight button number (HL_BTNN) for a selected state is recorded in SPRM(8); a navigation timer (NV_TMR) is recorded in SPRM(9); TT_PGCN for NV_TMR is recorded in SPRM(10); a player audio mixing mode for karaoke (P_AMXMD) is recorded in SPRM(11); a country code (CTY_CD) for parental management is recorded in SPRM(12); a parental level (PTL_LVL) is recorded in SPRM(13); a player configuration (P_CFG) for video is recorded in SPRM(14); a player configuration (P_CFG) for audio is recorded in SPRM(15); an initial language code (INI_LCD) for AST is recorded in SPRM(16); an initial language code extension (INI_LCD_EXT) for AST is recorded in SPRM(17); an initial language code (INI_LCD) for SPST is recorded in SPRM(18); an initial language code extension (INI_LCD_EXT) for SPST is recorded in SPRM(19); and a player area code is recorded in SPRM(20), and SPRM(22) and subsequent parameters are reserved.

Examples of commands for use in the HD DVD video content in the present invention are as follows.

Go To command group: command to change an execution order of commands.

Link command group: command to start the reproduction from a specific place in the identical domain.

Jump command group: command to start the reproduction from the specific place in a different domain.

Compare Go To command group: command to change the execution order of commands, when a comparison result is correct.

Compare Link command group: start the reproduction from the specific place in the identical domain, when the comparison result is correct.

Compare Jump command group: start the reproduction from the specific place in the different domain, when the comparison result is correct.

SetSystem command group: change command of management parameter value.

Set command group: command to calculate the value of a general parameter.

Compare SetSystem command group: command to change the management parameter value, when the comparison result is correct.

Compare Set command group: command to calculate the value of the general parameter, when the comparison result is correct.

SetSystem Link command group: command to start the reproduction from the specific place in the identical domain, after changing the management parameter value.

Set Link command group: command to start the reproduction from the specific place in the identical domain, after calculating the value of the general parameter.

Set Go To command group: change the execution order of commands, after calculating the value of the general parameter.

Set Jump command group: command to start the reproduction from the specific place in the different domain, after calculating the value of the general parameter.

As a concrete command example, a SetGPRMMD command to change the value of the general parameter or a SetM_LCD command to set the menu description language code to SPRM(0) is included in the SetSystem command group. A SetMove command or a Set Add command to set the value of the general parameter to a specific value or to add the specific value to the value of the general parameter is included in the Set command group.

Moreover, a Nop command to execute nothing is included in the Go To command group. A CallSS command to start the reproduction of PGC designated by the domain ID and to record the resume information is included in the Jump command group. A Resume command to record the resume information is included in the Link command group.

A JumpTT or JumpVTS_TT or JumpVTS_PTT command belongs to the Jump command group. This command is used to start the reproduction in a position designated in another domain. The player has to hold all GPRM values, when this command is processed.

JumpTT is a command for starting the reproduction of the designated title. Details of the process are as follows.

(1) The current reproduction is stopped.

(2) The resume information (if any), the value of the navigation timer, and TT_PGCN for the navigation timer in the system parameters are discarded. To stop the navigation timer, "0" is substituted into SPRM(9).

(3) SPRM(1) and SPRM(2) are set.

(4) The reproduction of the designated title is started from a pre-command phase.

JumpVTS_TT is a command for starting the reproduction of the title designated in the current VTS space. The details of the process are as follows.

(1) The current reproduction is stopped.

(2) The resume information (if any), the value of the navigation timer, and TT_PGCN for the navigation timer in the system parameters are discarded. To stop the navigation timer, "0" is substituted into SPRM(9).

(3) SPRM(1) and SPRM(2) are set.

(4) The reproduction of the designated title is started with VTS_TTN in the current VTS space.

JumpVTS_PTT is a command to start the reproduction of the designated PTT in the current VTS space. The details of the process are as follows.

(1) The current reproduction is stopped.

(2) The resume information (if any), the value of the navigation timer, and TT_PGCN for the navigation timer in the system parameters are discarded. To stop the navigation timer, "0" is substituted into SPRM(9).

(3) SPRM(1) and SPRM(2) are set.

(4) The command of the pre-command region of PGC in which designated PTTN exists is executed.

(5) The reproduction of PTT designated by VTS_TTN and PTTN is started in the current VTS space.

The HD DVD video content described in the present invention also conforms to a multiplexing rule of system layers of MPEG. That is, even the graphic unit data is divided for each pack of 2,048 bytes, and is separated/arranged. At a playback time, as shown in FIGS. 45C and 45D, graphic unit (GU) packs scattered/arranged in the information storage medium are collected to assemble one graphic unit stream again. The graphic unit can support the graphic data in accordance with the 16:9 HD image, 16:9 SD image, 4:3 SD image, and letter boxed SD image. As shown in FIG. 45D, a separate stream is constituted in accordance with each of four types of images (16:9 HD image, 16:9 SD image, 4:3 SD image, and letter boxed SD image).

As shown in FIG. 46, the data structure in the graphic unit comprises header information b1, highlight information b2, mask data b3, and graphic data b4. The highlight information b2 comprises general information b21, color palette information b22, and n pieces of button information b23.

Figure 47A:
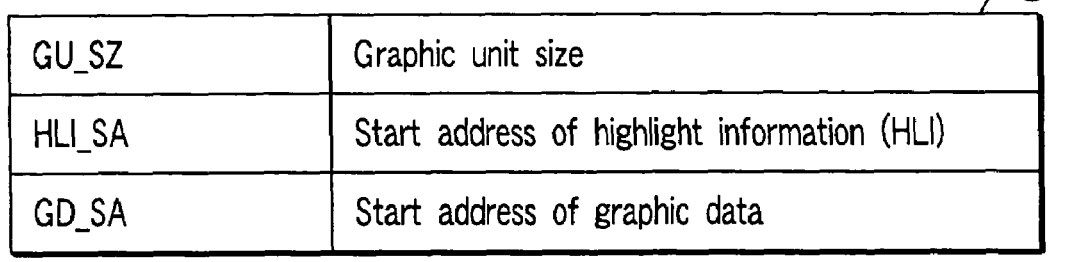
FIGS. 47A and 47B are diagrams showing contents of header information and contents of general information in the graphic unit.

As shown in FIG. 47A, the contents of the header information comprise graphic unit size (GU_SZ) information, start address (HLI_SA) information of the highlight information, and start address (GD_SA) information of the graphic data. In the above, the graphic unit size (GU_SZ) information indicates a size of the whole graphic unit shown on the lower left in FIG. 46. The start address (HLI_SA) information of the highlight information means the address to the start position of the highlight information b2 using the start position of the graphic unit shown on the lower left of FIG. 46 (start position of the header information b1) as a reference. The start address (GD_SA) information of the graphic data means the address to the start position of the graphic data b4 using the start position of the graphic unit shown on the lower left of FIG. 46 (start position of the header information b1) as the reference.

Figure 47B:
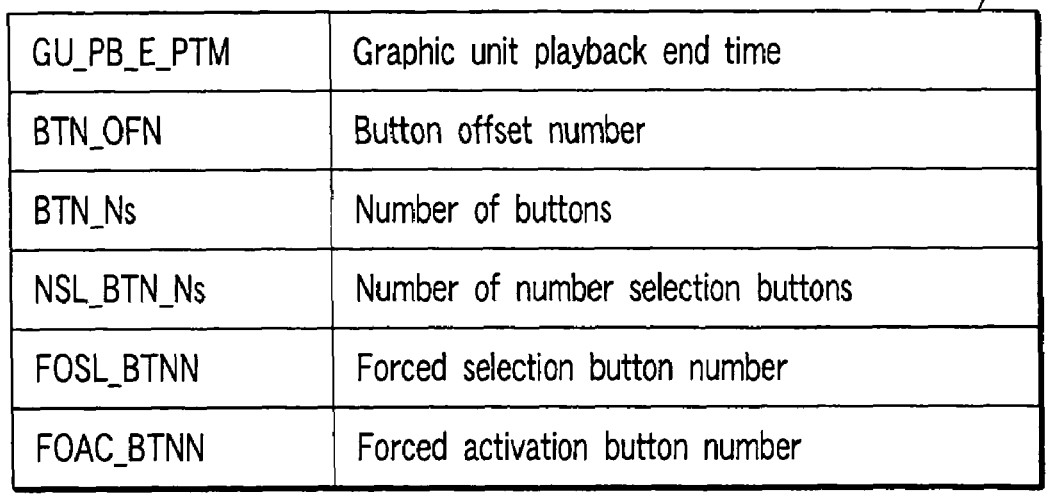

Moreover, as shown in FIG. 47B, the general information b21 in the highlight information b2 includes: graphic unit playback end time (GU_PB_E_PTM) information; button offset number (BTN_OFN) information; number of buttons (BTN_Ns) information; number of selection buttons (NSL_BTN_Ns) information; forced selection button number (FOSL_BTNN) information; and forced activation button number (FOAC_BTNN) information. It has been described with reference to FIGS. 45A, 45B, 45C, and 45D that the graphic unit data is scattered/arranged as graphic unit (GU) packs. Presentation time stamp (PTS) information is recorded beforehand in the graphic unit pack (to say correctly, in a packet header in the graphic unit packet included in the pack). A display time of the graphic unit and an effective time at which the execution (of the command) is possible (both start/end times completely coincide with each other) are set using this PTS information and graphic unit playback end time (GU_PB_E_PTM). Since PTS/PTM is used in the start/end time information, a time range can be set with a very good precision.

Figure 48:
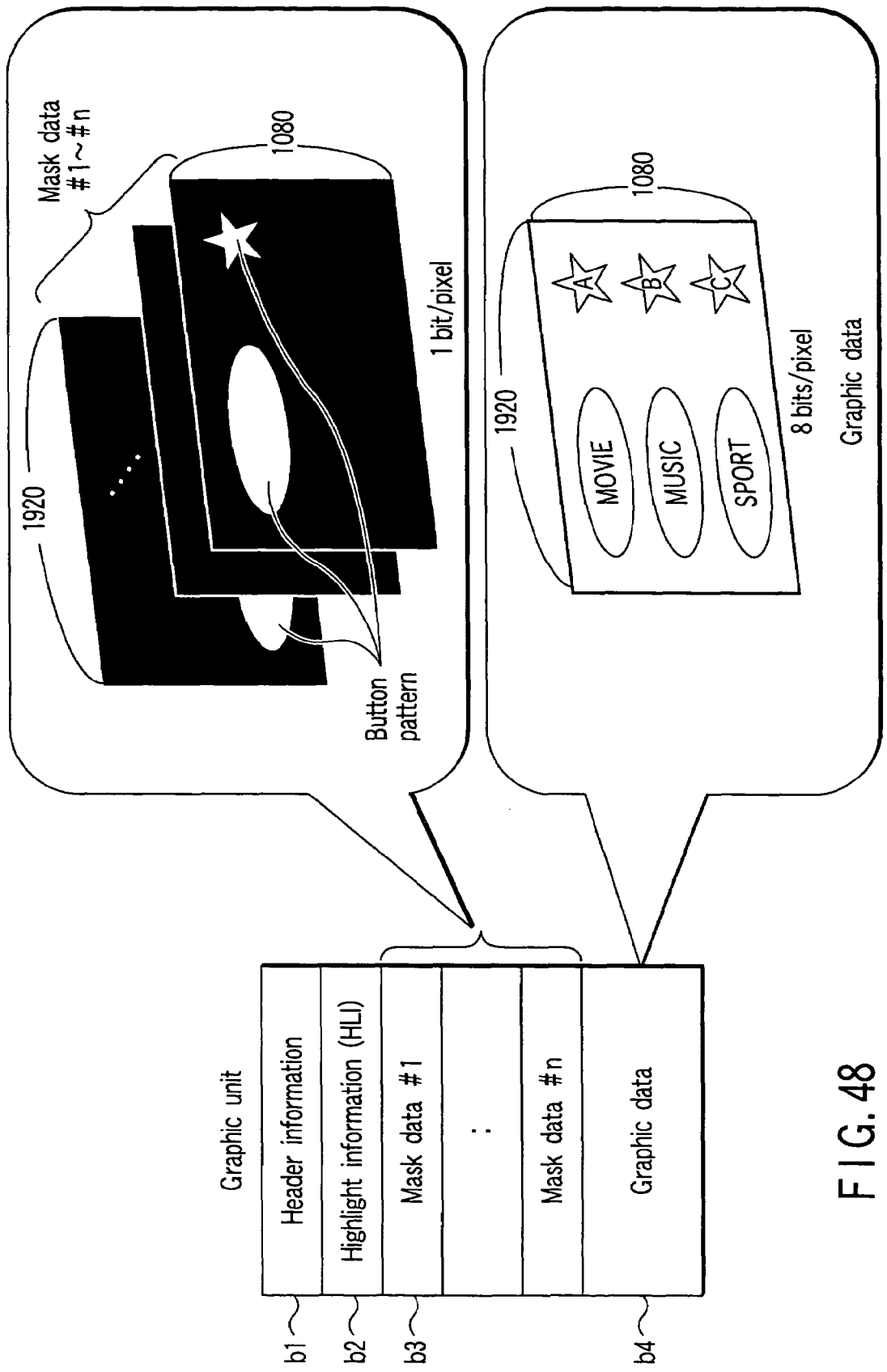
FIG. 48 is an explanatory view of an image of mask data and graphic data in the graphic unit.

As shown in FIG. 48, image information (bit map data or compressed data with respect to the bit map) of one screen in which eight bits are allocated to one pixel and 256-color representation is possible is recorded in the graphic data. The mask data indicates a positional range on the screen in which the user can designate command execution, one bit is allocated to one pixel, and only a screen region is set. Since the region is designated in a bit map form by a pixel unit in the mask data, as shown in FIG. 48, a plurality of regions arranged in positions apart from one another can be simultaneously set and the screen region can be finely designated with respect to an optional shape region by a pixel unit. The mask data can supply a plurality of menu choices to the user so that the user can set a plurality of regions.

Figure 49:
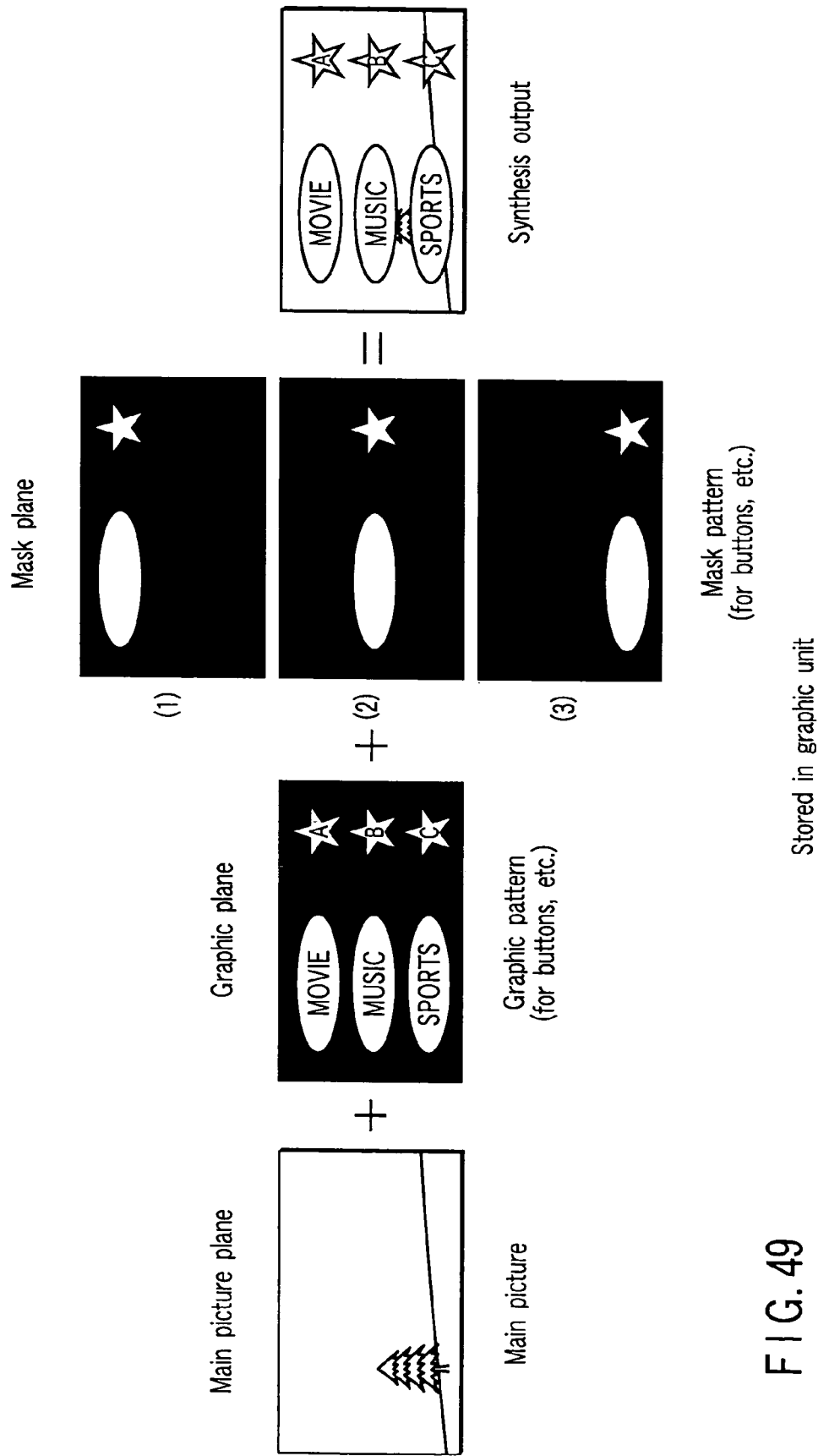
FIG. 49 is a diagram showing a video synthesis example including a mask pattern.

In a screen displayed to the user, main picture (A) recorded in the video pack a4 of FIG. 45C, a graphic pattern (B) recorded as the graphic data, and mask data (C) that can be set in a plural form are synthesized and prepared as shown in FIG. 49.

As shown in FIG. 46, the number "n" of mask data in the identical graphic unit GU matches the number "n" of pieces of button information recorded in the highlight information HLI, and each mask data #n has a one-to-one correspondence to button information #n. That is, in "m" satisfying 1<m<n, m-th mask data from the above corresponds to m-th button information from above. For example, when the user highlights (designates) the region designated by the m-th mask data on the screen, a button command b234 recorded in the m-th button information b23 is accordingly executed. Each button information #n is linked with individual mask data #n. To further facilitate access control to the mask data, the start address (address to the start position of the n-th mask data #n from the start position of the header information b1 on the lower left of FIG. 46) information b231 of the corresponding mask data #n, and the data size information b232 of the corresponding mask data #n are recorded in the button information #n. Additionally, the adjacent button position information b233 is recorded in the button information b23.

The data structure in the color pallet information b22 in the highlight information b2 of FIG. 46 will be described. The information of the color of the button at the time when the user first displays the menu screen (before the selection by the user) is stored in the usual color palette b221. When the user selects (designates) the specific button, the displayed color of the button changes on the screen. The displayed color of the button at the change time is recorded beforehand in the color palette for selection b222. Furthermore, the displayed color of the button indicating "activation" can be set so as to change in a stage in which the button is activated and the button command b234 corresponding to the button is executed. The displayed color of the button at the activation time is arranged in the color palette for activation b223.

Figure 50:
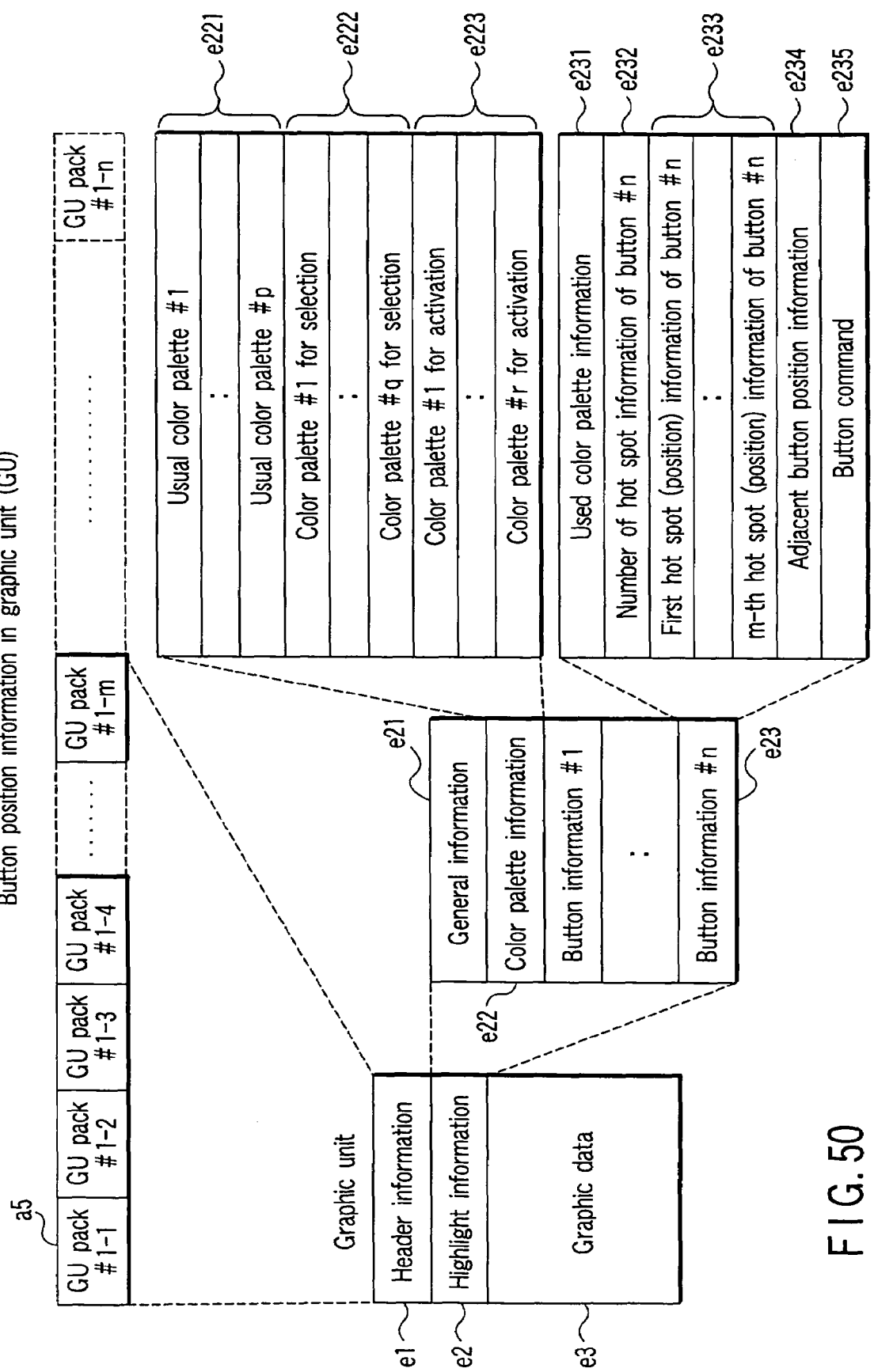
FIG. 50 is an explanatory view of button position information in the graphic unit.

FIG. 50 shows another embodiment concerning the data structure of the graphic unit GU. According to the embodiment shown in FIG. 50, hot spot information is used instead of the mask data. Therefore, in the embodiment of FIG. 50, it is possible to set a plurality of usual color palettes e221, color palettes for selection e222, and color palettes for activation e223. In a method of designating the region on the screen of each button information e23, the region on the screen can be designated by hot spot position information e233 instead of using the mask data. Furthermore, in the embodiment of FIG. 50, a plurality of pieces of hot spot position information e233 can be set with respect to the identical button information e23, and accordingly a plurality of regions apart from one another on the screen are associated with the identical button information e23.

One of the subject matters of the present embodiment (C: Seamless Reproduction of Still Picture) will be described.

[Point 1]

An access unit is also defined with respect to VOBS in which a still picture is recorded in the same manner as in VOBS in which a moving picture is recorded.

[Point 2]

An imaginary access unit is set in VOB in which a still picture is recorded, and management of the VOB is possible.

[Point 3]

An integer number of imaginary access units virtually constitute one VOBU.

[Point 4]

Units are arranged in such a manner that the still picture is recorded in an interleaved unit (ILVU) and the still picture is recorded in a first VOBU of this ILVU (the first VOBU in the ILVU is an actual VOBU).

Multi-angle playback in which the still picture is combined with the moving picture will be described with reference to FIGS. 51A, 51B, and 51C. FIG. 51A shows a case where the still picture is continuously reproduced in a seamless manner, FIG. 51B shows a case where the moving picture is switched to the still picture in the seamless manner, and FIG. 51C shows a case where the still picture is switched to the moving picture in the seamless manner. In FIG. 51A, an actual VOBU [a] to a virtual VOBU[d] in a still picture ILVU B7 are continuously reproduced, and the playback of the still picture is continued in the seamlessly continuous manner, jumping to a start position of the next still picture ILVU B8 from an end position of the virtual VOBU[d]. Since the end position of the virtual VOBU[d] coincides with that of an imaginary access unit (IVAU B7), the seamless connection (continuous playback) to the next still picture ILVU B8 is ensured. Moreover, since actual VOBU surely including still picture data is arranged in the start position of the still picture ILVU B8, the still picture data can instantly be acquired after the jumping, and this facilitates the seamlessly continuous playback.

In a case where a user switches display designated video to the still picture from the moving picture at a multi-angle playback time, the video is jumped to the start position of ILVU B7 in which the still picture is recorded from ILVU A6 in which the moving picture is recorded as shown in FIG. 51B. At this time, the actual VOBU[a] surely including the still picture data is arranged in the start position of the still picture ILVU B7. Therefore, the still picture data can quickly be acquired immediately after the jumping to the still picture ILVU B7, and the seamless connection to the still picture B7 from the moving picture A6 (angle switching while securing the continuous playback) is possible.

In a case where the user switches a designated display image to the moving picture from the still picture at the multi-angle playback time, the display image is jumped to the start position of the ILVU A9 in which the moving picture is recorded from the end position of the ILVU B7 in which the still picture is recorded as shown in FIG. 51C. Since the end position of a virtual VOBU[d] coincides with that of an imaginary access unit (IVAU) constituting the virtual VOBU[d], the seamless connection (continuous playback) to the next moving picture ILVU A9 is ensured.

A processing flow performed in the MPU 121 in the information reproduction device of the present embodiment shown in FIG. 39 at a time when the time search is performed with respect to the still picture VOB will be described with reference to FIG. 52. The following three methods are shown as an access control method at the time search time in the present embodiment.

Figure 52:
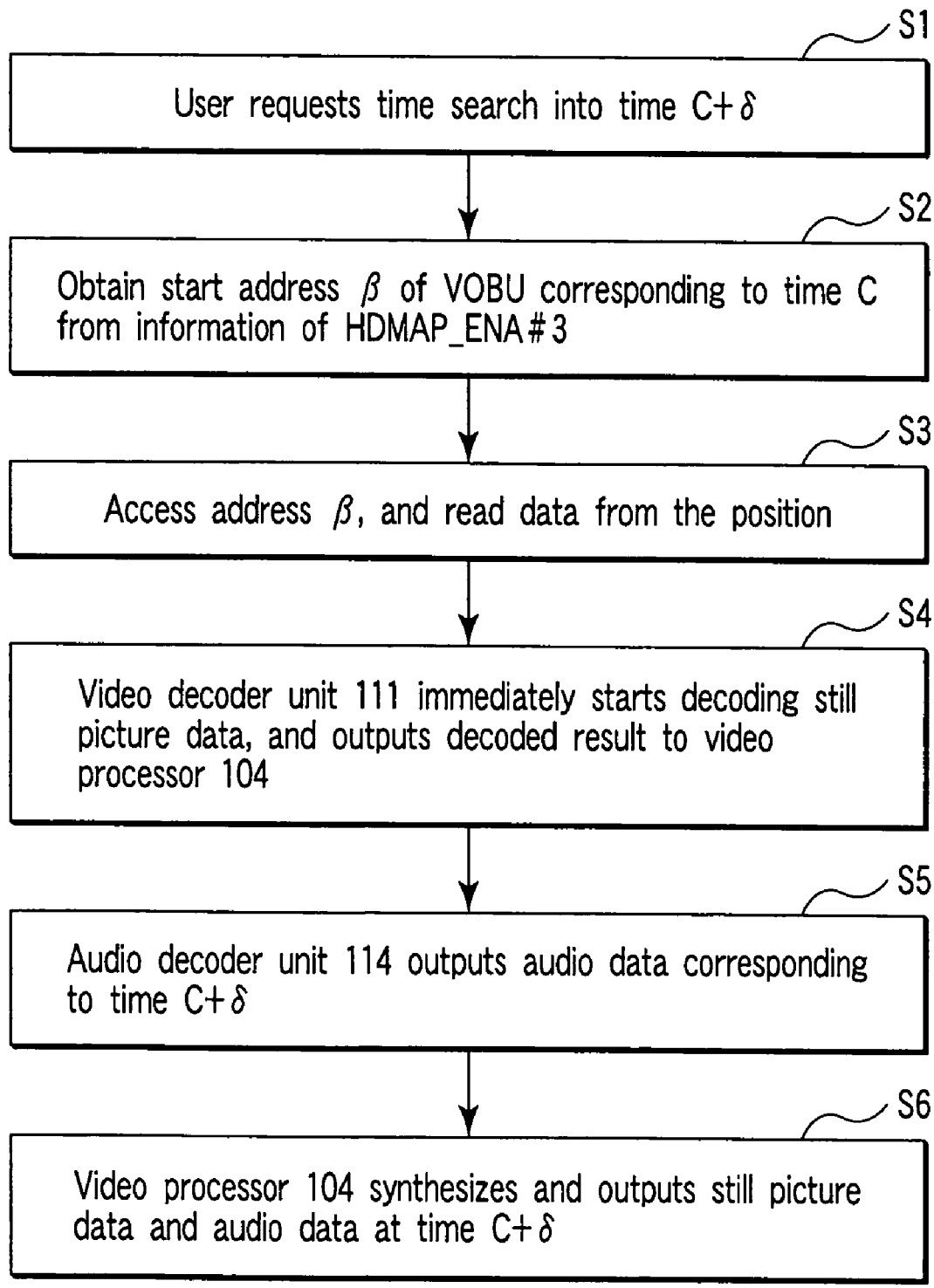
FIG. 52 is a flowchart showing one example of processing at a time when time search is performed with respect to a still picture VOB.

The first access control method in a case where a user designates playback from a time "C+δ" in a playback time shown in FIG. 43A is shown in FIG. 52. In step S1, the user designates the playback from the time "C+δ". Since VOBU start address information including the time "C+δ" is not held as management information, instead, VOBU start address information "β" including time "C" is extracted from information of HDMAP_ENA (step S2). The obtained VOBU start address information "β" is accessed, and the data is read from the position (step S3).

The still picture data recorded in actual VOBU #4 is immediately sent as video data to the video decoder unit 111 shown in FIG. 39 to start decoding (step S4). Since audio data is to be output from the time "C+δ", an audio decoder unit 114 starts outputting the audio data from the time "C+δ" (step S5), and a video processor 104 synthesizes both the data and outputs the result of synthesis (step S6).

In the example shown in FIG. 43C, the start position of actual VOBU #4 is in a position preceding largely from a position in the VOB corresponding to the time "C+δ". Therefore, with the use of the above-described first method, when much time (e.g., ten seconds) is required for (a focusing spot position of) an optical head for read to move to the position in the VOB corresponding to the time "C+δ" after the access to the position of "β", a problem occurs that much time is required for the time search (until the still picture is displayed for the user after the time search). To reduce the time of the time search (until the still picture is displayed for the user after the time search), as the second method shown in FIG. 53, a method will be described in which the display of the still picture corresponding to the time "C+δ" is abandoned to display a "still picture scheduled to be displayed next" instead.

In step S11, the user designates the playback from the time "C+δ", and extracts the VOBU start address information "β" including time "C" from the information of HDMAP_ENA #3 in the same manner as in FIG. 52. In step S13, the data of and after HDMAP_ENA #3 is searched to check a value of HDMAP_ENA at a time when the value changes to a value different from "β". In step S14, the address position obtained in the step S13 is accessed to read data from the position. In step S15, the video decoder unit 111 immediately starts decoding the still picture data, outputs a decoded result to the video processor 104, and checks a PTS value attached to the still picture data. In step S16, the audio decoder unit 114 outputs the audio data corresponding to the PTS value checked in step S15. In step S17, the video processor 104 synthesizes still picture data and audio data at a time corresponding to the PTS value checked in the step S15 and outputs the result of synthesis.

Figure 53:
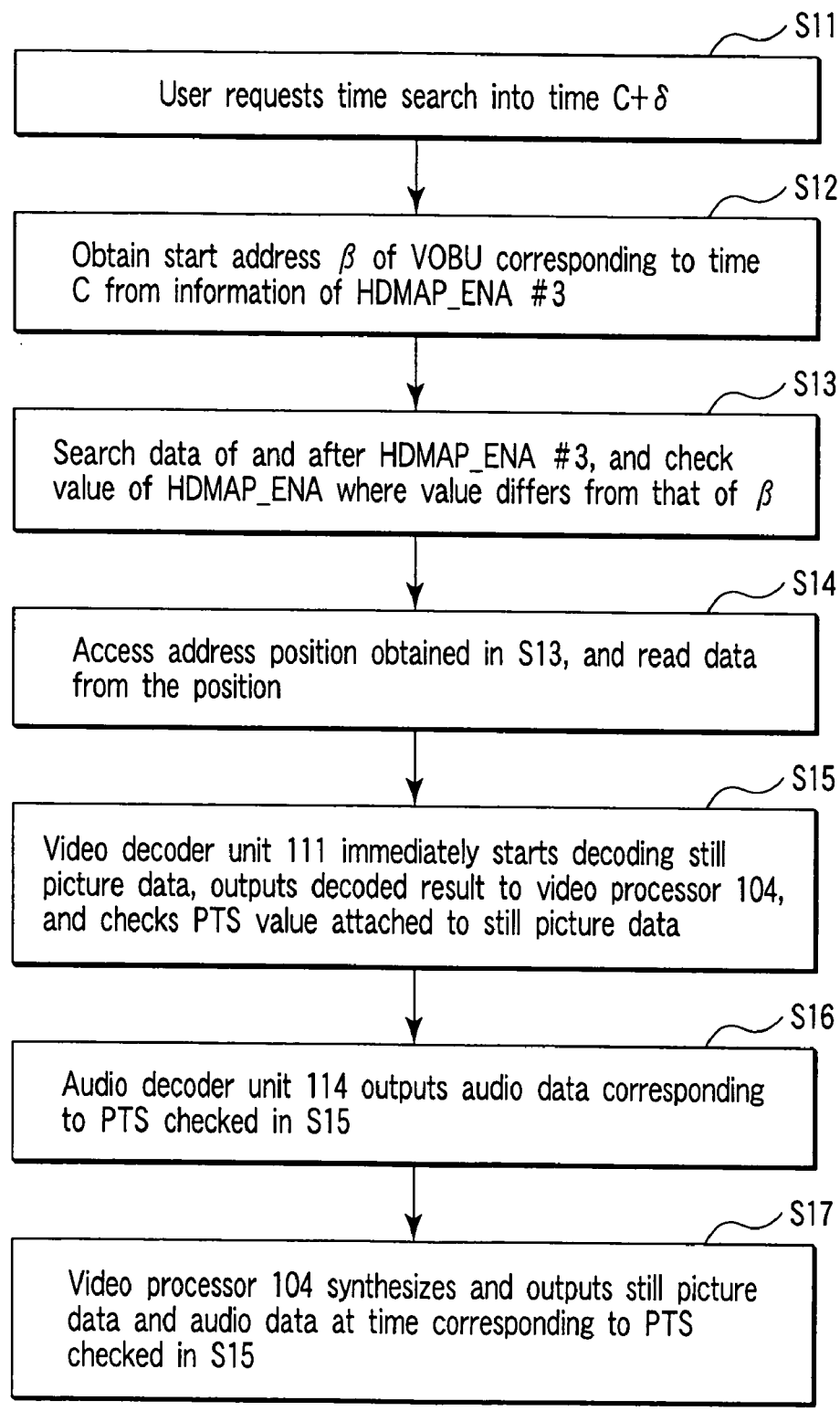
FIG. 53 is a flowchart showing another example of processing at a time when the time search is performed with respect to the still picture VOB.

The process of steps S15 to S17 of FIG. 53 basically corresponds to that of steps S4 to S6 of FIG. 52. Additionally, the audio data can be reproduced from the position designated by the user and corresponding to the playback time in steps S5 and S6 of FIG. 52. However, FIG. 53 is different in that the playback is started from the audio data reproduced simultaneously with a time when the still picture in the position accessed in step S14 starts to be displayed as shown in step S16. When this method is used, there is a merit that the still picture after the time search can be displayed without having the user waiting.

Additionally, in a case where there is a large difference between the playback time designated by the user in step S1 and that in the position accessed in step S14, there is a danger that a sense of incongruity is given to the user.

To solve the above-described problem, the following third method is proposed in which the first and second methods are combined. That is, when the user designates the start of playback at the time "C+δ", HD map entry information around "C+δ" (see FIG. 28) is checked. Since the start address information of the VOBU for each time unit HDTMU is recorded in the HD map entry information, a position where a value of HDMAP_ENA has changed is extracted, and accordingly it is possible to know:

(1) a time when the still picture data displayed in the vicinity of the time "C+δ" starts to be reproduced; and (2) a time when the still picture data displayed next to the still picture data displayed in the vicinity of the time "C+δ" starts to be displayed approximately (with a precision of a time unit). As a result, a difference value between the time extracted in (1) and the time "C+δ" is compared with that between the time extracted in (2) and the time "C+δ", and the still picture data having a shorter time difference is accessed.

When this third method is used, a time from when the user designates the time to perform the time search until the still picture is displayed is short. The still picture whose screen changes in the vicinity of the time designated by the user is displayed, therefore the still picture substantially close to that desired by the user can be displayed, and the possibility that the sense of incongruity is given to the user decreases.

Accordingly, the seamless connection between the moving picture and the still picture is possible, the screen can be prevented from being disturbed at a shift point, and multi-angle playback in which slide shows of the still pictures are combined or in which the slide show of the still pictures is combined with the moving pictures can be realized.

As described above, according to the present embodiment, a representing power of read-only DVD video content to the user is further enhanced, and comparatively simple authoring makes possible the preparation of the content easy to use by the user. As a result, there can be provided a data structure based on format standards capable of further enhancing an appeal of DVD video to the user, an information storage medium in which the data structure is recorded, and an information reproduction device capable of reproducing this information storage medium.

It is to be noted that this invention is not limited to the above-described embodiments as such, and constituting elements may be modified and embodied without departing from the scope in an implementation stage. Various inventions may be formed by an appropriate combination of a plurality of constituting elements described in the above-described embodiments. For example, some constituting elements may also be omitted from all the constituting elements described in the embodiments. Furthermore, the constituting elements in the different embodiments may be also appropriately combined.

What is claimed is:

1. An information reproduction method for an information storage medium which records a data structure in which a video object in which a still picture is recorded includes an actual access unit capable of recording the still picture and imaginary access units following the actual access unit, the imaginary access units being incapable of recording the still picture, the video object includes video object units, one or more video object units comprise one interleaved unit, a first access unit in a first video object unit in the interleaved unit is the actual access unit, and a first access unit in the video object unit is the actual access unit, the method comprising:

repeatedly reproducing the still picture for each of the imaginary access units.

2. An information storage medium which records a data structure in which a video object in which a still picture is recorded includes an actual access unit capable of recording the still picture and imaginary access units following the actual access unit, the imaginary access units being incapable of recording the still picture, the video object includes video object units, one or more video object units comprise one interleaved unit, a first access unit in a first video object unit in the interleaved unit is the actual access unit, and a first access unit in the video object unit is the actual access unit;

wherein the actual access unit and the imaginary access units are used to control reproduction of the still picture by an information reproducing apparatus.

3. An information reproduction device for an information storage medium which records a data structure in which a video object in which a still picture is recorded includes an actual access unit capable of recording the still picture and imaginary access units following the actual access unit, the imaginary access units being incapable of recording the still picture, the video object includes video object units, one or more video object units comprise one interleaved unit, a first access unit in a first video object unit in the interleaved unit is the actual access unit, and a first access unit in the video object unit is the actual access unit, the device comprising:

a reader which reads the information storage medium; and means for repeatedly reproducing the still picture for each of the imaginary access units.

* * * * *